United States Patent [19]

Rowan et al.

[11] Patent Number: 4,944,211
[45] Date of Patent: Jul. 31, 1990

[54] MASS ACTION DRIVER DEVICE

[76] Inventors: Larry Rowan, 3440½ Caroline Ave.; Larry Rosenberg, 3440 Caroline Ave., both of, Culver City, Calif. 90230

[21] Appl. No.: 947,746

[22] Filed: Dec. 30, 1986

Related U.S. Application Data

[63] Continuation-in-part of Ser. No. 590,283, Mar. 19, 1984, abandoned.

[51] Int. Cl.⁵ .............................. F41F 1/00; F41F 1/02
[52] U.S. Cl. .............................................. 89/8; 376/107
[58] Field of Search ................................ 89/8; 376/107

[56] References Cited

U.S. PATENT DOCUMENTS

| | | | |
|---|---|---|---|
| 3,611,783 | 10/1971 | Mittlemann | 89/8 |
| 4,172,008 | 10/1979 | Fleet | 376/107 |
| 4,189,346 | 2/1980 | Jarnagin | 376/107 |
| 4,202,725 | 5/1980 | Jarnagin | 376/107 |
| 4,319,168 | 3/1982 | Kemeny | 89/8 |
| 4,343,223 | 8/1982 | Hawke et al. | 89/8 |
| 4,347,463 | 8/1982 | Kemeny et al. | 89/8 |
| 4,429,612 | 2/1984 | Tidman et al. | 89/8 |
| 4,590,842 | 5/1986 | Goodstein et al. | 89/8 |
| 4,625,618 | 12/1986 | Howanick | 89/8 |

FOREIGN PATENT DOCUMENTS 448496  6/1936  United Kingdom ................ 89/8

Primary Examiner—Salvatore Cangialosi
Attorney, Agent, or Firm—Malke Leah Bas Meyer; Itzhak Ben Shlomo

[57] ABSTRACT

A device which delivers high velocity projectiles to specified or targeted sites. Said device operates to bore at extreme speeds a channel leading to specified sites and then to subsequently place explosive charges substantially below the surface of a region adjacent to or surrounding said targets. High velocity projectiles are fired in rapid succession with shaped explosive charges ranging from conventional plastic explosives to nuclear or thermonuclear devices detonating either upon impact or some distance below the point of impact. The multiple stage launch mode of the aforesaid device consists of three separate and distinct phases or stages, and/or multiples of said stages. Electropropulsive elements embodied within the devices consist of an automated plasma injection means, a primary arcing source, Tesla discharging means and propagating rails, magnetic induction elements and ancillary systems.

11 Claims, 55 Drawing Sheets

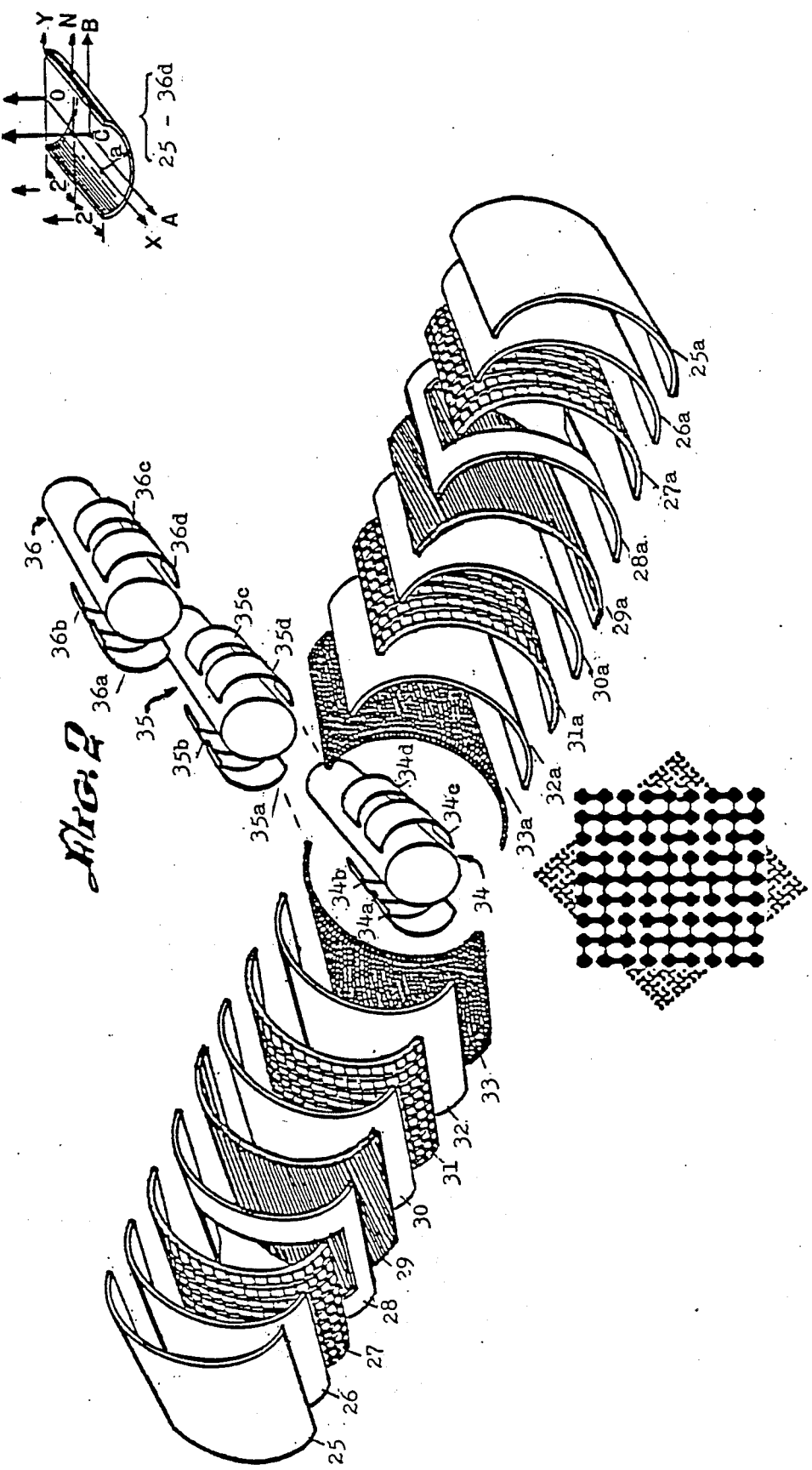

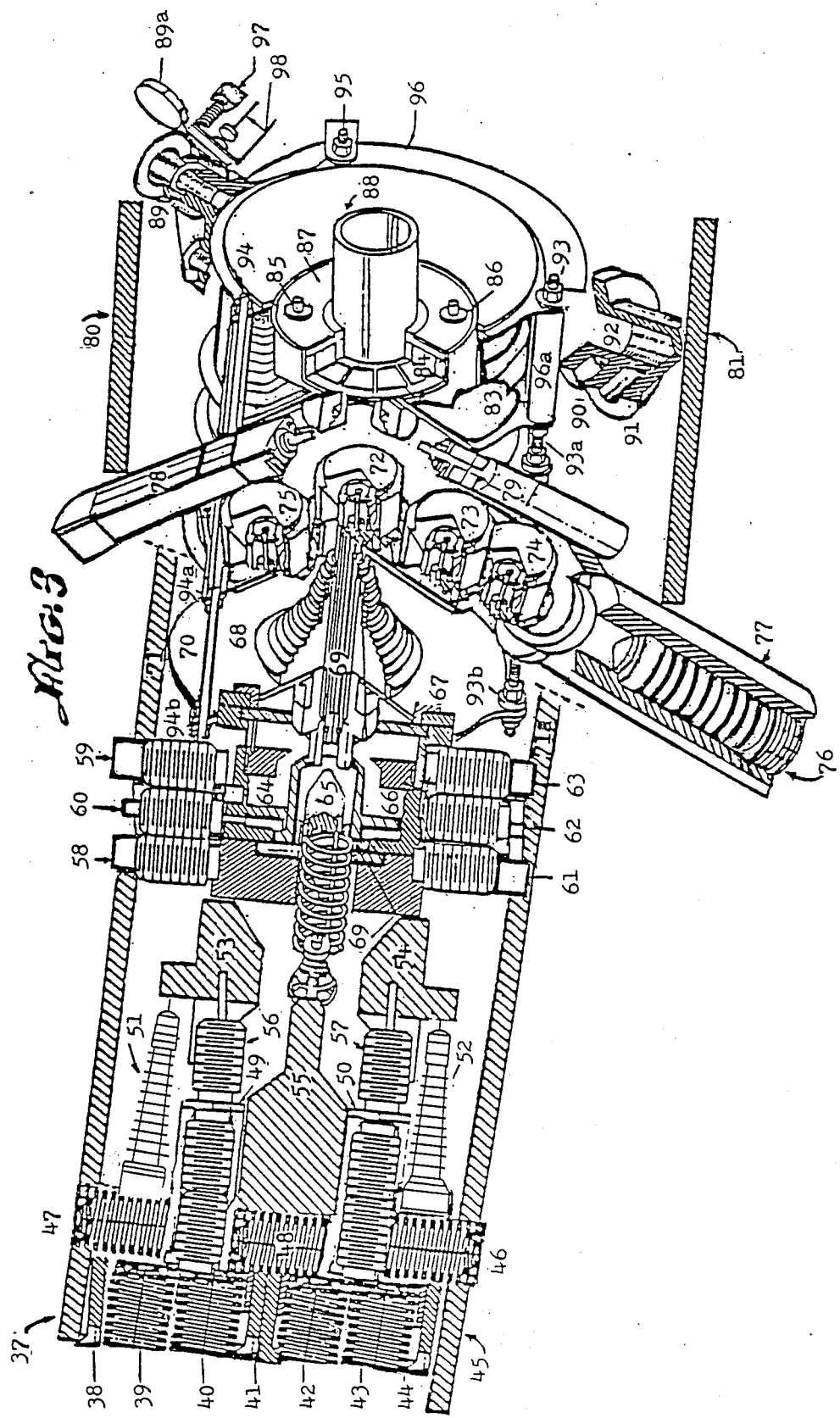

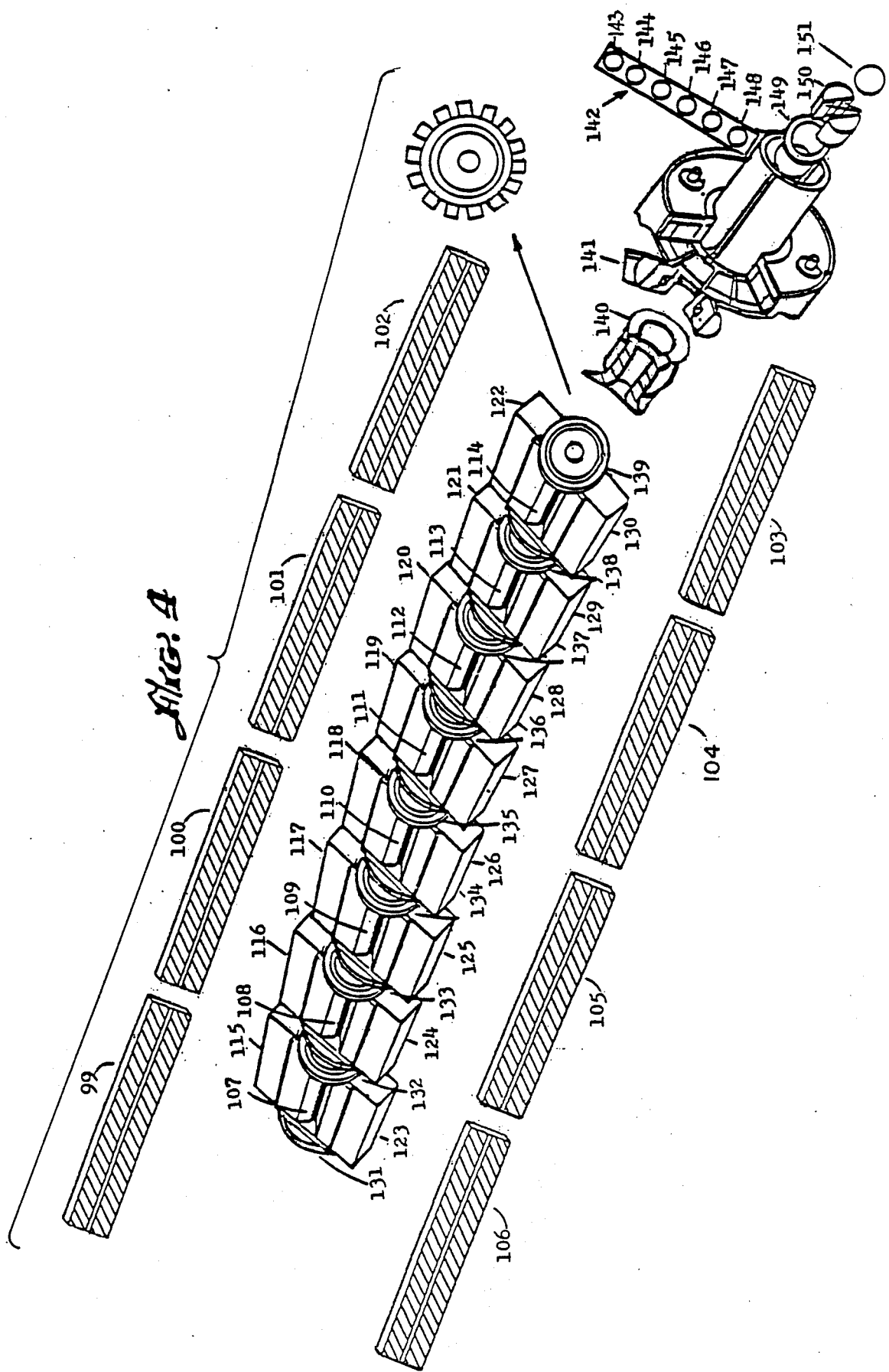

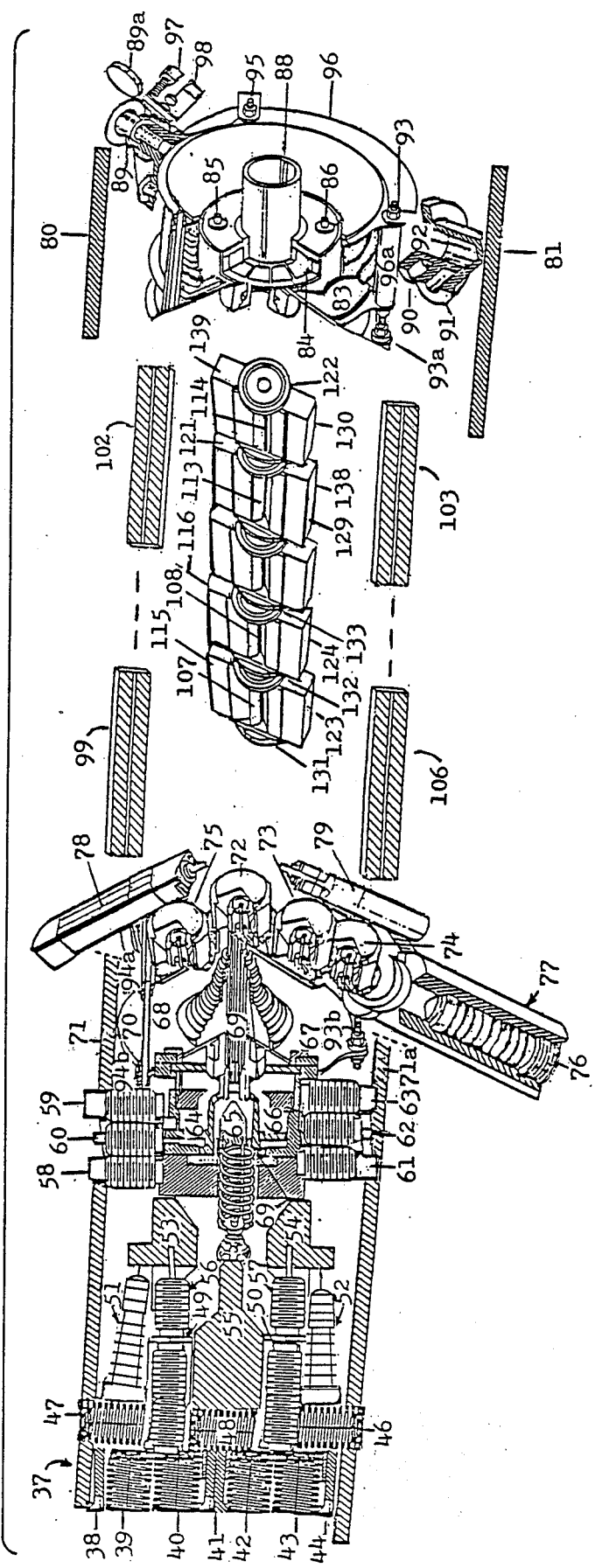

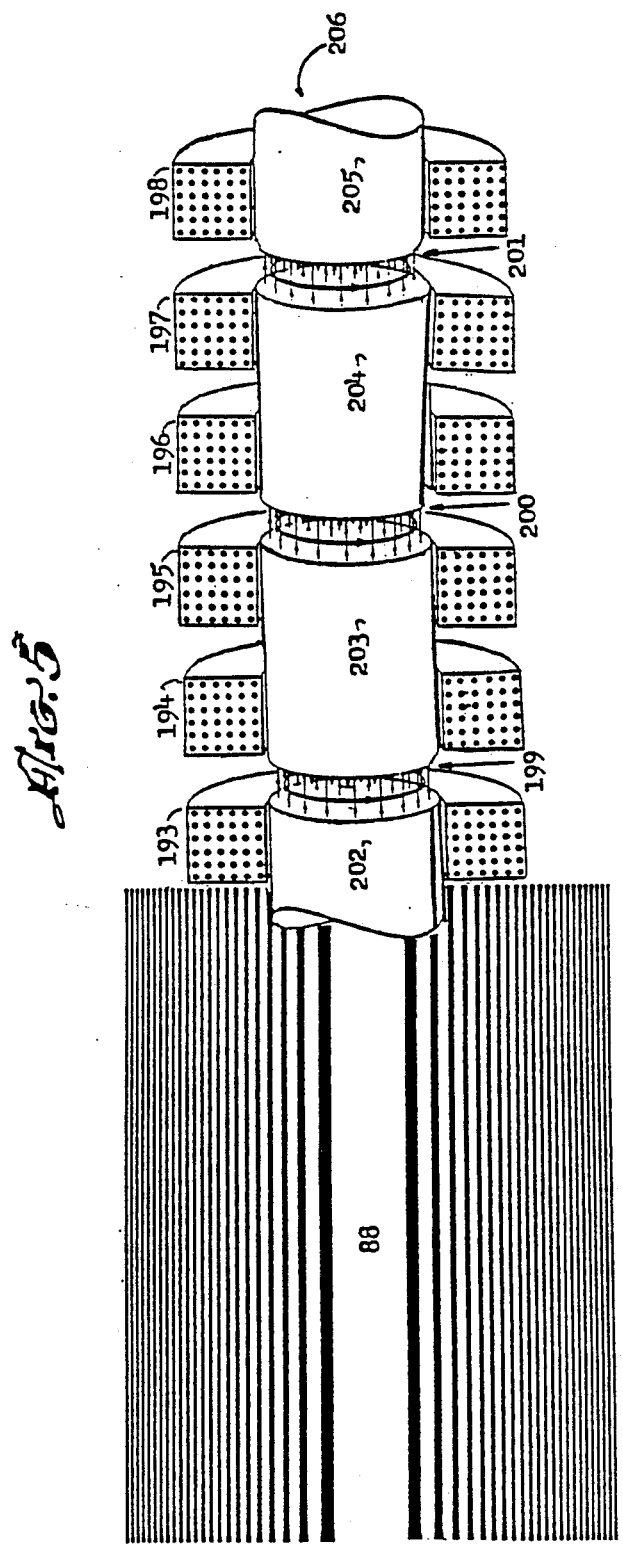

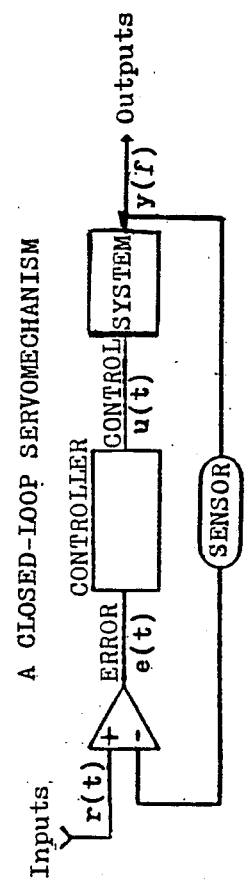
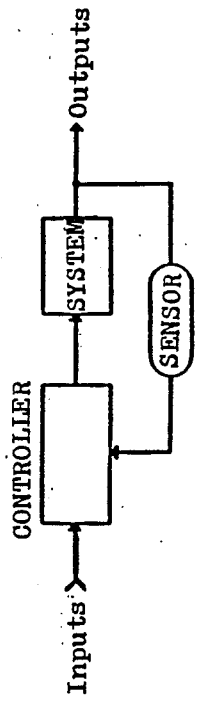
FIG. 5c

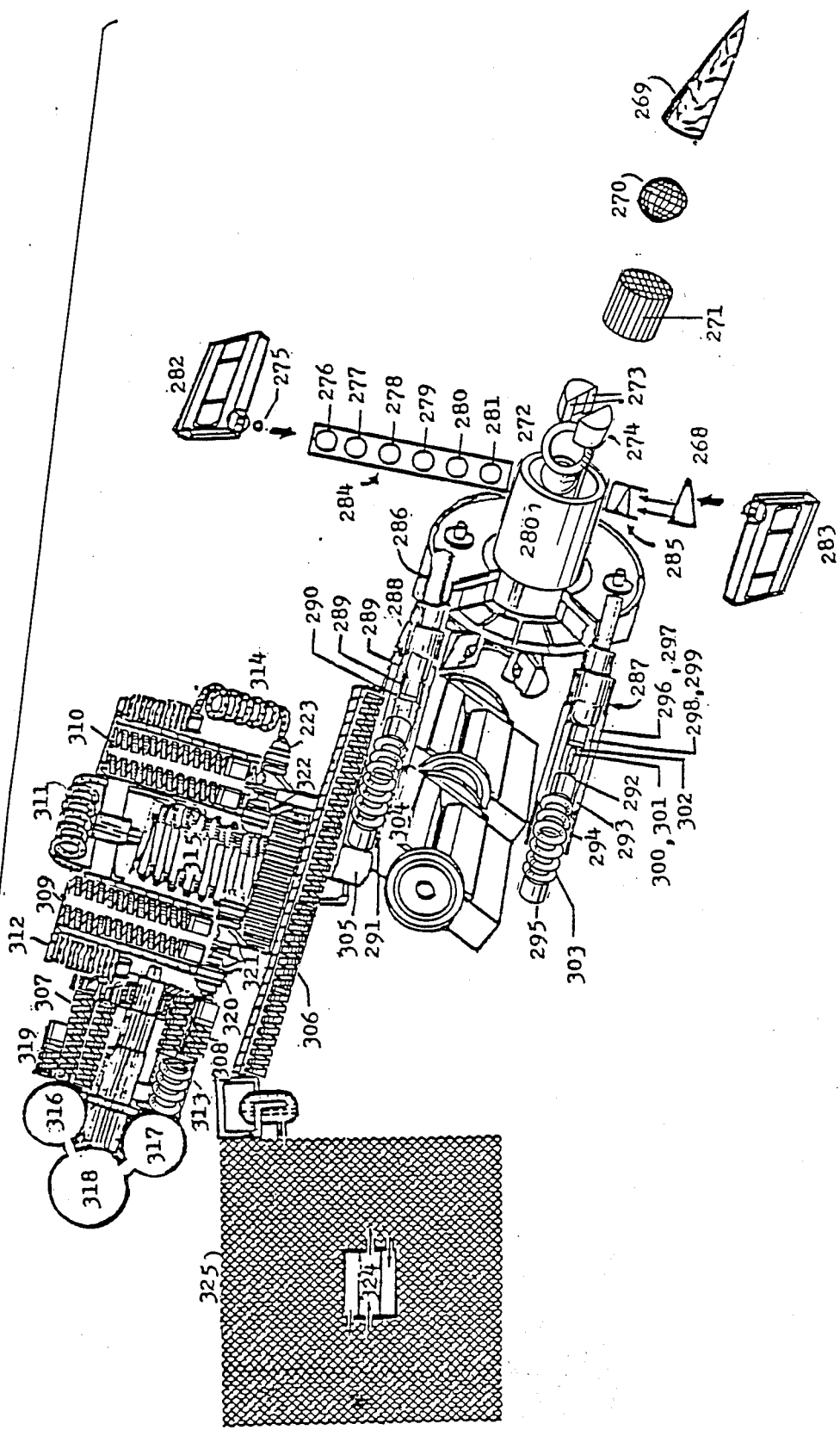

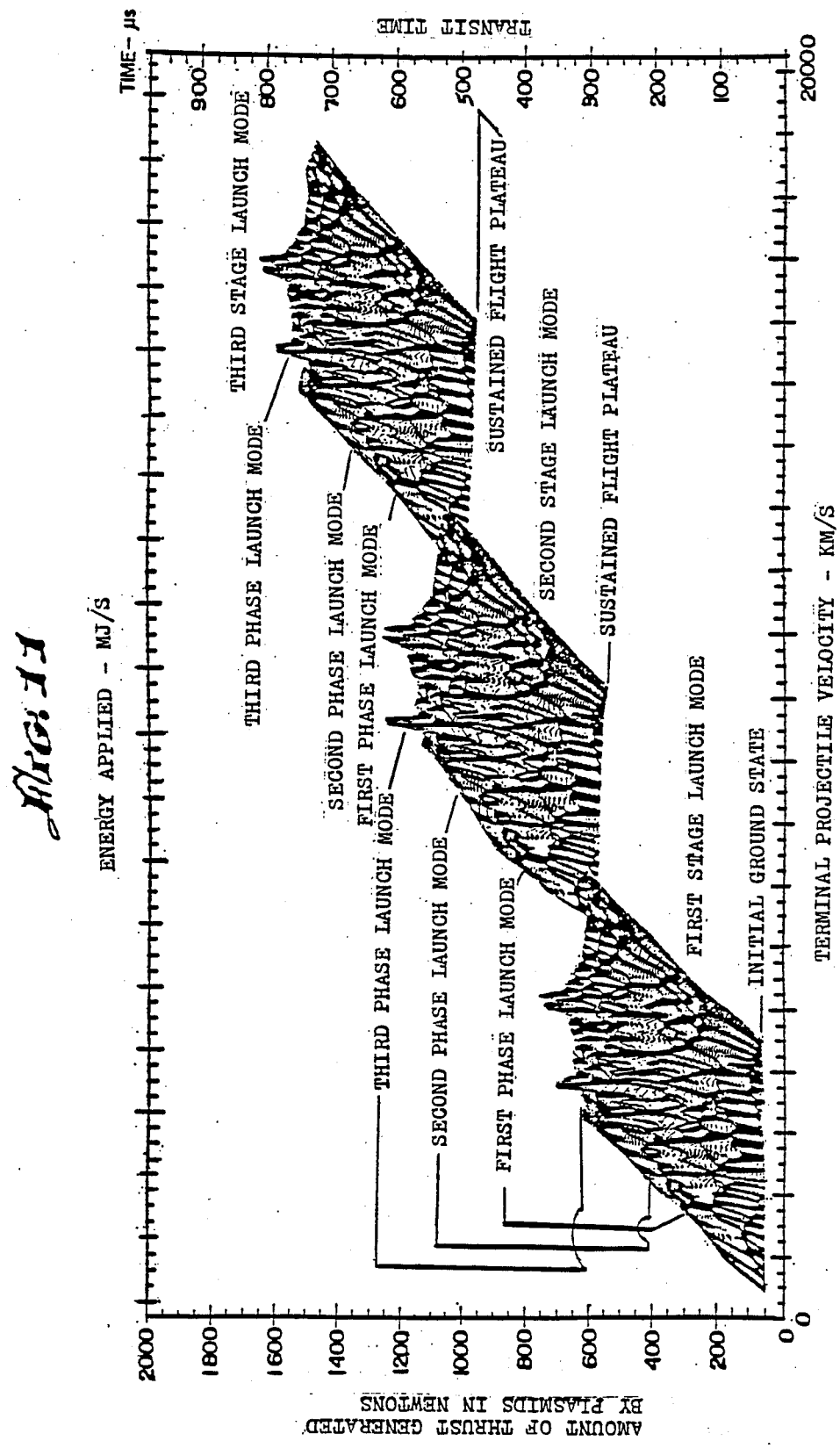

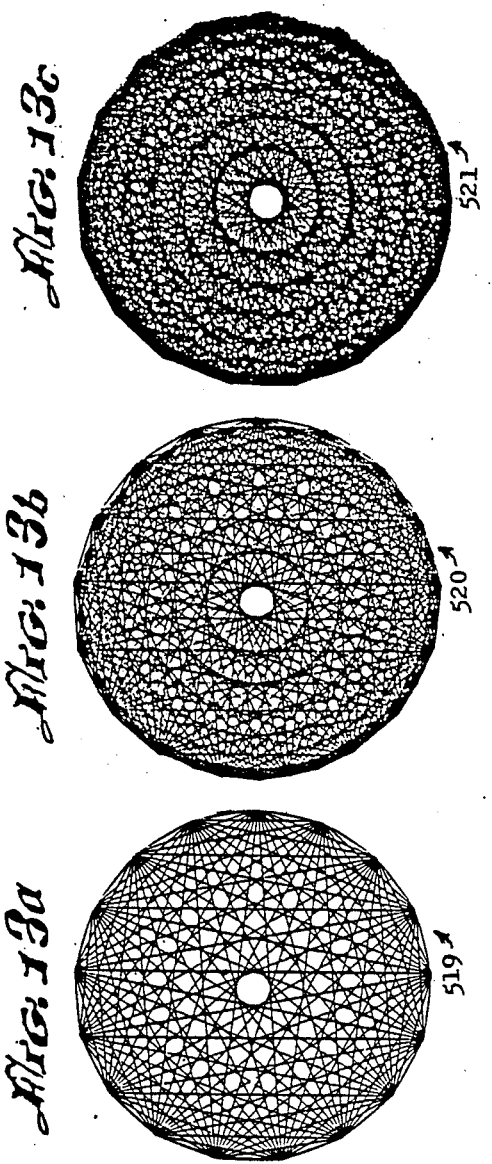

594 - 693

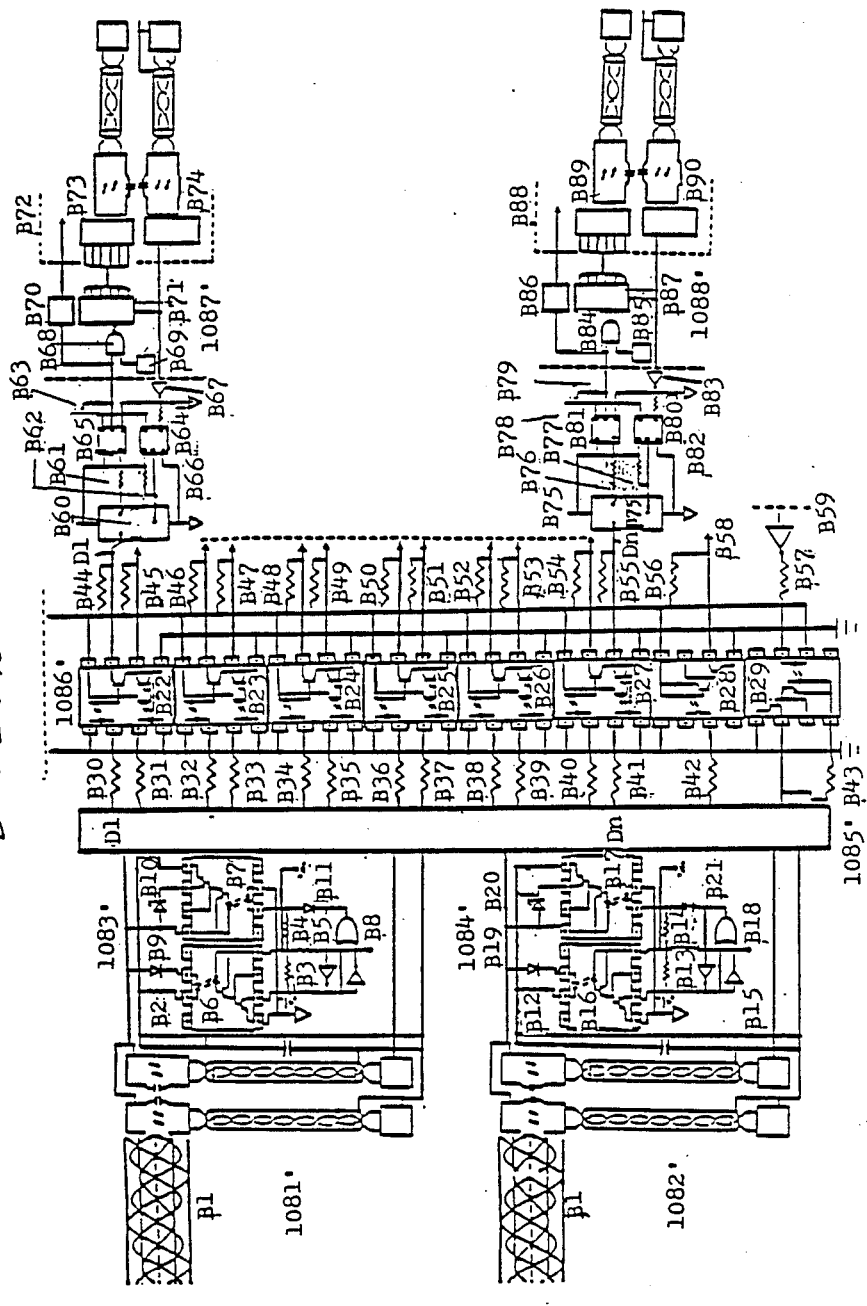

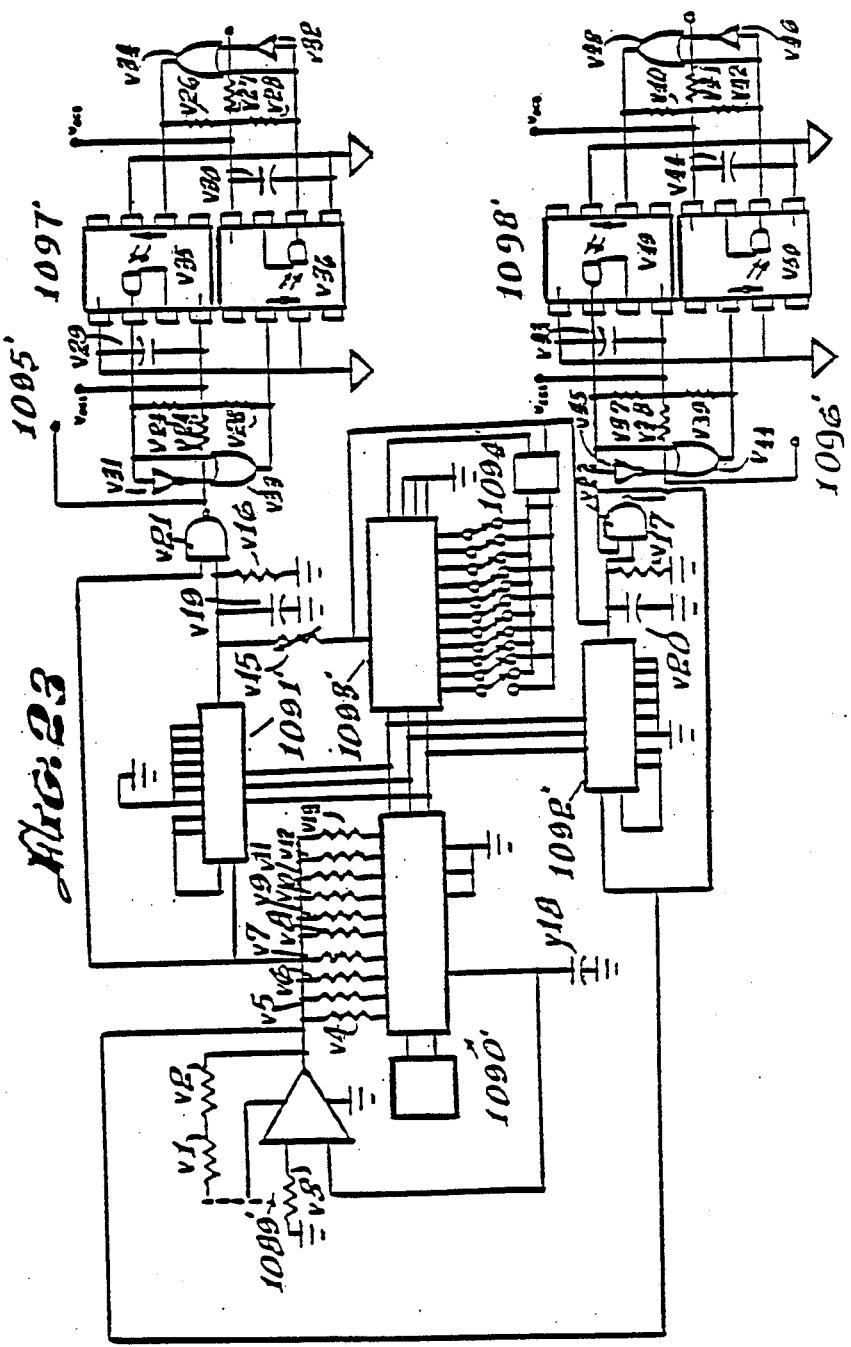

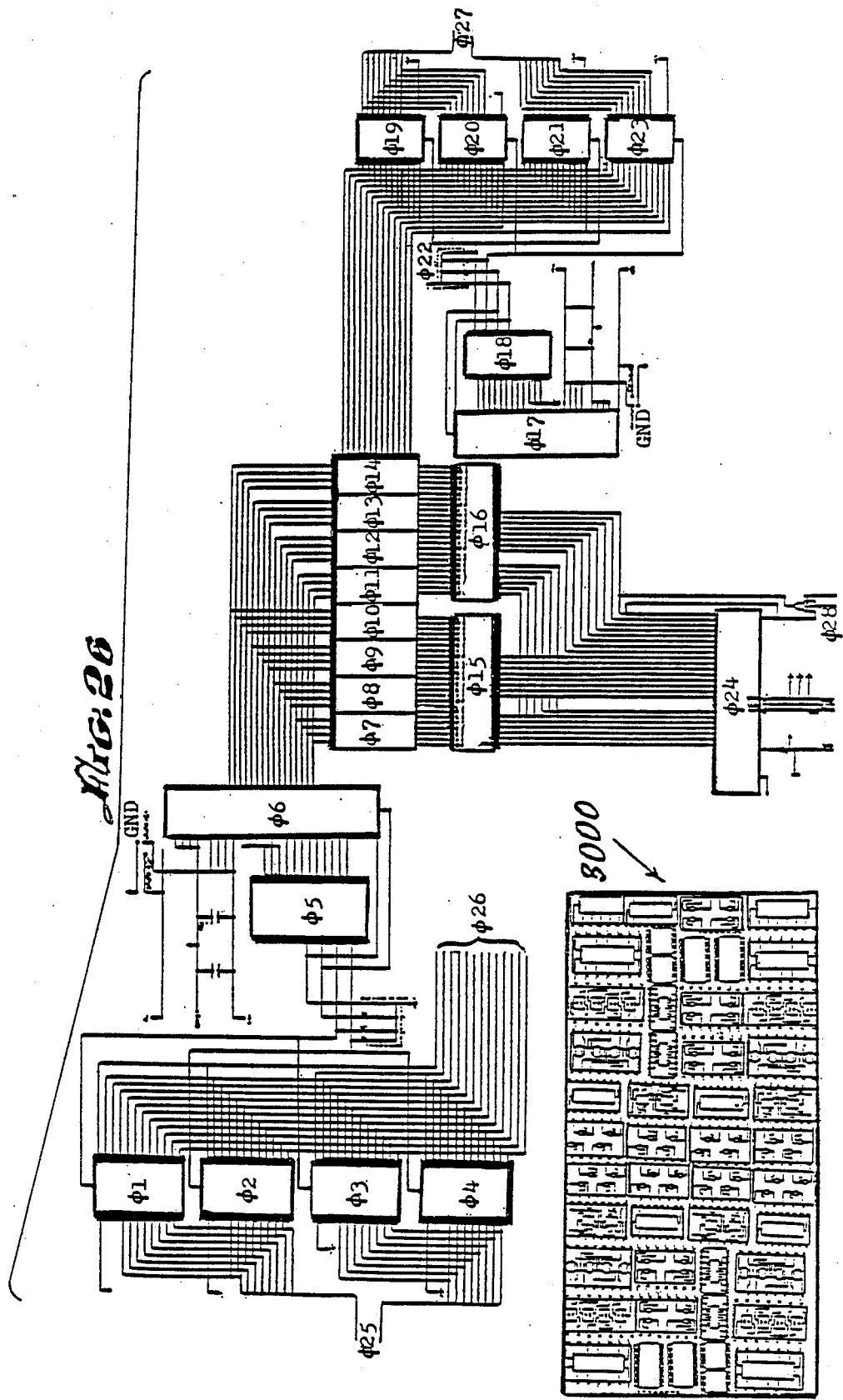

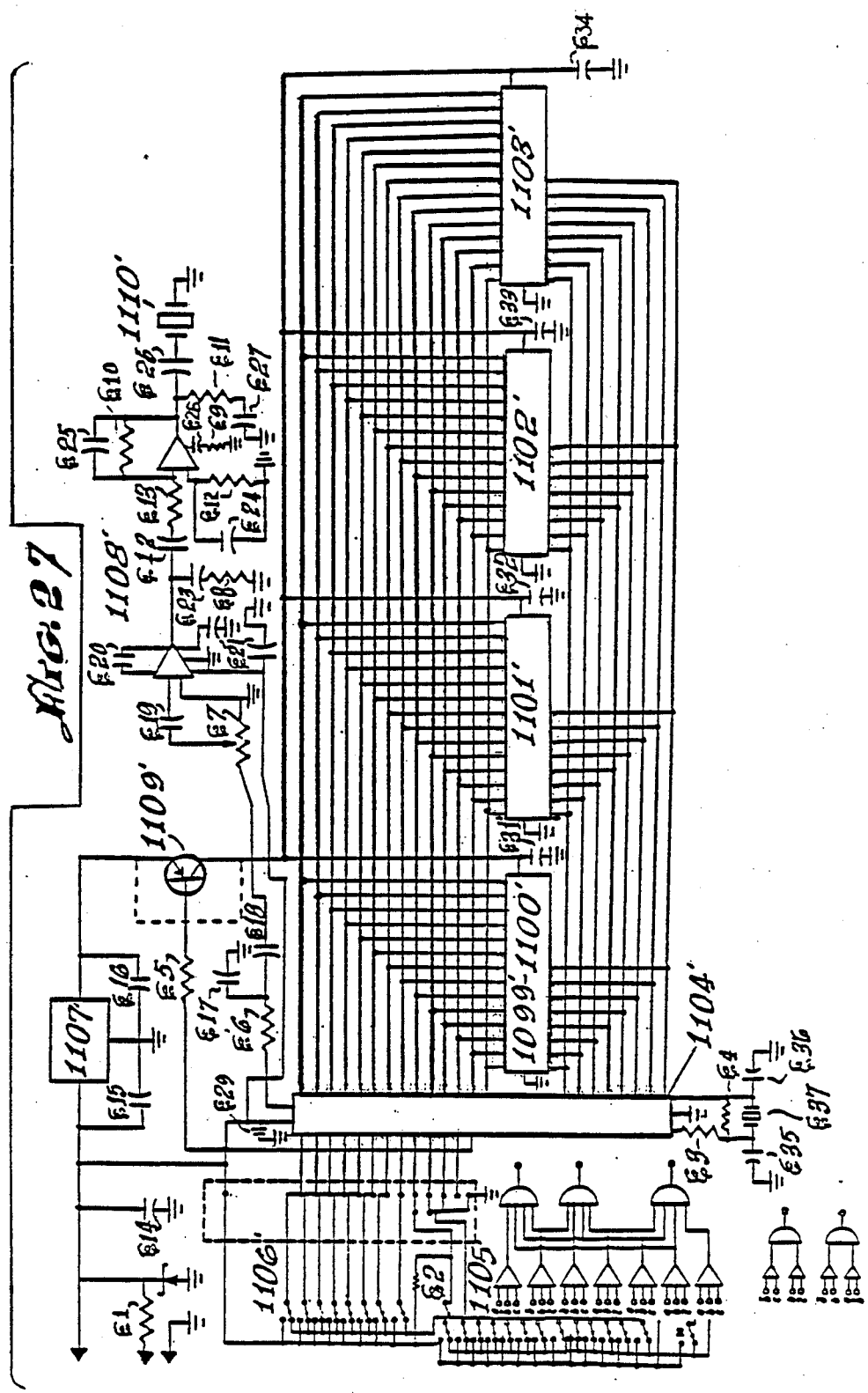

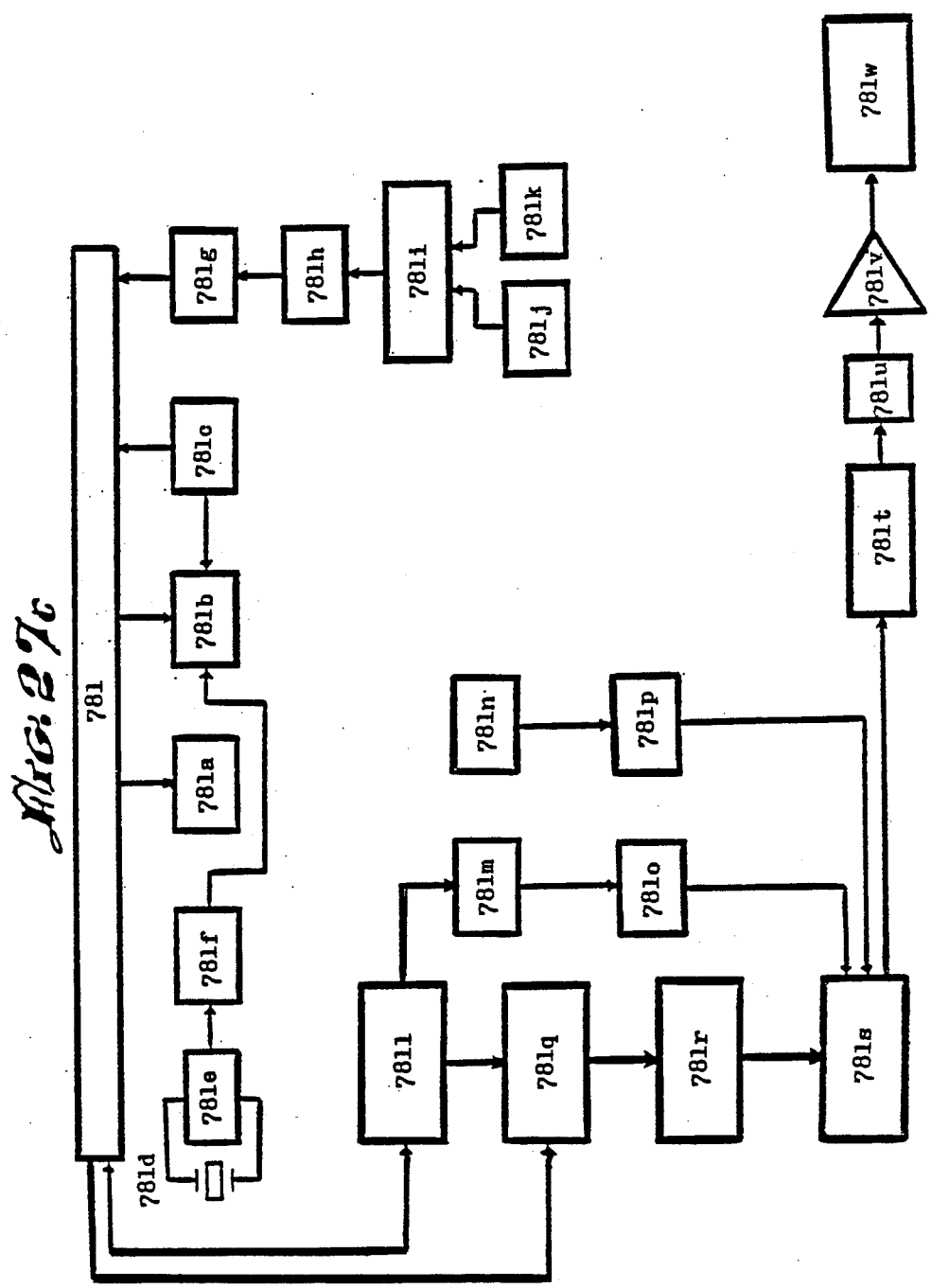

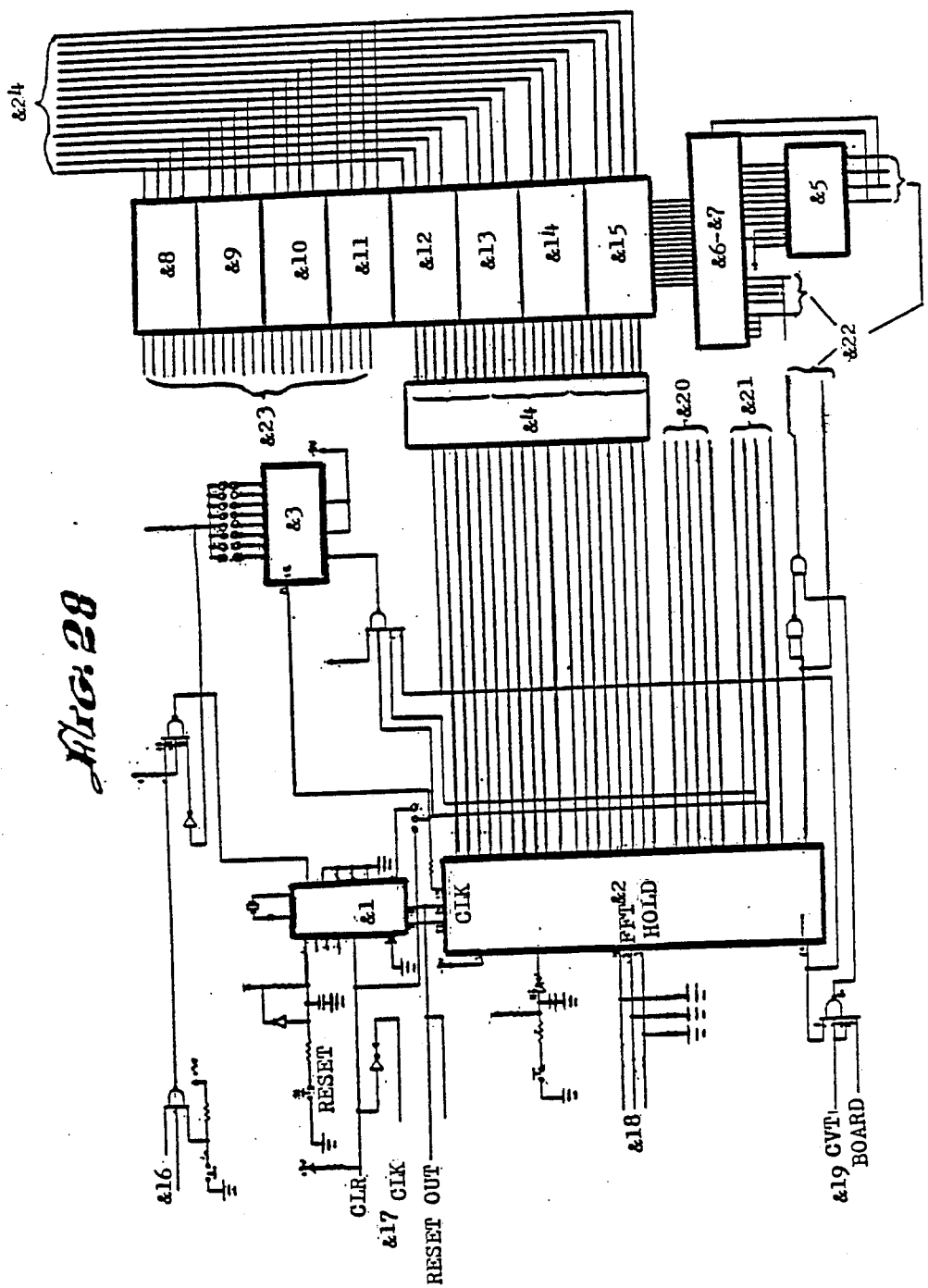

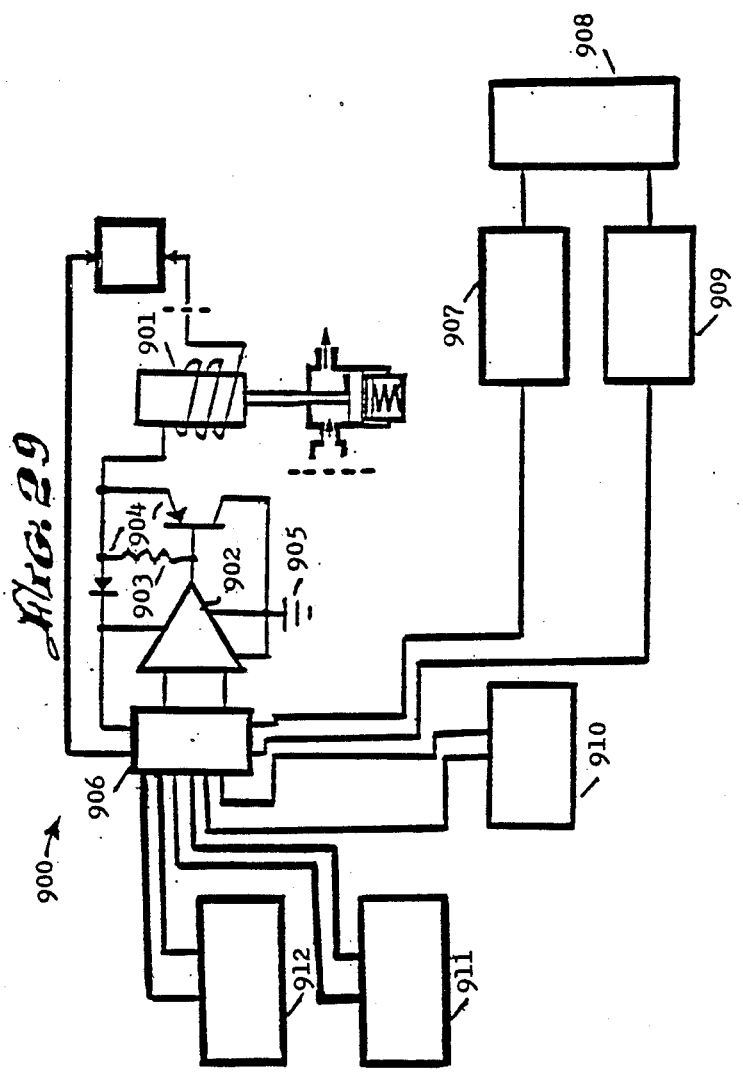

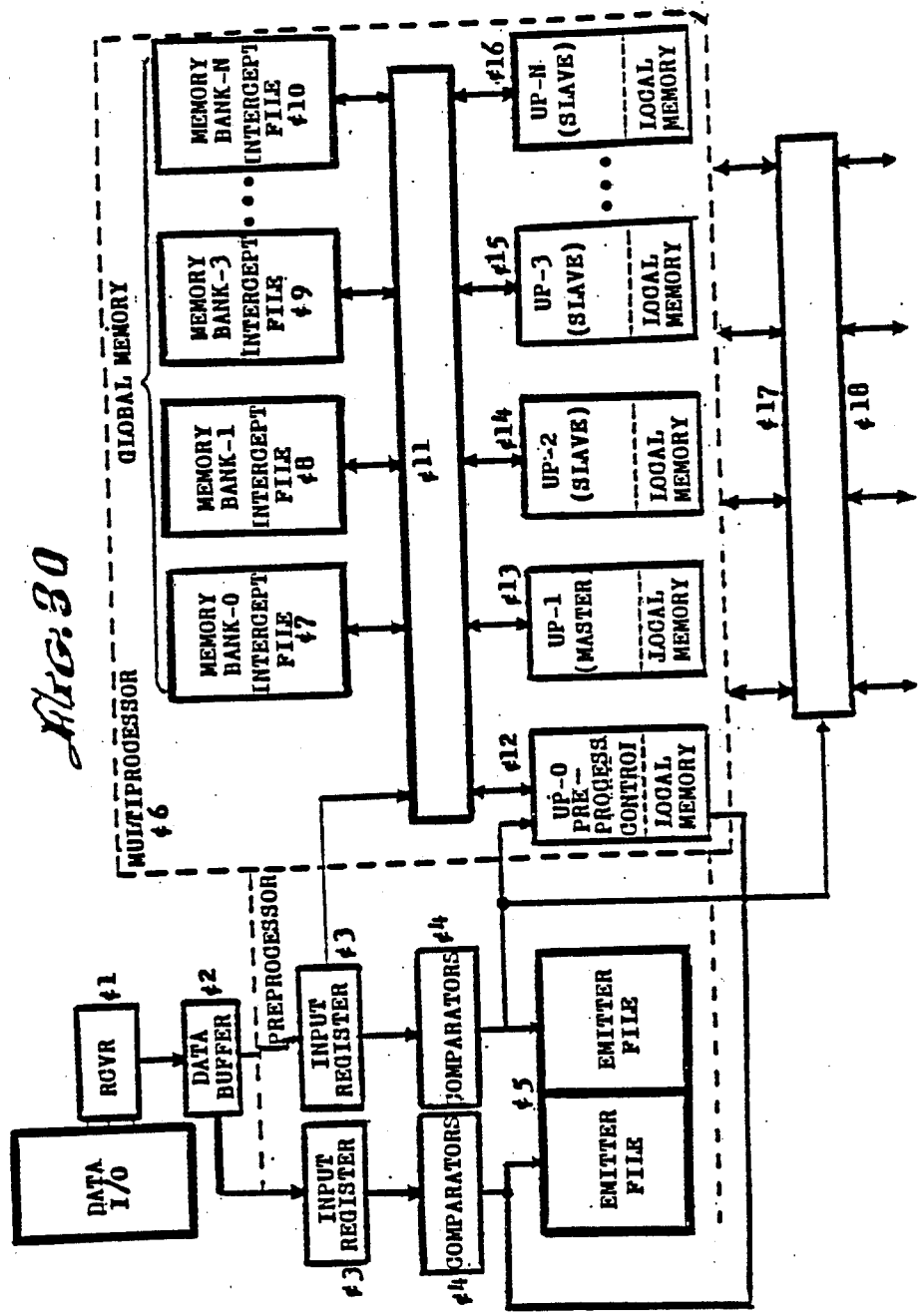

MASS ACTION DRIVER DEVICE

RELATED APPLICATIONS

This application is a continuation in part of application 06/590,283 filed Mar. 19, 1984, now abandoned.

BACKGROUND OF THE INVENTION

1. Field of the Invention

The scope of the invention resides in the logistic positioning and subsequent delivery of explosive devices by a mass action device. Said device must additionally bore a precise channel to some designated position wherein the aforesaid explovive is to be implaced and detonated within an exact interval of time. Further the types of explosives delivered range from conventional to nuclear or thermonuclear implosion devices, which provide a means wherein large scale subterranean vaults can be excavated with fused or vitrified walls; which are impervious to leaks from corrosives, toxins, radioactive residues or virtually any other substances.

2. Description of the Prior Art

Conventional means of mining consisting of variation in hydraulic or mechanical boring means, similar to the types successfully established currently by the oil and mining industry are numerous and well known by those skilled in the art. However, the above-mentioned present technology is often restricted to high cost differentials, inaccuracies and limitations in time and material such as, drill tubes, boring heads, lubricants and the like. Various high impact velocity boring techniques involving the sequential gas charged firing of hypervelocity projectiles composed of abrasives such as, chrodium borate, silicon carbide, industrial diamonds, or the like are several orders of magnitude faster than conventional oil drilling and mining techniques, but are limited to availability of materials. The upper limit concerning the efficiency of various high velocity impact boring techniques apparently lie in the drive means, the quanity and types of propellants utilized and the amount of suitable abrasives, available for any given operation. Faster more accurate mining techniques deploying ion torches and/or electromotive devices are provided by affilates of Dow Chemicals, TRW (contract F04611-79-C-0058 pulse inductive thruster) and the International Applied Physics d.c. rail gun system (contract F04611-79-C-6057).

The limitations of ion torches or conventional d.c. rail induction devices and the like are imposed by restrictions in power output and materials such as, reactants, oxidants, or plasmoid production rather than the wear imposed on mechanical or physical components utilized to bore through materials varying in hardness and densities. Examples of high energy laser or particle beam generators are presently ten orders of magnitude ($10^{10}$) more accurate than the aforementioned techniques and can yield a respectable four orders of magnitude ($10^4$) increase in speeds over existing ion torches or d.c. rail means. Examples of high energy lasers or particle beam generators reside initially in such state of the art devices represented by United States Letters Patents Portable Laser Device Pat. No. 4,276,520 and Patent Pending works such as the M.A.L.K.E. XL10 Device, A Simplified Structural Format, Ser. No. 522,331 both issued to the inventor hereof. Explosive techniques residing in the field of pyrotectics include dynaite (TNT) and shaped plastic explosives, which are well practiced and known by those skilled in the art. The limits of explosives tend to be contingent on the hardness and consistancy of the material to be excavated and the degree of accuracy desired, which directly effects the size and shape as well as the numbers of explosive charges deployed.

Restrictions placed on the use of conventional explosives rely on the scale of the operations, as in the case of creating an artifical canal, lake, or subterranean cavern to confine hazardous materials for several centuries or millenniums; wherein their use would be impractical because of the inordinate high costs, technical aspects and materials including the explosives themselves. Nuclear and thermonuclear explosive devices often lack the accuracy of any of the above aforementioned means and often require implacement by conventional mining techniques. The basic advantage of nuclear or thermonuclear devices is basically that they are reliable, one billion times or more cost effective for large scale operations than previously discussed methods and can under properly supervised conditions complete the entire operation within a matter of seconds or less. The obvious disadvantage of deploying nuclear or atomics pertain to radioactive fallout and residues secondary to the operations of such devices such as neutron radiation with atmospheric or meteorological consideration, which of course must be properly assessed prior to deployment. Present examples of the peaceful use of atomics reside in projects such as Plowshere, conducted in the U.S.A. from approximately 1964 through 1977, inclusive, with the last detonation taking place in 1973, programs initiated by Los Almos Nuclear Test Facility in conjunction with the D.O.D. and recent various operations conducted by the Soviet Union to release various previously inaccessible deposits of oil or natural gas and/or the subterranean excavation of storage sites in its Baltic regions. More specifically Soviet operations such as the creation of a crater in excess of one cubic kilometer in Semipalatinsk in 1965 and some more than thirteen underground nuclear detonations in the Astrakhan regions at depths ranging from 500 to 1,100 meters in layers of rock, salt and shale, producing extended irregular spherical cavities having a mean diameter of 45 meters and cubic displacement of 50,000 cubic meters.

Exemplary forms of electropropulsive acceleration, linear induction motors or related mechanisms will be briefly discussed in the prior art of Hawke, Kemney, Tidmen and others. The prior art of Hawke teaches a multiple stage rail gun accelerator sequentially energized by separate electrical energy sources longitudinally along the axis of the device. Additionally, the implementation of plasma arcs as armatures for accelerating the aforesaid projectile is taught by Hawke. Another type of multistage rail apparatus was introduced by Kemeny, patent Ser. No. 3,807,274 wherein electrical energy is serially introduced in stages to parallel rails, with a slidable armature and interrupt means, which effectively supplies current to successive portions of said rail, as the aforesaid armature travels from one end of said rails to the other end. The patent disclosure of Tidman Ser. No. 4,429,612 teaches the use of magnetic field or flux to focus the plasma charge inwardly along the central axis of the device against a tapered projectile and the implementatin of a sequential electrical discharge, wherein a current is provided through low density background gas by a series of anodes and cathode electrodes spaced along the path of said projectile. McAllister's patent disclosure No. 4,449,441 embodies an electromagnetic projectile launches, wherein arcuate conductive rails are brought together to form and augument said rails with a magnetic flux field to provide the necessary spin need for stabilization of a projectile. Patent disclosures No. 4,347,463 of Kemeny, Wilkens, et al. introduce electromagnetic launcher means with self augmenting rails, wherein in magnetic flux augmentation is initiated as the projectile passes from the breech of the device, which increases as the current to the rails decreases with a slidable armature disposed between the first and second conductor, acting as a means of propulsion for the projectile. Kemeny, Wilkens patent Ser. No. 4,319,168 teaches the use of an electromagnetic projectile launcher employing multiple current path armatures in an internal series augmented conductor rail configuration connected to multiple power sources. Additionally, patent No. 4,319,168 teaches successive discharges of multiple plasmas which act as conduction paths between conductors providing a means of propulsion for a projectile along said conductors in the presence of divider elements which prevent fusing of said plasmas.

Thus, there has been a long felt but unfulfilled need to safely dispose of hazardous waste materials, to acquire inexpensively previously known but inaccessible natural resources in the face of increased demands and dwindling reserves and to avert certain diasasters attributed to given geological stresses.

SUMMARY

The mass action hybrid device embodies a relatively large number of independent computer controlled arcing elements, differentially powered conducting rails, plasma discharge means, a radially symmetric array of Telsa electropropulsive generators and magnetic induction means which optimally operate to accelerate projectiles at high velocities towards predesignate targets. Multiple launch stages independently provides propulsion or thrust to projectiles in three separate and distinct stages. The first stage consists of introduction of plasmoid material in the form of wafers from cannisters. The wafers are metered and shaped into predetermined sections. The wafers exiting from a given cannister element are automatically feed into a loading chamber and conveyed from said loading chamber to a firing chamber. The firing chamber upon accepting the aforementioned wafer means automatically seals itself where upon an intense radial arc detonates and plasmatizes said wafer element(s). The rail elements which are circumferentially disposed around the internal bore additional conduct arcs along the internal surface of the bores. The separate rail-structure are electronically actuated in order to optimize the propulsive force initially supplied by the primary propulsion source. The second stage of propulsion consists of the radical introduction plasma from jets undergoing sequential ignition by intense arcing initiated by an array of Telsa coils circumferentially disposed along the interior bore of the cylindrical structure. The ignition of the secondary propulsion stage is timed to optimally add to the thrust provided by the preceding primary stage. The introduction of projectiles and/or explosives are optimally timed to coincide with the optimum thrust provided by the first and second stage. Multiple sequential firing of projectiles and/or explosive charges at high velocities provides for a near continuous operation, until supplies as propulsive means are exhausted unlike previous devices. The third or ternary means or propulsion occurs as magnetic fields are uniformly distributed or selectively actuated by magnetic induction coils circumferentially disposed along the exterior of the barrel or central bore of the device. The separate electromagnetic elements are more versatile and of a different design than those cited in previous art, the separate and distinct magnetic elements having the capacity to be actuated differentially along the length of the barrel selectively altering polarity and/or force of the magnetic flux. The magnetic flux provided by the circumferential array of electromagnetic elements not only shape or focuses the stream of charged particles forming the plasma, but assists propulsion by levitating or suspending aforementioned projectiles consisting of armor piercing projectiles or explosive charges. Projectiles whether armor piercing or explosives are slide loaded in rapid succession from magazines located in the front bore section of the device.

Proposed nuclear or thermonuclear mock ups devoid of fissionible and or fusionible materials were constructed, but not implemented in order to comply with various governmental restrictions. Plastic explosives were substituted initially instead of subcritical nuclear masses of suitable materials. The aforementioned mechanisms placed in the general category of hyperatomic devices; wherein nuclear implosion are initiated by means other than 'the detonation of explosives. In the embodiment of a hyperatomic device unique variations of well known devices are deployed in a novel manner to promote implosion. Specially designated radiofrequency coils energize the spherical centroid of the subcritical nuclear mass, until it is virtually excited into a plasma or near plasma state. The plasmatized state of the said vaporized constituents expands radially outward wherein it encounters an immense counter compressional force directed radially inward towards the same said centroid. The aforementioned counter force is generated by the simultaneous activation of several novely designed miniature mass action driver means circumferentially located around the designated subcritical mass. Contained within the embodiment of the equivalent mass action drivers is an assembly of projectiles, electrostatic generator, storage capacitors and electro-optical timing sequencers. Each projectiles means containing within its framework a suitable neutron source such as beryllium which is placed in close proximity with a given initiator therein consisting of any suitable alpha emitter source. Copious quantities of highly energetic neutrons are produced, as the beryllium reactant is engaged by the alpha emitter in a manner indicative of the Chadwick reaction and conductive to the initiation and subsequent propagation of a chain reaction in the subcritical fissionible mass U235 or PU239, wherein the critical factor $K<1$ approaches $K>1$, which is a process well understood by those skilled in the art and employed in accordance with the invention.

The launch device consists of three separate modes of propulsion. The first primary propulsion thrust for the delivery of projectiles to a series of specified target sites is provided by a series of charged d.c. rails associated with an arc and conductor means. A secondary propulsive force or impetus is provided by a circular cohesive array of multivariant charged beams of ionized particles introduced in a radial manner along the central axis of the device immediately after the discharge of the plasmoid bodies initiated by the arcing process. The plasmoid masses travel along the charged cavity consisting in part of a series of conducting rails acting in concert to propagate the stream of plasmoids. The ternary means of propulsion sustains the advancing plasmoid mass by a series of conically circumferentially arranged magnetic induction coils which collectively focus the force of the energy plasma prior to and during its engagement with an intended projectile. Projectiles of a determinate size and weight ranging from less than 100 grams to pay loads in excess of 100 kilograms are hurled along a predetermined automated glide path at velocities approaching or in excess of $1.5 \times 10^6$ m per second. Projectiles are side loaded from magazines in a manner such that a balistic projectile formed from hardened composites precedes a balistic projectile containing explosives and in so doing a subterranean channel therein through which the explosive means follows to engage a designated target centroid.

The arcing process, charging and discharging of the rail assembly, the injection of plasmoid and variance of the magnetic induction are all automated in a precise fashion to optimize the above mentioned process assisted by electro-optical systems interphased with commercially available VLSI technology with complete sequencing response cycles in the nanosecond range, a necessary ancillary embodiment of the invention and consistant with the operation of said M.A.D. hybrid device.*

*Also described in the specifications as mass action driver device, M.A.D. device or unit.

BRIEF DESCRIPTION OF THE DRAWINGS

FIG. 2 is a detailed perspective of the main assemblage of structures forming the main body of the launch cylinder;

FIG. 3 is a detailed cross-sectioned view of the main body of the hybrid M.A.D. unit disclosing the three major launch systems which provides thrust for projectiles;

FIG. 4 is a detailed perspective view of the modified rail gun assembly;

FIG. 4c entails an exploded view of the mass action driver device described in FIGS. 3, 4;

FIG. 5 is a detailed partial view of the special feroceramic magnetic induction coils and plasma flow through the cylindrical launch tube interlock;

FIGS. 5b, 5c are block diagrams describing the basic disposition of solenoid means incorporated within automated servo mechanism systems associated with feedback loops embodied within the aforesaid mass action driver device;

FIG. 6 is a detailed perspective view indicative of the closed loop coolant system, cycling and heat exchanger means, and projectile insertion launch means;

FIG. 6b is a detailed illustration of four microcoiled heat exchanger elements forming in part the coiled heat exchanger units mutually disposed between the plate means of the heat exchanger grid pair described in FIG. 6a;

FIG. 11 is a graph describing the relationship between the thrust generated by plasmids and the exit velocity;

FIG. 12 is a graph detailing the effect of resistant forces upon projectile acceleration;

FIG. 13a is an illustrative view of the spun or woven extruded synthetic thread wound around the explosive means to insulate it against heat and to lessen the kinetic perturbation produced by extremely high g-factors and impact effects;

FIG. 13b is a higher density wind of the same said synthetic thread depicted in the preceding FIG. 13a;

FIG. 13c is an additional perspective view of the same said equivalent synthetic structures described in FIG. 13a and FIG. 13b, however the density or number of winds is greatly increased;

FIG. 22 depicts a partial schematical representation and block diagram of another exemplary form of optical electronic analog/digital converter unit contained within the embodiment of the M.A.D. structure;

FIG. 23 is a generalized schematic of a simple multiple tone generator means;

FIG. 26 is a greatly generalized schematic portion of a VLSI logic circuit for the embodiment of target acquisition, thrust parameters and the I/O like processes;

FIGS. 27, 27a, 27b and 27c describe concisely the filter topologies embodied within the speech processing elements and block diagrams of the operative systems embodied within said speech processing element;

FIG. 28 is an over simplified timing sequencer, controlling projectile dispersal, thrust parameters of injection of plasmoids and parameters governing the transmission of power;

FIG. 29 is a combination circuit and block diagram disclosing the operation of an automated solenoid motivator means equivalent to those elements embodied within said device;

FIG. 30 is illustrative of a block diagram perspective denoting only one of the equivalent microcomputer array processor elements deposited on the VHSIC card;

DETAILED DESCRIPTION OF THE INVENTION

Figure 1:
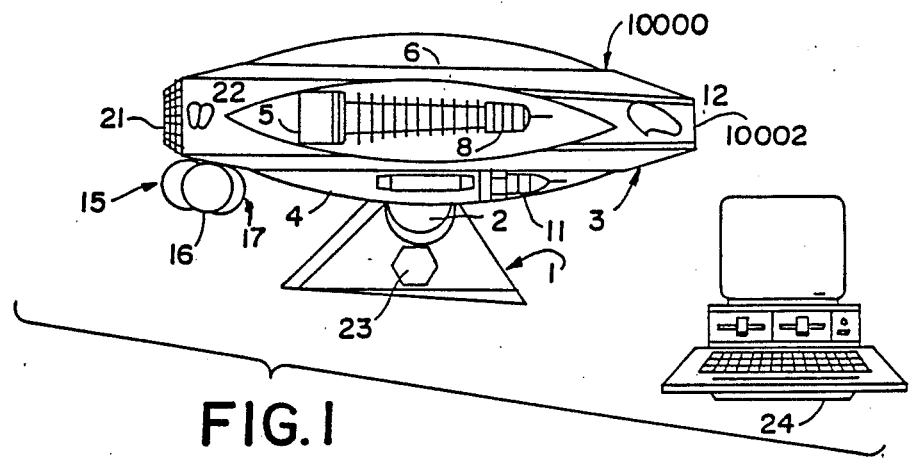
FIGS. 1, 1a and 1b are pictorial perspectives of the mass action driver device's exterior views collectively describing a side elevation, plan view, front and aft views of said device.
Figure 1A:
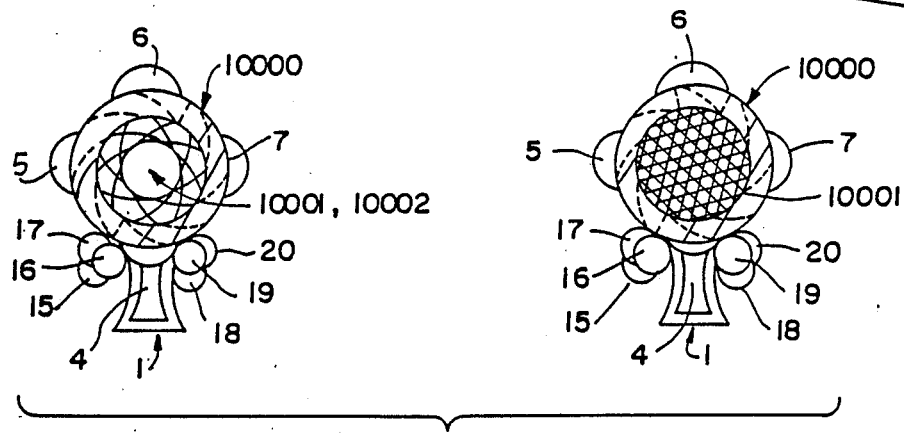
Figure 1B:
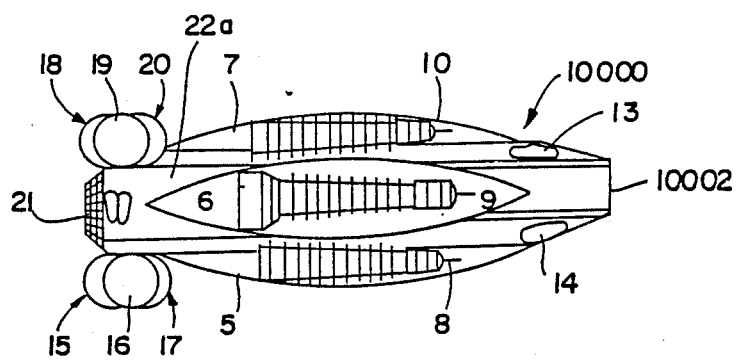

FIGS. 1, 1a and 1b disclose a side elevation, plan views and external perspective views of the primary launch vehicle or modified mass action driver device (M.A.D.) described herein by numeral 10000. The said M.A.D., unit 10000, is constructed in a manner as to direct projectiles down an effective boresight designated by number 10001 which coincides with the units central axis denoted by numeral 10002 wherein projectiles follow a predetermined automated glide path in an effort to service one or more specified target centroids. The main body of the aforesaid device herein is situated or mounted on a suitable commercially available rotating pod or turret described by nuneral 2 which articulates in a specific manner providing azimuth as well as horizontal rotation in 360 degrees, with sensitivity to the nearest milliradian. The articulating pod numeral 2 is mutually disposed above a stabilization platform denoted by number 1. Hence platform 1 supports the entire embodiment of the said device 10000 and the articulating pod, number 2.

The said platform means contained within its embodiment an energy source, unit 10003, which is specifically designed to power the unit. The outer casing of the device is described by number 3, whereas the encasement housing a series of charging capacitors and charging coils is described by four cylindrical projections numerals 4,5,6, and 7. Numerals 8 through 11 denote the said charging means. Projectiles, plasmoids, explosives and the like are side loaded from magazine elements 12, 13 and 14 whereby the expendables are automatically loaded into the main frame of the device prior to their subsequent ejection from said device.

Six reservoirs described by elements 15 through 20 are located aft of the unit providing the necessary additional volatile plasmoid cyclants to a series of Tesla coils, not shown. A heat exhaust grid numeral 21 is provided in the extreme aft section of the unit proper whereby a closed system coolant is repeatedly cycled by pump means 22 and 22a, wherein internal component systems are optimally cooled. Numeral 23 is a protective enclosure housing a microcomputer complex, denoted by element 24, which is responsible for user assisted target acquisition, target designation and interphases with various internal subunits providing synchronization of projectiles and providing temporal continuity of propulsive systems via a network of bidirectional fiber optics, electrooptical systems, not shown.

FIG. 2 depicts a somewhat more detailed view of the tubular assemblage of cylindrical overlapping and interlocking plates arranged to form the muzzle of the device. The outer casing of the device, 25 and 25a is composed of a light weight epoxylated alloy of chromium, titanium and magnesium which is preceded by an elastic ceramic composed of boron nitrate elements 26 and 26a. Structures 27, 27a, 31, and 31a are constructed from a fibrous mesh of a polymorphic silicon such as commercially available Kalvar or other similarly suitable materials. Lamination sheets, 28 and 28a are interposed between elements 27, 27a and 29, 29a, the later consisting of a highly resilient stainless steel alloy. Elements 30, 30a, 32 and 32a are composed of a commercially available alloy of molybdenum tungsten halide, which is affixed or laminated to structures 33 and 33a, which are composed of a tridirectional synthetic carbon or graphite reinforced epoxylated medium. Circumferential tubular structures 34, 35 and 36 are geometrically graduated, such that, each can insert into the other preceding structure, wherein each is laminated to the other. Ancillary structure defined by elements 34a through 34d, 35a through 35d and 36a through 36d, respectively are equivalent to structures 25 through 33. Hence each tubular structural unit is equivalent to the next which provides a single unitary perpendicularly reinforced assemblage of complementary multivariant structures, each of which is bounded, fused, or laminated to the other.

FIG. 3 affords a detailed cross-sectioned view of the main body of the M.A.D. device. Numerals 39, 40, 42, 43, 46, 47 and 48 define in part a capacitance bank and light weight feroceramic transformers, which are stacked in the aft section of the device in a radial manner. Elements 38, 41 and 44 are indicative of non-conducting spacers. Numerous 37, 45, 80 and 81 are illustrative of angular cylindrical support structures. Numerals 49, 50, 51 and 52 are voltage acceleration coils leading to common anodes defined by numerals 53, 54, 56 and 57. The common body of the cathode structure are defined by elements 55, 65 and 65a. Structures 58, 59, 61 and 63 denote in part a portion of the closed system coolant means, which is deployed to cool the anodes, cathodes and other structures. Numbers 60 and 62 are additional voltage acceleration coils conducting high voltage charges leading from a series of external charging capacitors and charging coils. Elements 68, 69 are the extended portions of the cathode and anode means, whereas 67 represents a non-conducting structural support strut or stay means. Numerals 70, 71,66 and 71a are enlarged support bushings and two of at least four support struts. Structures 72, 73 and 74 are cannisters bearing wafers of a suitable solid plasmoid (cesium, copper, mercury, teflon etc.) and internal locking cathode/anode means. Numeral 76 contains a multitude of cannister structures; whereas numeral 75 is indicative of a faulty cannister means, which has been placed in an exclusion chamber, ready to be ejected from the main frame of the device. Structure 77 reveals in part the loading chamber and autofeed means for the aforementioned cannister elements 72 through 76. Numerals 78 and 79 reveal in part portions of the Tesla coil complex, which adds both additional arcs and a secondary surge of plasmoids. Numbers 80 and 81 refer to a previously mentioned cylindrical support plates. A complex of primary induction magnetic coil 82 and 83 structure placed circumferentially along the primary launch tube 88 provide an additional source of propulsion and prapagation of motion. Extended charging rail structures denoted by number 84 provide a secondary means of propulsion for projectiles interjected into the central chamber of structure 88. Numerals 85 and 86 are two of four structures which conduct or circulate coolant to reduce the temperature of the launch tube 88 and the d.c. rail housing denoted by number 87. Numerals 89, 90, 91, and 92 are interlocking chambers leading to launch tube 88 for expelling explosive and armor piercing projectiles, respectively. Locking bolts are provided for all support struts, three of six which are indicated by elements 93 through 95. A locking plate 96 is provided for interlocking bushings, one of which is illustrated by number 96a, which acts as tubular guides for the support strut means. An orifice closure mechanism numeral 89 operated by bidirectional loading solenoids 97 and 98 opens and closes to allow each projectile to be emitted, allowing a machined precision stopper top 89a to slide over means 89.

Figure 4B:
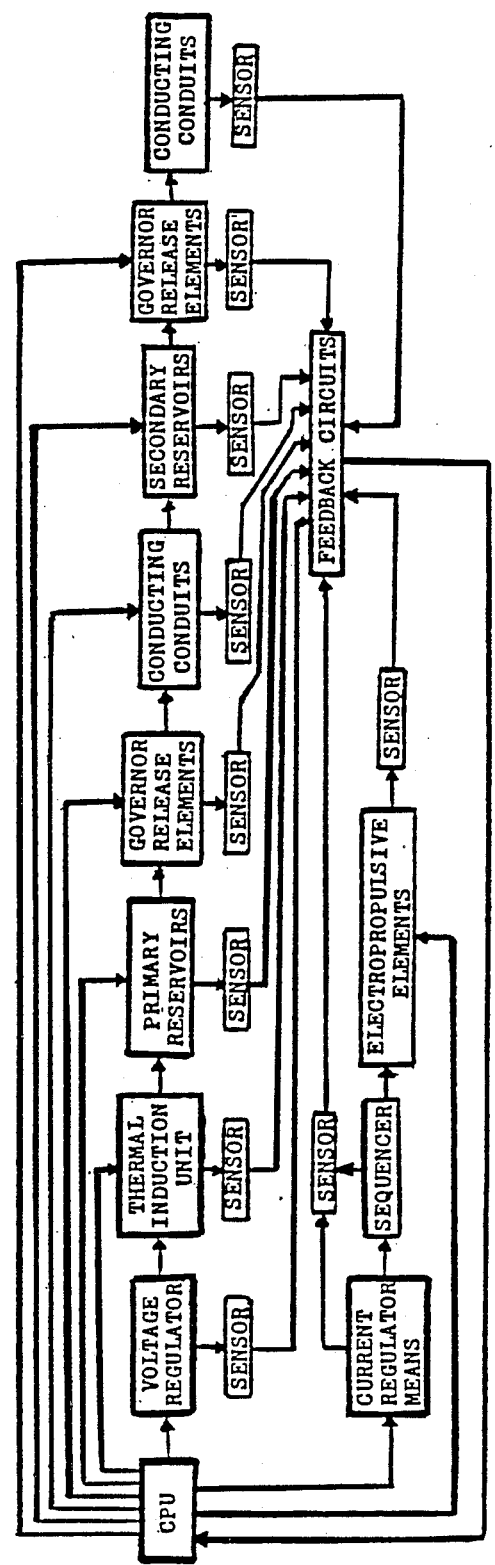
FIG. 4b is a block diagram detailing the operation of the mechanism by which conductive surface of the electropropulsive elements are restored.
Figure 4A:
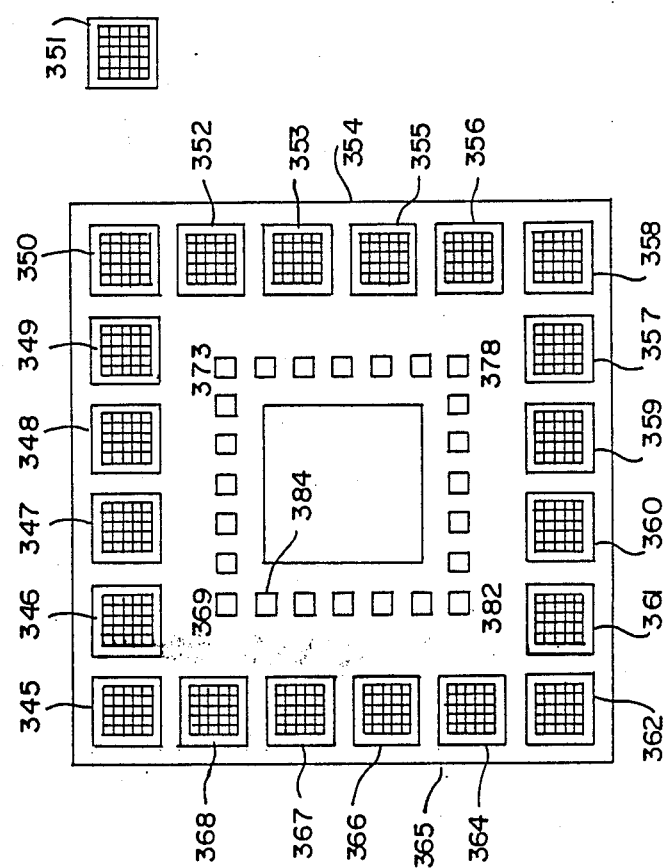
FIG. 4a is a detailed cross-sectioned perspective of the multiple rail assembly.

FIGS. 4 and 4a provides in brief an additional perspective view of the d.c. rail system, the launch orifice and the projectile loading means. The d.c. rails are described in part by numerals 99 through 106 and insert into central loading orifices designated by numbers 107 through 114. Numerals 115 through 130 reveal in part the external housing for the rails and orifice slide means described earlier. Elements 131 through 139 are the interlocking mechanisms for each section of the conducting orifice. Numerals 140 and 141 illustrates in a sectional manner a single interlocking means, which leads to the central launch tube. Element 142 houses projectiles 143 through 148. Numerals 149, 150 and 151 are chargeable metallic insert tubule and container means housing projectile 152.

FIG. 4a reveals the rectangular array of d.c. rails each separated from the other by non conducting elastic ceramic material. The aforementioned d.c. rail means are designated by numerals 177 through 192, whereas the separate elastic boron nitride silicon ceramic elements are defined by numerals 153 through 176.

The aforesaid non-conducting mechanism consisting of silicon borate and silicon nitride is a composite material. Said composite material is rendered sintered or porous by methods of radial bombardment with an alpha emitter, chemical etching, or other means in order to reduce the effects of extremes in temperature and pressure. The effects of temperature and pressure allude to irreversible structural deformation and fracturing of the lattice structure. Extremes in temperature and pressure are more readily dissipated and/or compensate for by sintered ceramic structures than solid ceramic structures composed of similar materials. Further the aforesaid ceramic material is embedded within an elastic matrix, which renders the overall structure resilient and compressible, retarding fracturing or related processes.

The dimensions and parameters discussed herein below relate to a device of the invention with an effective bore size of 10 mm; however it is to be understood that the aforesaid parameters and ancillary systems will vary directly with the size of said device and should not be construed in a limiting sense. Each rail of the complement is equivalent to every other rail of said complement being 20 mm in height, having a length of of 80 mm per segment with a radial or circumferential spacing of 20 mm from each said equivalent rail element. The charge per rail element is equivalent to 80 KA/mm which is the maximum perimeter current density to said rail segment cooled by a cloud system liquid nitrogen Sterling system. The aforesaid rail segments are composed of a metallic glass alloyed of tugsten, Titanium silicon carbide. Said metallic glass segments have a typical elastic strength of $10^6$ psi and are coated or electroplated with an alloy of silver platinum and palladium. The operation of the device generates temperatures and pressures momentarily exceeding 5000° K. and $10^5+$psi, respectively. Repetitive sequential firing initiates deterioration of said rails alluding to the ablation of layers of conducting regions exposed to plasma and assisting electrical propagation. The rate of said deterioration aforesaid rail surface is uniformly 10 percent per minute at maximum output. The rate of deterioration varies directly with the power level and/or the interval of times the device is operated. A decrease of 15 percent in applied current effectively doubles the life of the materials coating the surface of said rail structures, which proceeds until 40 percent is attained, wherein no significant increments in operative life of said structures are incurred according to tests conducted on the aforementioned device. The problem of deterioration of conductive surfaces including exposed anodes, cathodes, rail elements and Tesla means is effectively obviated by the aforementioned closed loop cooling system and an automated system, which literally recoats or resurfaces said conducting surfaces with additional conducting materials, also known as conductants. Expended conductants are replenished from readily accessible reservoirs, which upon an automated signal discharge a precisely metered portion of their contents. Said discharged contents of conductants are then linearily electroplated along the rail elements or other aforesaid structures by lower currents, differentially delivered to said conducting structures during intervals of inactivity. Said intervals of inactivity occurring prior to or after launching cycles or firing of projectiles.

FIG. 4b is a block diagram detailing the operation of the mechanism by which conductive surfaces of electropropulsive elements are restored. The explination previously given regarding restoration of the aforesaid rail elements are applicable to the conducting surfaces of anodes cathodes, arcing elements of Tesla means and other electropropulsive systems. The separate blocks forming said block diagram are not assigned numeric values because they are readily straight forward to those skilled in the art. The command governing the operation of the entire compliment of systems embodied within FIG. 4b originates in instructions provided by the CPU. The CPU engages a voltage regulator element which provides current to a thermal induction unit. Conducting heating elements or filaments are disseminated from said thermal induction means to the primary, secondary reservoirs, regulating governors and to conducting conduits dispersing the electrical conductants. The primary function of the thermal induction unit is to generate heat transduced from electrical energy and convey said heat to aforesaid thermal filament. It is the function of the thermal heat elements or filaments to conduct the precise amount of heat necessary to volatilize a sufficient quantity of the aforesaid conductants. The electrical conductants are emitted from the primary reservoirs to secondary reservoirs. The precise quantity of said conductants released from the primary reservoirs are controlled by impulses sent by the CPU to governor release elements. The electrical conductants are conveyed from the governor release elements to various release conduits which assist dispersal of said conductants. Command signals are conveyed from the CPU to the current regulatory means which actuates apparatus governing the electroplating processing of electrical conductants. The power required for electroplating is differentially applied to sections or segments of electropropulsive element to correspond to the subsequent timely release of electrical conductants. The combined actions of mechanisms releasing the aforesaid conductants and those mechanisms involved in the electroplating process cooperate to evenly coat or plate said electropropulsive elements, which are indicated by sensors to have undergone deterioration. The condition or status of each subsystem involved in the release of electrical conductants, the plating process and the operative condition of the electropropulsive elements themselves are essentially monitored by an array or network of sensory elements. The signals from the aforesaid sensory network are pooled and collectively sent to various feedback circuits, which reconvey said signals back to the CPU. The CPU assess data retrieved from sensors and act appropriately to compensate for deterioration incurred during continuous operation of the mass action driver device. Once the conditions responsible for a loss of conductivity have been appropriately compensated for or rectified by the restoration of electrical conductivity to said electropropulsive elements, then the CPU terminates the operation of apparatus concerned witth the recoating or resurfacing process. The resurfacing, recoating or electroplating or electrical conductants usually proceeds linearly from the aft of the electropropulsive element to the most proximal terminal end optimally proceding from the breech of the device to the terminal bore of said device. Electrical conductants are plated during intervals of relative inactivity occurring prior to or after the launching of projectiles, when the device is in a standby mode. A more detailed explination of the electroplating process and the release of electrical conductants are presented later on in the specification in various flow charts and block diagrams.

FIG. 4c entails an exploded view of the Mass Action Driver device (M.A.D.). Said exploded view details the assembly of structures disposed in FIGS. 3, 4.

FIG. 5 is a detailed schematic sectioned perspective of a portion of the magnetic induction means. Each magnetic induction ring is described in part by numerals 193 through 198, formed from a light weight commercially available feroceramic material. The ionized plasmoids expand radially forward and are denoted by numerals 199 through 201, portions of the primary guide or launch tubule 88 and rail elements are described by elements 202 through 205. Number 206 of FIG. 5 depicts in part feroceramic material embodied within the construction of said magnetic induction elements are similar to the types of material utilized in piezoelectric transformer. The electrical conducting material coiled around said magnetic induction elements is perferrably composed of an alloy of silver, platinum, titanium and nobelium. Samarium cobalt is considered to be a feroceramic material or a substance, which can be incorporated into various ceramic magnetic induction means.

Figure 5A:
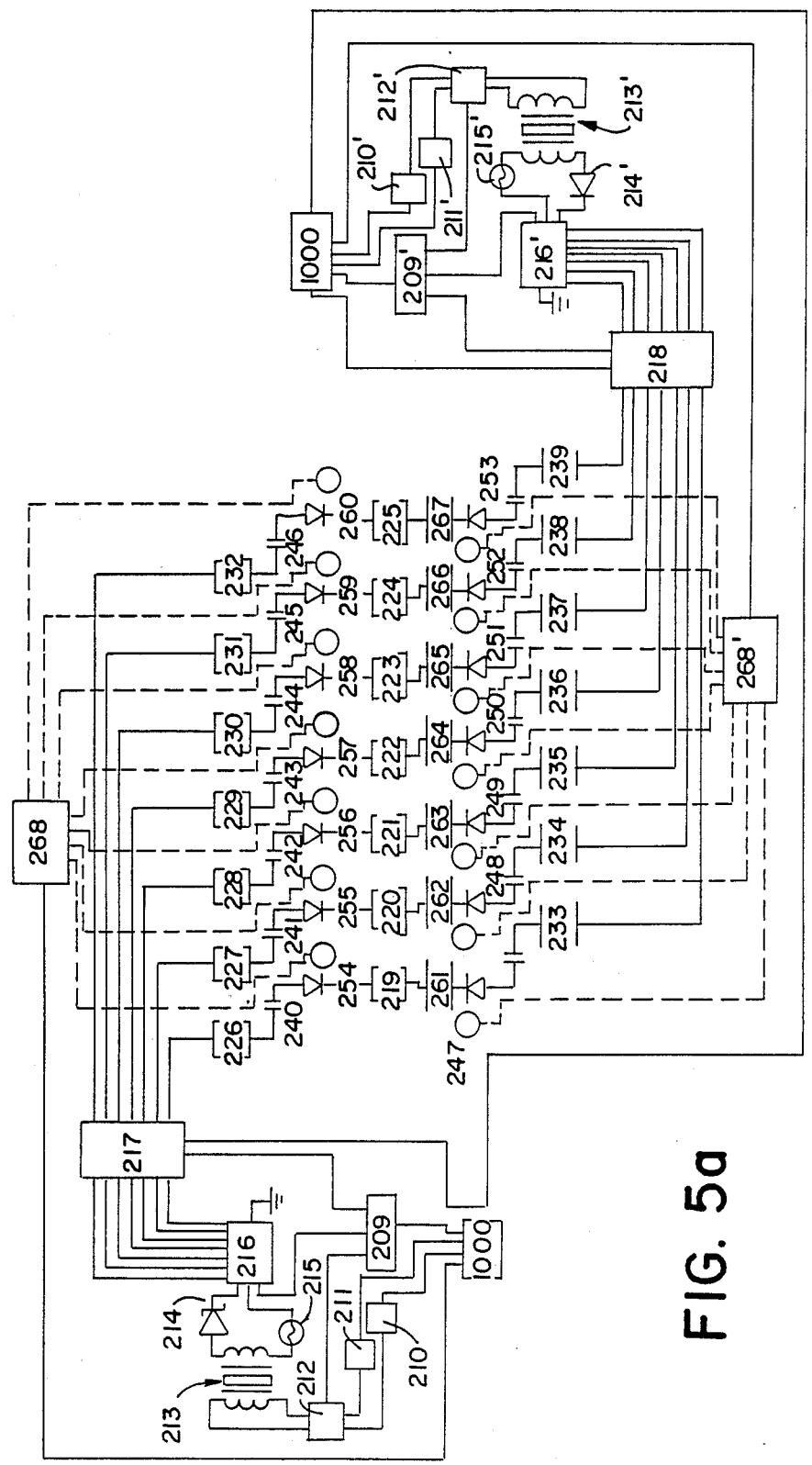
FIG. 5a is a concise electrical schematic illustrating the operative structure of the magnetic induction elements.

FIG. 5a is a concise electrical schematic illustrating the operative structure of the magnetic induction elements. The aforesaid magnetic induction element are located towards the forward bore or proximal end of the mass action hybrid device. The aforementioned magnetic induction element cooperates in a precise and specific fashion to assist in the focusing of plasma and the levitation and/or positioning of projectiles along the central axis of the bore. A finite number of separate and distinct magnetic induction elements are circumferentially disposed around the central bore of the aforesaid device. The magnetic polarity, field strength and other properties of each said magnetic induction element are not fixed but variable subject to command impulses from a controller element subservant to, number command signals generated by the CPU. CPU controller element 1000 controls the polarity, the intensity and duration through command impulses conveyed to voltage regulator 212, polarity element 209 and sequencers 210, 211, respectively. Regulator means 212 controls the current delivered to piezoelectric transformer number 213. Rectifier element 214 prevents said current from trickling back to transformer element 213 and automatically reseting circuit breaker element 215 which prevents overload to said transformer means. The polarity of each of the aforesaid magnetic induction elements is set and/or reversed by polarity unit 216. Numerals 217, 218 are sequencer means which determine the exact order, in which each of the aforementioned magnetic induction elements are to be actuated and the precise time interval each of the said magnetic induction elements are to be actuated prior to the execution of a given command sequence. The command sequence or the order in which each said magnetic element is actuated and the duration or temporal period of actuation is contingent on the position of the aforementioned projectile and its mass in relation to the velocity, force and shape of the advancing or exiting plasma. The sequencers 218, 218′ engage induction elements 219 to 225, which then delivers current to electronic variable capacitor means 226 to 239 which conveys or discharges their current through blocking diodes 240 to 253. Each of the said block diodes are preceded by a unidirectional latching means described by elements 254 to 267, which operates to allow current to flow in only one direction, wherein said circuit is latched closed. If polarity is reversed said latching elements open breaking the circuit; however said latching elements each embody a mechanism which automatically closes or recompletes the circuit when the direction of the current flow is reestablished to a given magnetic induction means. The aforesaid latching means are disposed adjacent to each magnetic induction element, which is to be energized and operate such that no two latching elements servicing a given magnetic induction element are simultaneously actuated at any given time. The polarity, sequencing or other properties of the magnetic induction elements are channeled through the aforementioned latching elements. Numerals 219 to 226 are assigned to the entire complement of magnetic induction elements, as previously indicated representing elements 1 to n. The status of various electronic subsystems or components contained therein are monitored by feedback elements 268, 268′, which are associated with the array of sensory elements collectively described by numeric values 268a, 268b. Numbers followed by a prime symbol are equivalent to duplicate numbers.

The aforementioned schematic disclosed by FIG. 5a represents numerous equivalent circuits servicing the aforesaid magnetic induction elements. Said circuits are sequentially actuated by command impulses conveyed from the CPU. The disclosure of a single circuit element by the aforesaid schematic disclosed all equivalent circuits in the array of magnetic induction elements.

Figure 5B:
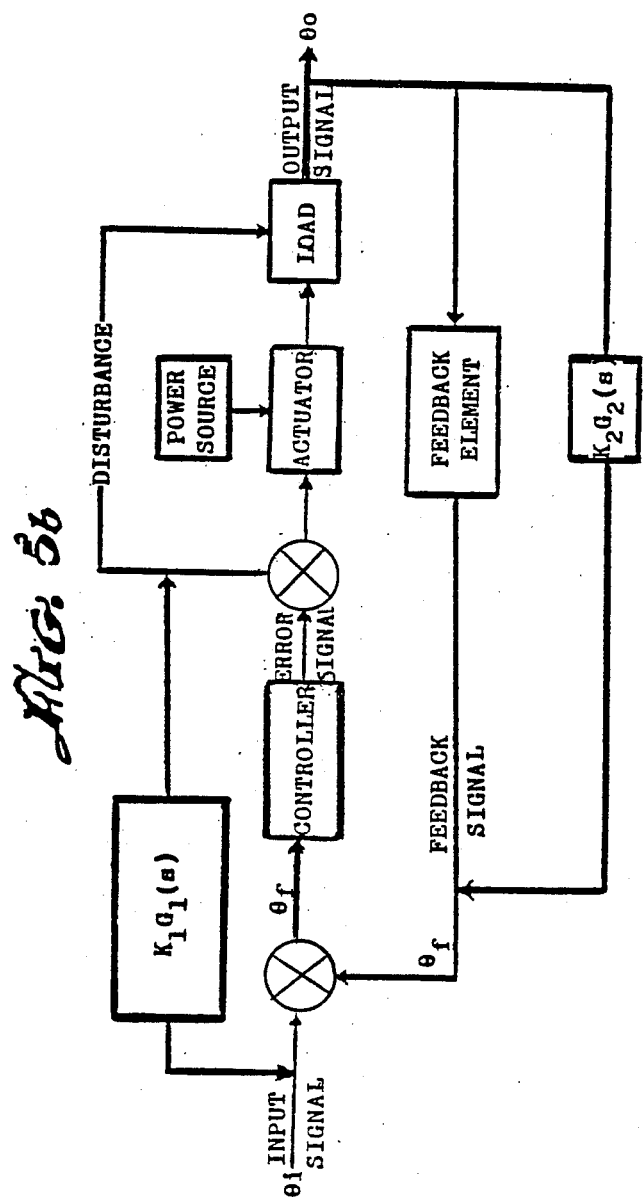

The basic design of the automated servomechanism system contained within the feedback loop can be best illustrated by the block diagrams disclosed in FIGS. 5b, 5c.

A discrepancy of disturbance is generally detected by sensors, $\theta i$; which sends their digitized signals to a comparator means, which acts as an error detector. The error signal, $\theta\epsilon$, is sent to a controller means which elicits an actuator means (which is provided with a power source and) generates a load leading to an output signal, $\theta o$. Additional information is being supplied and the output signal, $\theta o$, generates additional data impulses, which enters a feedback element relaying in this case perhaps the position of the turret in relation to a target vector, which then exacts a feedback signal, $\theta f$. The feedback signal, $\theta f$, is reassessed against an error detector, which reenters and completes the loop. Further contained herein below are a series of standard simplified equations describing in general the control system transfer functions ranging from open loop to closed loop transfer functions listed in part herein below:

The forward transfer function is defined by the equation:

$$\frac{\theta o(s)}{\theta \epsilon(s)} = K_1 G_1(s)$$

The forward transfer function $K_2G_2(s)$ is defined by the expression:

$$\frac{\theta f(s)}{\theta o(s)} = K_2 G_2(s)$$

The open loop transfer function, the product of the forward and feedback transfer function is defined by the expression:

$$\frac{\theta f(s)}{\theta \epsilon(s)} = K_1 K_2 G_1(s) G_2(s)$$

The error transfer function is designated by the expression:

$$\frac{\theta \epsilon(s)}{\theta i(s)} = \frac{1}{1 + K_1 K_2 G_1(s) G_2(s)}$$

Closed loop transfer function is illustrated by the equation:

$$\frac{\theta o(s)}{\theta i(s)} = \frac{K_1 G_1(s)}{1 + K_1 K_2 G_1(s) G_2(s)}$$

Logic circuits containing comparator elements compare and contrast digitized signals obtained from sensors with digitized values stored in said comparator means. Logic circuits comparator chips or microprocessor elements and a global memory system will be described in detail in FIGS. 26, 28, 30, 30a and 30b. It should be reiterated that the above mentioned equations are general and standard and only in part briefly outlined in the feedback loop employed in this patent disclosure.

Figure 6A:
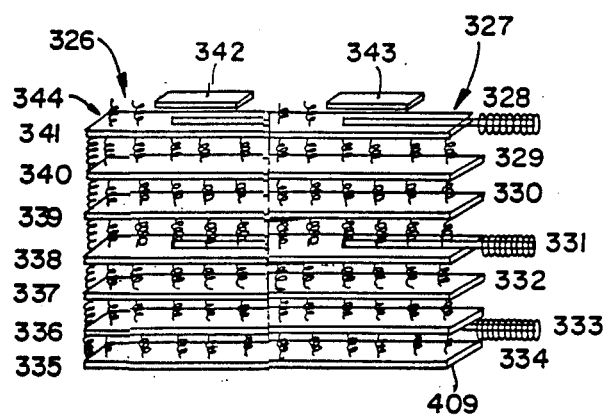
FIG. 6a is a detailed perspective of a single heat exchanger grid pair.
Figure 6B:
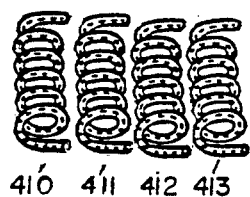

FIGS. 6, 6a and 6b give a detailed longitudinal perspective of the closed circuit cooling system, some of its component parts and the loading assembly. Numerals 268, 269 of FIG. 6 represent a single aerodynamically stable armor piercing projectile which is followed immediately by a spherical explosive means 270 which is houled in a fragmentizing cylindrical shell casing denoted by element 271 until resistance is encountered. Each shell or explosive cylinder means maybe housed in chargeable metallic insert tubule 272 and container means described by cross sectioned means 273, 274. Projectiles 275 through 281 are side loaded from magazines 282, 283 along linear autofeed segments described duly by elements 284, 285. The coolant tubule elements 286, 287 are provided with heat conducting shells designated by numerals 288 through 297 each of which is interfaced with a separate commercially available thermal graduated medium described by numerals 298 through 304. Each tubule elements 286 and 287 are provided with a helical coiled heat exchanger means, 305, 306 assist to equilibrate thermal parameters. Element 397 denotes an internal pressure release valve associated with a helical exchange tube 308, which cools the peripheral elements of the device. Numerals 309 through 312 are counter current heat exchangers, whereas elements 313 through 316 provides heat or thermal condenser means. Numeral 317 is indicative of one of several passive Sterling type heat engine or pump which recycles expended coolants to a variety of heat exchanger means. Extra coolant is contained in reservoirs 318, 319 which can be cycled by an active pump unit number 320 to sites within the device. Additional condensors and heat exchangers designated by numerals 321 through 325. A schematic view of a cycling reservoir and exteriorized heat exchanger grid provided aft of the main lunch mechanism, numeral 10000 are described by elements 326, 327, respectively.

FIG. 6a denotes a detailed view of a single element pair 328, 329, which form the heat exchanger grid 264. Heat exchanger plates are designated by elements 328 through 343. Each plate means is associated with a linear array of microcoiled heat exchanger means indicated in part by numerals 344 through 409.

FIG. 6b describes in greater detail an array segment of the forementioned microcoiled heat exchanger means depicted in FIG. 6a. Elements 410, 411, 412 and 413 are of a commercially available type and are provided with a suitable coolant wick.

Figure 7:
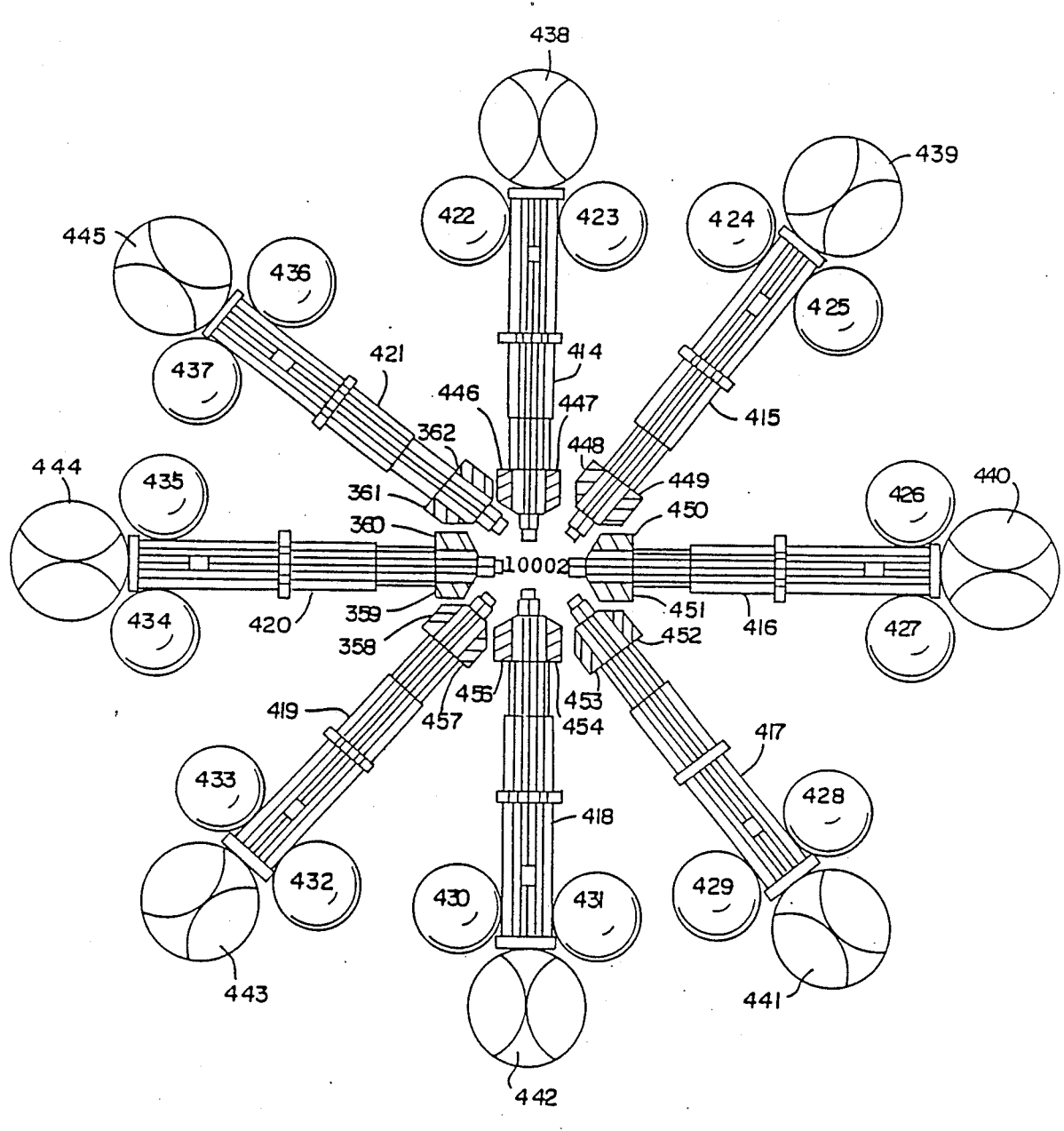
FIG. 7 is a partial spatial perspective of the circular Tesla coil plasmoid injection complex.

FIG. 7 is representative of a detailed perspective view of outer structural encasement for the array of Tesla coils and plasmoid injection means. Only a fraction of the above mentioned Tesla plasmoid injection means is illustrated herein for reasons of simplicity and clarity. Each entire unit of the complement is assigned a numeric value represented byy elements 414 through 421. Each unit has within its embodiment a pair of equivalent storage reservoirs, elements 422 through 438 and compensatory pumps aft of each unit which are defined by elements 439 through 445. All units of the complement are assigned additional arcing pairs which are located above the exit orifice of each unit, described by structures 446 through 462. All exit orifice structures are placed in a hermetically sealed cavity collectively defined by number 10002.

Figure 8:
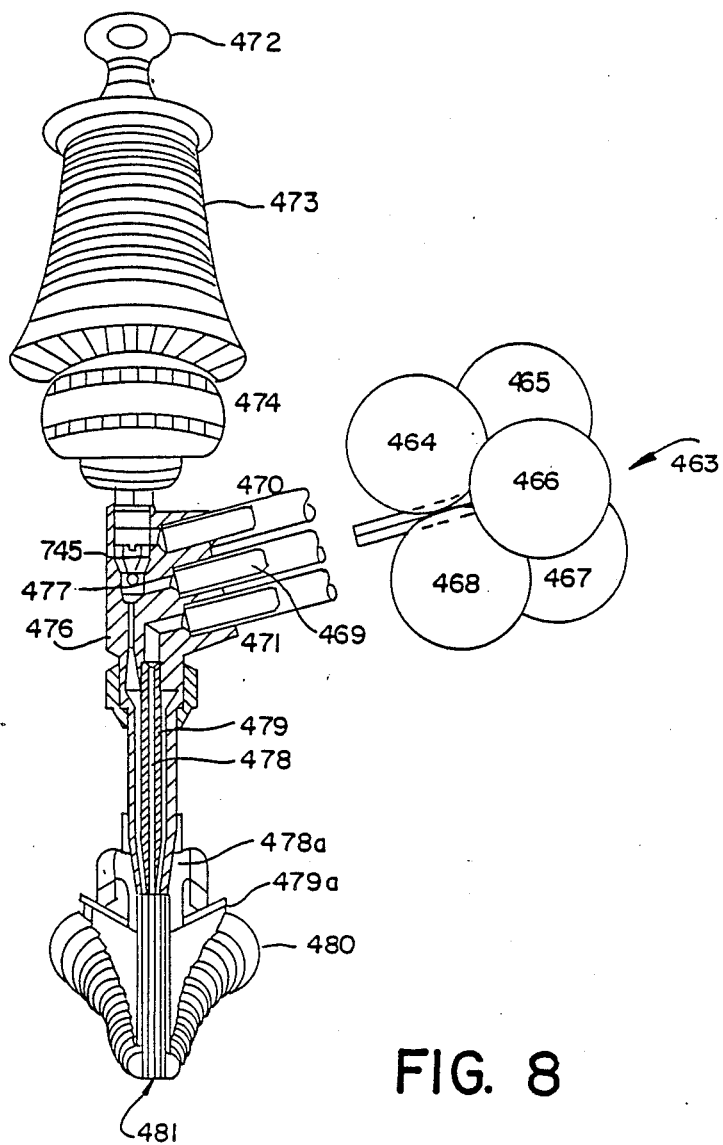
FIG. 8 is a detailed cross-sectioned and perspective view of a single Tesla coil plasmoid injection complex.

FIG. 8 defines in detail a single Telsa plasmoid injection unit. The plasmoid reservoirs are described by a single numeric element, 463 for external units aft of the device, while each subunit is assigned a separate value 464 through 468, inclusive. The feed lines 469 and 470 supplying the unit with an accessible quantity of plasmoids; whereas tubular unit 471 conducts or circulates coolant to and from the entire structure to reduce overall temperature of internal structures. Voltage is input from element 472 to Tesla coil means 473 and the arcing is adjusted by a adjustable attenuator means described by element 474. The primary cathode and anode means are described by elements 475, 476, respectively; whereas secondary anode and cathode means are defined by elements 479, 479a and 480 respectively. A non conducting plate 478 and 479a separates structures 478a and 480. The point of primary arcing embarkation is designated by numeral 477; wherein the plasmoids are ionized and continuously propagated until they pass through the charged exist orifice described by element 481. A variety of suitable plasmoids such as vaporized cesium or mercury, hydrogen, nitrogen and inert gases including xenon krypton, or argon are commercially available and well known by those skilled in the art.

Figure 8A:
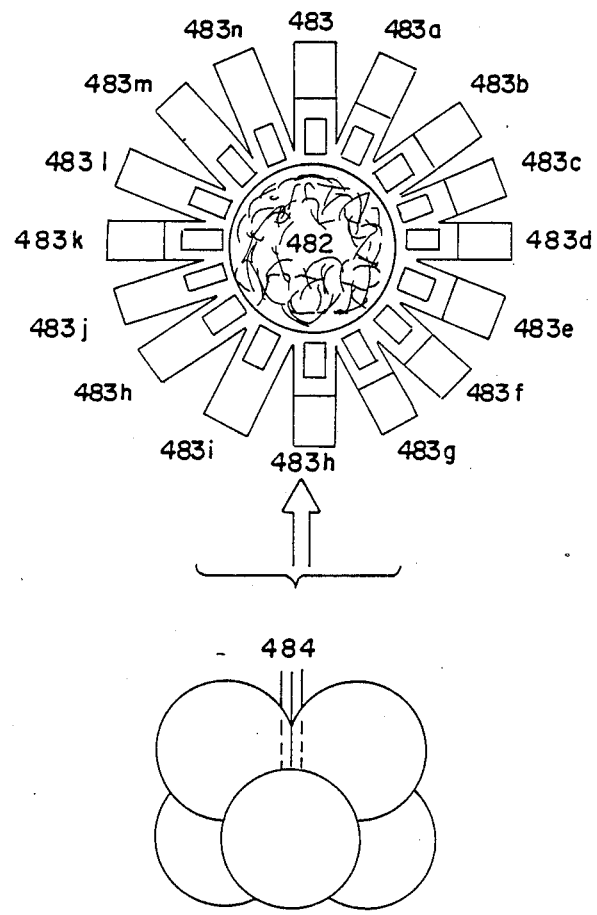
FIG. 8a is a pictorial representation of the Tesla array or complex.

FIG. 8a is a simplified pictorial representation of the entire Tesla complex yielding a circumferential axial perspective of said complex. The entire Tesla complex is assigned to the numerical value of 483, whereas the external reservoirs of tanks are assigned the value 484. Complex 482 consists of sixteen subunits described herein by numerals 483 through 483h, inclusive.

Figure 8B:
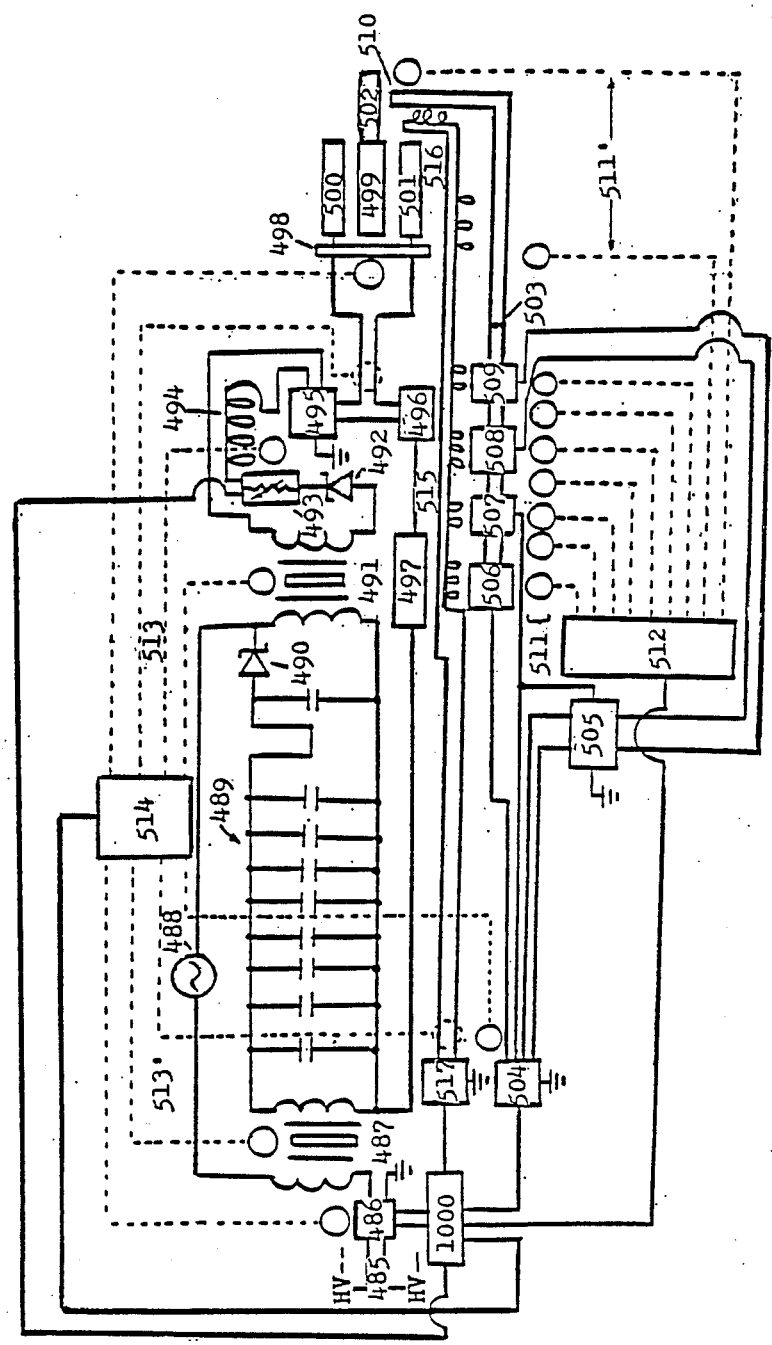
FIG. 8b is a concise schematic diagram of a single Tesla element equivalent to the Tesla structures forming the aforesaid Tesla array or complex described by FIG. 8b.
Figure 9:
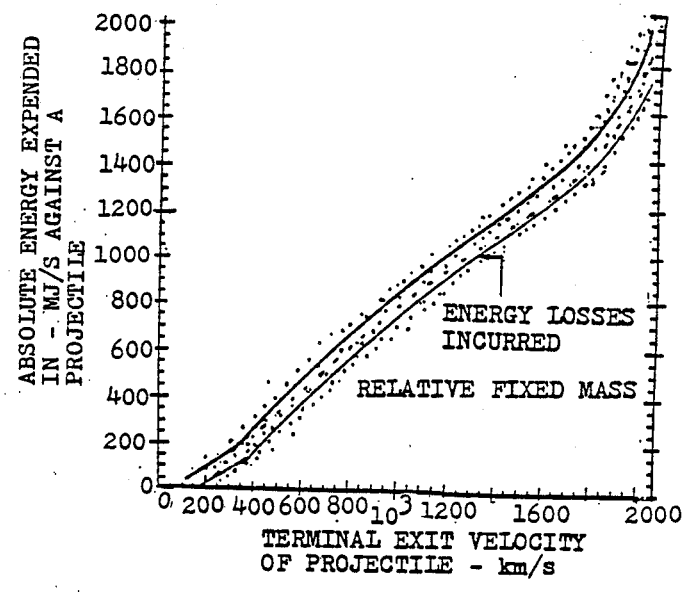
FIG. 9 is a graph equating exit velocity of a projectile against the absolute energy applied to said projectile in the form of electromotive force.

FIG. 8b is a concise schematic diagram of a single Tesla element; which corresponds to one said element of an array of equivalent Tesla elements. The aforesaid array consisting of radially disposed Tesla coils having their discharge ends positioned in a common cavity coupled to and following said firing chamber in the direction of said bore. Operative instructions from CPU 1000 actuates regulator element 486 which distributes power to high voltage source 485. The current generated by high voltage source 485 is conveyed to primary transformer element 487 engages both circuit breaker 488 and capacitance bank 489. Power from capacitance bank 489 is initially prevented from flowing back after discharge by rectifier bridge element 490. Current from capacitance bank 489 is conveyed from said bank to secondary transformer element 491. Current flow is prevented from returning to secondary transformer element 491 by rectifier 492. Current passes from rectifier element 492 to electronicly actuated varible resistance means 493 and from said means to amplification coil means 494. The length of the arc its intensity and other properties can be altered electronically by the resistance electronically adjusted by said CPU. Current from said amplification coil 494 is conveyed to pulse circuit 495, which is under the control of sequencer element 496. Said sequencer element 496, is under the control of the CPU, number 1000; whereas pulse circuit means 495 passes current to polarity switch 497. The aforesaid polarity switch number 497 conveys current to spark coil 498. Spark coil 498 conveys current to anode means 500 and cathode means 501 which forms spark gap 499. Anode 500 and cathode 501 convey current to electrode discharge means 502. The switching of polarity only becomes important in relation to the charge bias of other equivalent Tesla units in close proximity to said unit. The spark gap, numeral 503 is formed collectively from elements 500 to 502.

The quantity of plasmas discharge, the sequence of said discharge and the frequency, at which said discharge occurs is the course interdependant on the arcing process of the Tesla means. CPU, 1000 controls the operation of regulator means 427, 505 which actuates governor valves 506, 507. Governor valve 507 consists of a solenoid mechanism, which controls the flow of volatile plasmids from secondary reservoir 509 to conduit 503. Conduit 503 delivers the volatilize plasmids to exit orifice 510. Exit orifice 510 delivers said volatile plasmids in close proximity to discharge electrode 502. If it is determined by sensor means 511 that the aforesaid secondary reservoir is either depleted or exhausted then governor valve 506 is actuated by regulator means 504 to release the content of the primary reservoir described by numeral 508 to fill or replenishes those contents expended by secondary reservoir 509. Numerals 511 to 511' denote collectively an array of sensory means consisting of electro-optical sensors, mechanical pressure transducers and flow sensors, which monitor the status of the aforementioned reservoirs, governor elements, conduits and related structures. Digital electronic impulses are conveyed from the aforesaid sensors to a feedback circuit collectively defined by elements 512, 514, which reconveys data back to the CPU for analysis. The plasmids depending on the type of plasmids dispersed, the intrinsic or ambient temperature and consisting of same must be volatilized prior to delivery. Thermal induction elements 515 to 516 provide the heat necessary to volatilize said plasmids. The aforesaid thermal induction elements are electrically controlled by regulator circuit which is collectively assigned the numeric value 517. The regulator circuit receives command impulses from CPU, numeral 1000, compensates for differences in the consistancy of the aforesaid plasmids which are registered by said sensory means described by numerals 511 to 513.

PROJECTILE ACCELERATION EQUATIONS

The acceleration, A, of projectile, p by the mass action hybrid device, having a gram mass, Mg, from a static or arbitrary fixed position or initial velocity of zero to a velocity, U is described by the equation herein below:

$$AMg \int_{\text{vel. } 0 \to U}^{\text{init. vel.} = 0} \int_{K.E.ModnP}^{K.E._i = 0} =$$

$$\int_0^W \frac{\hat{I}\,d\hat{w}.\hat{B}_{po\uparrow}\Sigma Pn\hat{f}\uparrow}{M}\left(\frac{MUg}{\Sigma j}\right)$$

where,
I is the current by the initial arcs
W is the rail spacing
B is the magnetic field intensity
po $\uparrow$ is the polarity of the magnetic field
$\Sigma Pn_f \uparrow$ describes the collective sum of the force generated by the entire complement of plasmas, Pn, exerting a absolute vector force,
f $\uparrow$, on a projectile with mass Mg.

Mod n Pg describes the approximate scaling involved in an accelerator device emboding a plurality of discharge modules K.E. denotes the kinetic energy term or component and the subexpression $$\frac{MUg}{Ej}$$

denotes the gram mass component accelerated to velocity Ug and Ej is the efficiency with which electrical energy is transferred from an electrical storage system (i.e. capacitance bank) to the aforesaid kinetic energy of said projectile.

If the accelerator has a length in meters L from breech to exit bore and L is related to the final velocity U then said velocity at which the projectile exits and is described by the term $$\int_{K.E.}^{K.E._i} L\frac{U^2}{2g} - \Sigma R \text{ atm} - \Sigma Rdrag - \Sigma \text{ friction}$$

wherein $\Sigma R$ atm, $-\Sigma R$ drag and $-\Sigma$ friction are accumulated loss in kinetic energy incurred by resistance of projectile to atmospheric gases, the sum of loss in kinetic energy due to internal and external drag and the losses in kinetic energy as the projectile encounters friction.

Additionally the mean velocity of the projectile, V is by the expression $$V = \int_{f\Delta s}^{i\Delta s} A\frac{dt}{dx}$$

wherein t is the time needed to transverse a discrete distance, dx, from an initial starting position, Zi, and the acceleration, A, in the absence of an applied electromagnetic field is effected by loss in kinetic energy due to entropy $\Delta S$ from the initial state of acquiring momentum to the termination of free flight.

The position $Z_i$ is given by the equation $$Z_i = \int vdt$$

The voltage $V_I$ resulting from the time variation of the current and inductance, L, of the rail complement is typically given by the expression $$V_I = \frac{d(LI)}{dt} = L\frac{dI}{dt} + I\frac{dL}{dt},$$

since L=L, Z, then $$\left(\frac{dL}{dt}\right) = L_1 V$$

The voltage described by the term VR along n number of rails is defined by the equation $$VR_e = \eta \int_o^Z IRdz$$

where R is the resistance of each rail and using Kirchhoff's law yields the expression $$O = I Ro + Lo\frac{dI}{dt} + IR + I\frac{dL}{dt} + L\frac{dI}{dt} + VA$$

by which both current and voltage are readily tabulated. The terms Ro, Lo embody both stray circuit resistance and inductance.

The following equations are typical to description of electromotive forces and other parameters typical of rail systems.

The instantaneous energy, Ec in capacitance banks, storage coils and the like is conviently described by the equation.

$$Ec = \frac{LoI^2}{n}$$

The inductive energy, $E_I$, existing between the aforesaid rails is described by the equation $$E_I = \frac{ZL_I I^2}{n}$$

The energy loss, $E_A$, in the plasma arcs are determined by the expression $$E_{Am} = \int_{n - \Delta x}^{n} VA \, Idt$$

The energy loss, $E_R$, in the fixed elements and rail means are embodied within the equation $$E_R = \int I^2 \, Rodt + n \int I^2 \, Rdt$$

and the near instantaneous kinetic energy K.E.p of said projectile is described by the expression $$K.E.p. = \frac{mv^2}{n}$$

Preliminary tests consisting of one hundred trials, were conducted on mockups of the invention to measure the intrinsic exit velocity of projectiles. The intrinsic exit velocity of a projectile is the absolute velocity at which a projectile exits the bore of the ignoring atmospheric resistance and the other external factors. FIGS. 9 to 12 graphically represent in part data accumulated from one hundred trial runs and appear to summarize four interrelated events regarding projectile exit velocity and related parameters. The first of the said events is that the exit velocity of a projectile varies directly with the net absolute energy generated in the form of electromotive force which is applied against a projectile of a relative fixed mass according to FIG. 9. The absolute energy in Mega Joules (M.J) expended per second by electropropulsive generating means (rails, arc sources, the array of Tesla elements and related structures) less loss incurred due to energy exhausted as heat, energy dissipated during the transduction of plasmids and/or related parameters, which amounts to approximately 12.0 percent. (100.00−12.00=2.00 percent). The term relative fixed mass is defined as the mass in grams per cubic centimeter less the average mean loss in gram mass incurred by the aforesaid projectile upon exiting the bore of the device. Losses in gram mass are incurred due to ablative forces generated by a super heated plasma, internal resistance of the atmospheric gases contained within the central bore forces alluding to drag and/or related processes.

Figure 10:
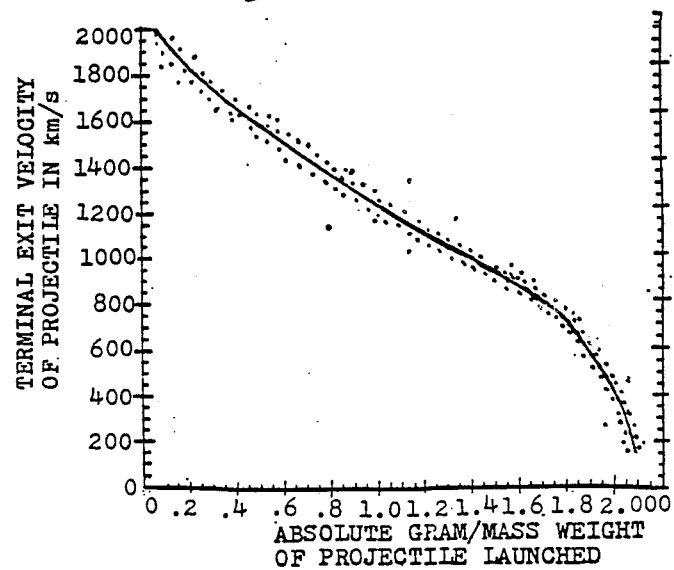
FIG. 10 is a graph assessing the effects of projectile mass against the exit velocity of said projectile.

The second said event regarding exit velocity is that the aforesaid exit velocity appears to vary inversely with the absolute relative mass of a projectiles, as indicated by FIG. 10. The gram mass of projectiles is not fixed but variable in increments of 0.10 grams up to 10.00 grams and is the independent variable; whereas exit velocity is the dependent variable in FIG. 10. All other parameters of the aforementioned device remains constant in FIG. 10 in order to assess the effect of gram mass upon exit velocity.

FIG. 11 discloses the third said event; wherein if all other parameters are constant or invariant the exit velocity is directly proportional to the thrust generated by the plasmatization of plasmoids with the central bore of the device. Plasmids of different compositions are as stated earlier introduced serially in successive stages. The extent to which plasmids undergo plasmatization depends on the mass state conversion of said plasmids in relation to the electromagnetic energy expended to energize the aforesaid plasmids to a high velocity plasma. The thrust parameters of plasmids assessed ignoring the minute losses incurred when said plasmid must be encapsulated or packaged by other material to form wafers. The incapsulation of measured quantities of mercury into convient packages or wafers by a thin layer of aluminium, tin, celophane or other substances with the thickness of said packkaging averaging several hundred micrometers. Those skilled in the art can readily understand and appreciate that the negligible extent to which the material diminishes or impedes the plasmatization process.

The exit velocity of a given projectile appears to vary logarithmicly in relation to the absolute mass of said projectile relative to resistance encountered by said projectiles prior to target impact. The resistance encountered by said projectiles includes but is not limited to atmospheric or medium resistance, drag, friction, gravity, the forces of inertia and/or other obstacles encountered byy said projectiles. FIG. 12 graphically illustrates the abovementioned logarithmic relationship between exit velocity of a projectile, the mass of a projectile and the resistance encountered therein. It is graphically detailed in FIG. 12 by a dashed line the effects of rapid successive firings of projectiles. Projectiles fired in rapid succession within an optimum range effectively clears a rarified corridor between the bore of said device and the specified target. Said corridor in effect disperses and/or displaces the medium which had existed prior to the firing of the first projectile. It is additionally important to note the extent to which a corridor is cleared is a function of the density of the medium which is to be displaced, the linear length or distance which the projectile has to transverse between the bore of the device and said target, the cohesive forces generated by elements composing said medium and other related parameters. FIG. 12 then describes what is termed the fourth event describing resistive forces impeding the motion or acceleration of projectiles in flight towards specified target sites.

Further trials conducted on the device embodied within the invention and other similar such devices inconclusively indicates that there are maximum operative limits. The aforesaid trials conducted to determine the maximum operative limits were greater than five but did not exceed ten; and therefore can not be weighted with the same statistical significance as those tests conducted, wherein one hundred trials had been completed to establish operative norms. Preliminary evidence based on sparse trials indicate that irregardless of the size, power, number of stages embodied within the aforementioned devices and/or other related parameters, that the exit velocity will level off and eventually reach a plateau. The aforesaid plateau relates to the maximum exit velocity attainable by a projectile, the effects of the medium in which the said projectile is to traverse and the effects of gravity, inertia or the speed of said projectile in relation to the speed and distance of said targets.

The aforementioned multiple launch stages, as previously indicated consist of three separate and distinct phases or stages. The first said stage or phase consists of the serial introduction of plasmid material in the form of wafers obtained from cannisters which are plasmatized by an intense arcing source. The second said stage consists of an array of Tesla means circumferentially disposed and tilted so as to lie in the surface of a virtual core which is coaxial with the bore of the mass action driver device with the discharge ends situated forward providing additional thrust in the direction of said plasmids previously introduced in the aforesaid first stage. Additionally plasmids are radially introduced and plasmitized by arcs introduced by electrode elements of said Tesla coils. Rail elements circumferentially disposed around the central bore of the aforesaid device and provide electrical propagation of said plasmids introduced in the first and second stages. Magnetic induction elements provide the third stage of electropropulsive thrust.

The introduction of repetitive stages consisting of multiples of the aforesaid three stages is within the scope of the invention. The implementation of multiple launch phases consisting of multiples of the three aforesaid launch stages or phases when taken in succession can increase the velocity and mass of projectiles dispersed; substantially; however there are practical operating limits.

The implementation of multiple launch phases consisting of multiples of the three aforesaid launch stages phases when taken in succession can increase the velocity and mass of projectiles dispersed substantially; however there are practical operating limits. There are additional limits which must be imposed on the electronics and electro-optical systems embodied within the aforesaid device. The CPU originally embodied within the device consisted of ten cards of Intels SDK-86 module.* The electro-optical modules and component systems were obtained from subsidaries of Hewlett Packard, I.B.M. and Hatachi. The voice recognition synthesizer means, feedback circuits and secondary logic circuits where initial purchase and customized from subsidaries of I.B.M., Fairchild and Sinclear. There are presently more sophisticated systems either available or under development from companies previously mentioned and other sources. The limitations initially reside in the computational power of each unit, the number of computations needed per a interval of time and the type of target acquisition interphased with the mass action driver device.

Figure 13:
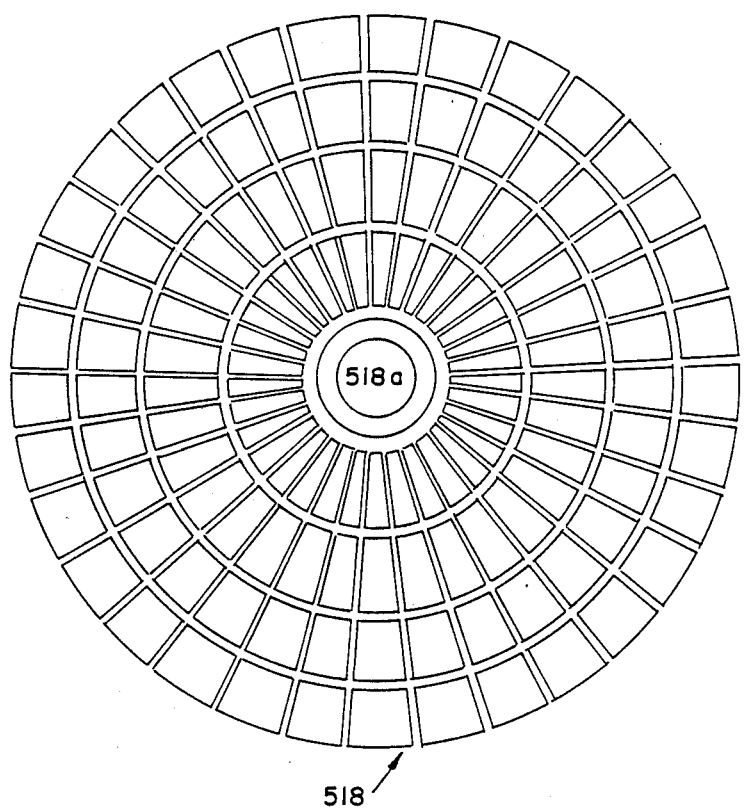
FIG. 13 is a pictorial descriptin of the outer impact aborptive ceramic shell incasing the body of the explosive device.

FIG. 13 is a greatly simplified pictorial representation of the encapsulated exterior portion of the spherical explosive means. Each plate means of which there are thousands is laminated to the one adjacent above and below it consisting of a composite material, which is both an ablative and an effective absorptive of kinetic stress. The entire complex of plates are assigned the numeric value 518. The explosive center or centroid of the structure is designated by number 518a. Suitable ablatives such as nylon phenolic quartz acrylic compounds and plates of boron and nitrogen impregnated silicon ceramic or kinetic absorptive was obtained commercially and shaped in a pressurized mold via techniques well known and practiced by those skilled in the art.

FIGS. 13a, 13b, 13c are pictorial representations of the spun synthetic fiber encasing the explosive device and laminated to the ceramic structure 518 which pulverizes into a fine powder upon impact due to a absorption of kinetic energy approaching or in excess of 98.5 percent. Each figure is assigned a single numeric value differing from one another only in increments of density. FIG. 13a is assigned numeric value 519. FIG. 13b is assigned numeric value 520 and FIG. 13c is assigned the numeric value 521.

The impact of the armor piercing boring projectiles is sustained or prolonged rather than transitory as with the explosive device; wherein a kinetic ceramic absorptive material absorbs approximately 98.5 percent of the energy of impact prior to being pulverized into a fine powder. The inner most operative components of the explosive device are embedded in a supportive extruded matrix woven from synthetic silicon (Kalvar) and graphite expoxylated laminated tendrils or fibers such as Celion GY70/epoxy Modmor 11/epoxy, Scotchply/1002 Thornel 300/epoxy and/or similar such materials which also form the secondary outer protective shell encasing the entire explosive means as described earlier.

It now becomes necessarily incumbent to describe some operational field equations concerning impact, structural deformation and transferral of kinetic energy or the like of a moving projectile encountering a relatively solid resistive static force. Equations proposed by Chao, Greszczuk, Husman, Sun, Young and others appear to be valid upon experimentation even though obverse or opposite conditions exist wherein a metal or steel slug was fired into a beam of composite material rather than having the projectile composed of composite reinforced material piercing material such as earth, granite, quartz and other materials.

The energy imparted from a sphere to a laminate during the period of impact can be computed on the basis of work done by the contact force as indicated in the simplified equations herein below;

$$K.E. \tfrac{1}{2} m_S (w_o^2 - w_f^2)$$

or $$K.E. = \int_0^{w_f} F \, dw$$

where $w_o$ and $w_f$ are the initial velocity and final velocity, respectively, and $w_f$ is the displacement of the projectile when the contact ceases. The quantities $w_o$ and $w_f$ are part of the finite element solution. Then a numerical integration scheme can be used to evaluate the integral. Of course, one cannot expect these elastic solutions to compare favorably with the experimental results. The reason appears obvious.

The total amount of work done by the projectile on the laminate in the loading process is $$K.E._T = \int_0^{w_{max}} F \, dw$$

where $w_{max}$ is the displacement of the sphere at $F = F_{max}$. It should be noted that $w_{max}$ is not the maximum value of w.

The classical Hertzian contact law for an elastic sphere pressed into an elastic isotropic half space which is given as $$F = K\alpha^{\tfrac{3}{2}}$$

where F is the contact force, $\alpha$ is the indentation depth, and K $$K = \frac{4}{3} \frac{R_s^{\tfrac{1}{2}}}{\dfrac{1 - v_s^2}{E_s} \dfrac{1 - v_b}{E_b}}$$

is the rigidity associated with the deformation. The above $R_s$ is the radius of the sphere; $v_s$, $E_s$ and $E_b$ are the Poisson's ratios and the Young's noduli of the sphere and the half space, respectively.

The Hertzian law $$k = \frac{4}{3} \frac{R_s}{\dfrac{1 - v_s^2}{E_s} + \dfrac{1}{E_T}}$$

where $E_T$ is the transverse Young's modulus of fiber composites.

Since not all the work done by the projectile is dissipated in the contact zone, the total amount of imparted energy $K.E._T$ cannot be used directly to account for the amount of damage received by the laminate. A more pertinent quantity is the damage energy defined by $$K.E._D = \int_0^{\alpha_{max}} F\, d\alpha$$

where $\alpha_{max}$ is the maximum indentation. The integration also can be carried out numerically by using the finite element solutions. The rest of the work done by the projectile is stored in the form of vibrational energy given by $$K.E._v = K.E._T - K.E._D = \int_0^{v_{max}} F\, dv$$

where $v_{max}$ is the displacement of the beam at the contact point when $F = F_{max}$.

If the response histories of the contact force, the indentation, and the displacement of the projectile are obtained according to the true dynamic contact law, the damage energy can be computed from the equation $$K.E._D = \int_0^{\alpha_{max}} F\, d\alpha + \int_{\alpha_{max}}^{\alpha_r} F\, d\alpha$$

where $\alpha$ is the indentation depth at which the contact force vanishes. The total work done by the projectile is given by $$K.E._T = \int_0^{w_{max}} F\, dw + \int_{w_{max}}^{w_T} F\, dw$$

where $$\alpha_\theta = \tfrac{1}{2} h \epsilon_\theta$$

and $$\epsilon_\theta = Y/E_T$$

where Y is the transverse strength of the fiber composite. The total displacement recovered at the contact point is given by another approach to the impact response of composite structures entails the determination of time-dependent surface pressure distribution under the impactor, time-dependent internal stresses in the target caused by the surface pressure, and failure modes in the target caused by the internal stresses.

The final expressions for the maximum surface pressure, $q_o$, major and minor axes of the area of contact, a and b, respectively, maximum deformation under the impactor, $\alpha_1$, and impact duration, $t_o$ are $$q_o = \frac{1}{\pi 4/3}\left(\frac{(3/2\pi)^{1/3} N^{2/15}(\beta)^{1/5}}{mn[(k_1 + k_2)]C_R^{2/3}}\right)$$

$$\frac{b}{n} = \frac{a}{m} = \left[\frac{3\pi}{2}(k_1 + k_2)C_R N^{2/5}(\beta)^{3/5}\right]^{1/3}$$

$$S = \left\{\left[\frac{9\pi^2(k_1 + k_2)^2}{256 C_R}\right][N^{4/5}][\beta]^{6/5}\right\}^{1/3}$$

$$t_o = \frac{2.94\alpha_1}{V}$$

where $$\beta = \frac{5V^2 m_1 m_2}{4(m_1 + m_2)}$$

$$N = \left[\frac{256 C_R}{9 S^3 \pi^2 (k_1 + k_2)^2}\right]^{1/2}$$

$$C_A^{-1} = \frac{1}{R_{1m}} + \frac{1}{R_{2m}} + \frac{1}{R_{1m}}\frac{1}{R_{2m}}$$

$$V = V_1 + V_2$$

where
subscripts 1 and 2 = impactor and the target, respectively,
$R_{1m}^{-1}$ and $R_{1M}^{-1}$ = principal curvatures of the impactor,
$R_{2m}^{-1}$ and $R_{2M}^{-1}$ = principal curvatures of the target,
$V_1$ and $V_2$ = approach velocities of the impactor and the target, respectively,
$m_1$ and $m_2$ = masses of the impactor and target,
$k_1$ and $k_2$ = parameters (defined later) that take into account properties of the impactor and target, and
m, n, and S = parameters that are a function of $R_{1m}$ $R_{1M}$ $R_{2m}$, $R_{2M}$ given in Tables as a funtion of $\theta$ where $$\theta = \arccos\left\{C_R\left[\left(\frac{1}{R_{1m}} - \frac{1}{R_{1m}}\right)^2 + \left(\frac{1}{R_{2m}} - \frac{1}{R_{2m}}\right)^2 + 2\left(\frac{1}{R_{1m}} - \frac{1}{R_{1m}}\right)\left(\frac{1}{R_{2m}} - \frac{1}{R_{2m}}\right)\cos 2\phi\right]^{1/2}\right\}$$

The pressure distribution under the impactor is given by $$q = q_o \left\{ 1 - \left(\frac{x}{a}\right)^2 - \left(\frac{y}{b}\right)^2 \right\}^{1/2}$$

where x and y are the coordinate axes in the directions of the axes of ellipses a and b, respectively; whereas, the total force from impact is $$P = \frac{2\pi ab}{3} q_o$$

The pressure $q_i$ and the approach velocity $V_i$ at any given time can be obtained from equations given in the references. The terms $k_1$ and $k_2$ appearing in the preceding equations and take into account mechanical properties of the impactor and target. For an isotropic impactor $$k_1 = \frac{1 - V^2}{\pi E} ;$$

whereas for the case of planar isotropic composite target the expression for $k_2$ can be derived from results given in references. The final expression for $k_2$ is $$k_2 = \frac{\sqrt{A_{22}} \left\{ \left(\sqrt{A_{11} A_{22}} + G_z\right)^2 - (A_{12} + G_z)^2 \right\}^{1/2}}{2\pi \sqrt{G_z} (A_{11} A_{22} - A_{12}^2)}$$

where $$A_{11} = E_z(1 - V_r)\Omega$$

$$A_{22} = \frac{E_r}{E_z}\left(\frac{E_z - V_{rz}^2 E_R}{1 + V_r}\right)\Omega$$

$$A_{12} = E_r V_{rz} \Omega$$

Figure 13D:
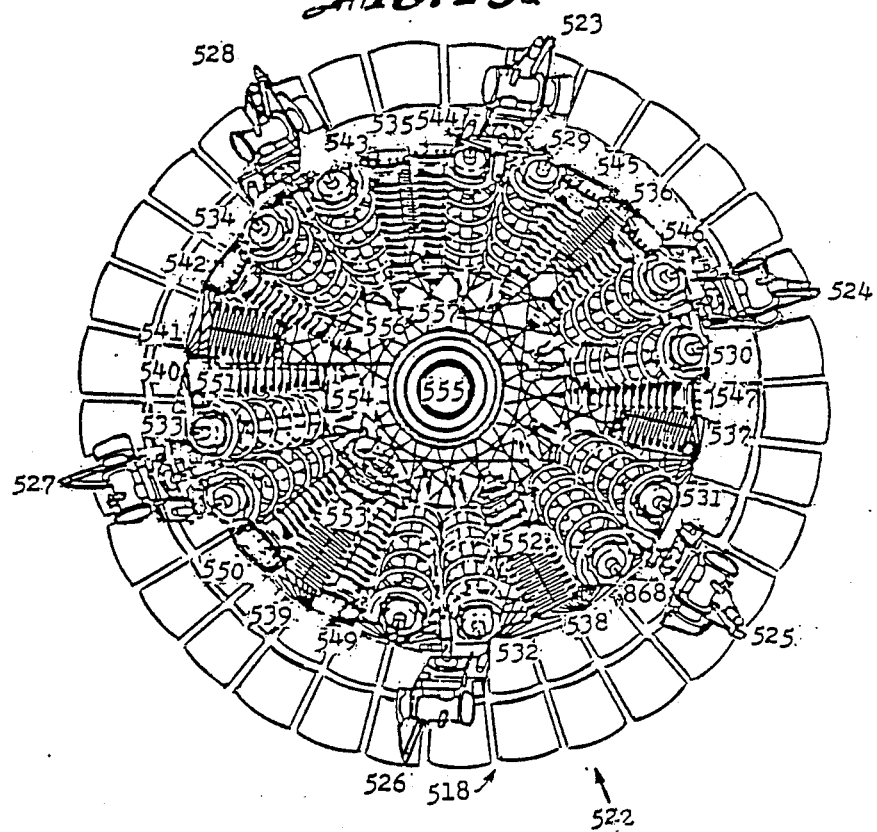
FIG. 13d is a detailed descriptive view of the specially prepared explosive and a proposed configuration for the hyperatomic explosive means.

Approximate relationship between impact velocity and impact force in a flexible orthotropic plate.

$$1 = \frac{\sigma_{11}^2}{F_{11}^2} + \frac{\sigma_{22}^2}{F_{22}^2} + \frac{\sigma_{33}^2}{F_{33}^2} + \frac{\sigma_{12}^2}{F_{12}^2} + \frac{\sigma_{13}^2}{F_{13}^2} + \frac{\sigma_{23}^2}{F_{23}^2} - \left(\frac{\sigma_{11}}{F_{11}}\right)$$

$$\left(\frac{\sigma_{22}}{F_{22}}\right)\left[\frac{(1 + 2v_{21} - v_{23})E_1 + (1 + 2v_{12} - v_{13})E_2}{\{(2 + v_{12} + v_{13})(2 + v_{12} + v_{23})E_1 E_2\}^{\frac{1}{2}}}\right] -$$

$$\left(\frac{\sigma_{11}}{F_{11}}\right)$$

$$\left(\frac{\sigma_{33}}{F_{33}}\right)\left[\frac{(1 + 2v_{31} - v_{32})E_1 + (1 + 2v_{13} - v_{12})E_3}{\{(2 + v_{12} + v_{13})(2 + v_{31} + v_{32})E_1 E_2\}^{\frac{1}{2}}}\right] -$$

$$\left(\frac{\sigma_{22}}{F_{22}}\right)$$

$$\left(\frac{\sigma_{33}}{F_{33}}\right)\left[\frac{(1 + 2v_{23} - v_{21})E_3 + (1 + 2v_{32} - v_{31})E_2}{\{(2 + v_{21} + v_{23})(2 + v_{31} + v_{32})E_2 E_3\}^{\frac{1}{2}}}\right]$$

where
 $\sigma$ = impact-induced normal and shear stresses,
 F = allowable strength properties of material associated with the three orthogonal directions, and
 E and v = Young's moduli and Poisson's ratios FIG. 13d is a detailed sectioned view of internal structural components of a proposed hyperatomic mechanism. Single element versions of the explosive means were constructed utilizing a special commercially available two element impact plastic explosive gelatin instead of fissionable material, wherein an impacter is accelerated at extreme velocity instead of an initiator and or high velocity neutron emitting sources. Element 522 is a partial view of the outer shell casing of the explosive means consisting of numerous plates of impact absorptive ceramic material mentioned earlier in the disclosure. Numerals 523 through 528 are indicative of high voltage source generators with exiting filaments or charging inlets associated with external energizers. Numerals 529 through 535 denote the miniature mass action driver means utilized to accelerate projectiles into the explosive centroid designated by numeral 555. The combination of charging coils and capacitor banks is illustrated by elements 536 through 542. Additional high voltage generators are depicted by electrostatic generator or voltage acceleration coils 543 through 552 of which only ten of twelve elements are shown. Structures 553, 554 are a partial representation of only two of six radiofrequency units deployed to irradiate the central explosive mass important in devices involving nuclear charges. The radiofrequency devices are believed to increase the mass density pressure of the non-critical nuclear mass by a slight but significant degree of 2.5 to 5.0 percent prior to engagement of said mass by a fast moving neutron source. Numerals 556, 557 are an electrooptical/electronic timing sequencer and a partial visual perspective of the woven synthetic support strut structures, respectively. The woven synthetic support matrix 557 consists of a spun fiber polymorphic polycrystalline silicon and or a high carbon fiber polyester of a commercially available type, wherein all structural component systems are embedded and stabilized prior to and after the initial impact.

Figure 13E:
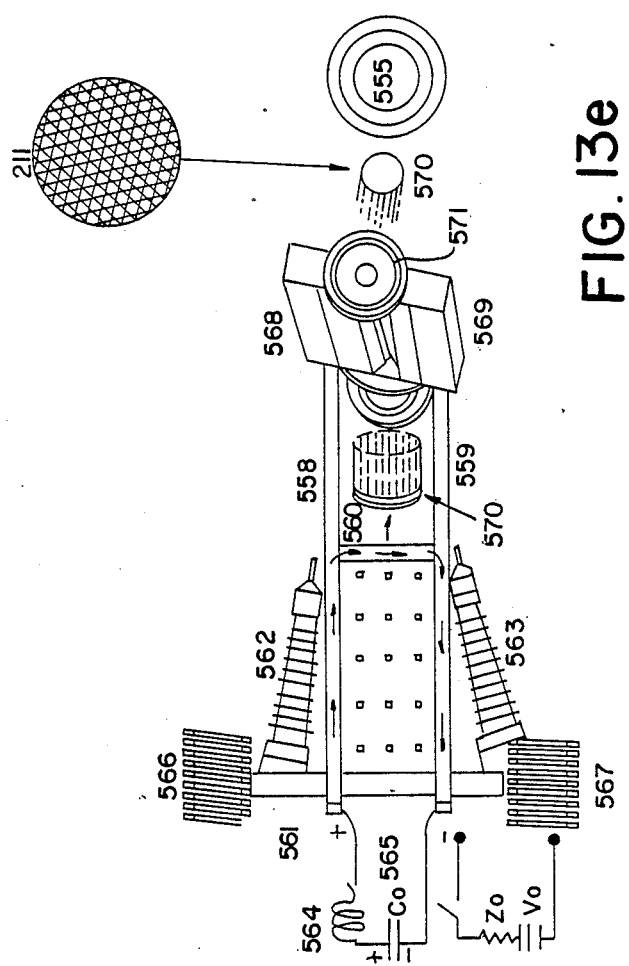
FIG. 13e is a simplified detailed cross-sectioned perspective of a single special d.c. rail assembly of the explosive means depicted in FIG. 13d.

FIG. 13e is in brief an illustrative simplified pictorial sectional view of the initiator/alpha emitter capsule heading for its intended target centroid. The mass action unit consists of a modified d.c. rail gun type of assembly. The d.c. rail assembly is described herein by numerals 558, 559 and 580, which consists of a positive rail structure, a conducting plasmoid disc which upon ionization provides the forward thrust and a negative d.c. rail completing the circuit. The support bar number 561 is flanked on either side of the assembly of two voltage acceleration coils depicted by numerals 562 and 563. Numerals 564, 565, 566 and 567 are indicative of the charging capacitance bank, switching elements and ancillary charging coils. The forward thrust occurs as the plasmoid disc 560 undergoes ionization driving either an initiator and or alpha emitting source 570 into a linear trajectory pattern. Additional rails are provided, numerals 568 and 569. The ultra high velocity projectile 570 exits the rail gun element through orifice 571 towards its intended target centroid element 555 which contains either a conventional explosive or a fissionible mass. Hence, two projectiles are fired head on from two equivalent rail gun devices; such that one impactant is composed of a suitable initiator such as beryllium and the other advancing projectile is a suitable alpha emitter. The subsequent impact occurs in the center of the fissionible mass releasing copious quantities of fast moving neutrons which bring about the formation of a critical mass from a non-critical mass value conductive for the initiation of a chain reaction process. The primary reactants, a suitable initiator, an alpha emitter, Polonium, etc. is placed in close proximity with the aforementioned neutron source generator; such as beryllium in a manner indicative of the Chadwick reaction. Since the aforementioned reaction occurs at the centroid of the subcritical fissionible mass composed of U235, Pu239 or other suitable material wherein the critical factor $K<1$, becomes drastically altered to a state in which $K>>1$, at which point a chain reaction is elicited and subsequently propagated as the secondary reactants, the neutrons and the heavy isotope U235 or Pu239 reaching some critical or maximum density factor in accordance with reactants propelled into one another which is in accordance with the scope of the invention and set forth herein below by several greatly simplified nuclear field equations:

$$_4Be^9 + 2He^4 \rightarrow {_6C^{13}} \rightarrow {_6C^{12}} + on^1$$

The Chadwick reaction provides one source of neutrons as the above equation indicates prior to initiating a chain reaction described by the equation herein below:

$$on^1 + {_{92}U^{235}}$$

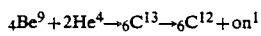

| $\Sigma m$ reactants | $\Sigma m$ products |
|---|---|
| 236.0526u | 235.8373u |

$\Sigma m$ react. $- \Sigma m$ prod. $= 0.2153u$
1 atomic mass unit $\approx 1.66 \times 10^{-24}$ gm
∴ mass converted $\approx 3.57 \times 10^{-25}$ gm Energy released $\approx$ $= 3.21 \times 10^{-4}$ erg $$\begin{cases} 3.57 \times 10^{-25} \times (3 \times 10^{10})^2 & 1.60 \times 10^{-12} \, eV \\ 3.21 \times 10^{-4} \, erg & = 2.01 \times 10^8 \, eV \end{cases}$$

If fissionable material is encased by a shell of fussionible material such as lithium deuteride, deuterium or any other suitable material, than the energy derived or released from the nuclear reaction will initiate a thermonuclear reaction or fussion process described in brief herein below:

$$_1H^2 + {_1H^2} \rightarrow {_1H^3} + {_1H^1} + 4 \text{ MeV}$$
$$_1H^2 + {_1H^2} \rightarrow {_2H^3} + on^1 + 4 \text{ MeV}$$
$$_1H^3 + {_1H^2} \rightarrow {_2He^4} + 2on^1 + 11 \text{ MeV}$$
$$_1H^3 + {_1H^2} \rightarrow {_2He^4} + on^1 + 18 \text{ MeV}$$

$$\text{ionization energy of hydrogen} \begin{pmatrix} = 2.18 \times 10^{-11} \text{ erg} \\ = \frac{2.18 \times 10^{-11}}{1.60 \times 10^{-12}} \end{pmatrix} \text{or } 13.6 \text{ eV}$$

Alternate variations of fusion processes describing the thermal nuclear ignition are standard and indicated herein below:

$$D + T \rightarrow He^4(3.5 \text{ Mev}) + n(14.1 \text{ Mev})$$

The above reaction, once initiated will subsequently detonate secondary reactions:

$$D + D \rightarrow T(1.01 \text{ Mev}) + p(3.02 \text{ Mev})$$

$$D + D \rightarrow He^3(0.82 \text{ Mev}) + n(2.45 \text{ Mev})$$

The resulting tritium originating from said preceeding secondary reaction, $$D + D \rightarrow T(1.01 \text{ Mev}) + p(3.02 \text{ Mev});$$

whereas a lower yeild of He³ from reaction $$D + D \rightarrow He^3(0.82 \text{ Mev}) + n(2.45 \text{ Mev}),$$

will undergo fusion by reaction $$He^3 + D \rightarrow He^4(3.67 \text{ Mev}) + 0p(14.67 \text{ Mev}).$$

Other possible reactions can additionally formed by neutrons (n, 2n) generated by such nuclides as, D, Be⁷, Bi²⁰⁹, Li⁷ and other nuclides. It is believed by Marwick and others, as cited in the prior art, that even though a majority of neutrons have a high probability of being absorbed by fissionible or fissile actinides such as Pu²³⁹, U²³³, or related materials such reactions as, $$n + Li^6 \rightarrow T(2.74 \text{ Mev}) + He^4(2.06 \text{ Mev}) \text{ and}$$

$$n + He^3 \rightarrow T(0.19 \text{ Mev}) + p(0.57 \text{ Mev}), \text{ respectively.}$$

$$\frac{1}{2} MVa^2 = \frac{3}{2} Kt$$

$$\frac{K.E \cdot Z_1}{K.E \cdot Z_2} \quad MVa^2 \rightarrow 3 Kt$$

$$Z_1 + Z_2 \rightarrow \text{dist} R \text{ If } R = 10^{-12} \text{ cm}$$

$$Z_1 Z_2 \, e^2 / R$$

$$3 KT = \frac{Z_1 Z_2 \, e^2}{R}$$

$$T = \frac{Z_1 Z_2 \, e^2}{3 KR}$$

$$T = \frac{Z_1 Z_2 \, (4.8 \times 10^{-10})^2}{(3)(1.38 \times 10^{-16})(10^{-12})}$$

-continued $$T = 5.5 \times 10^8 \, Z_1 Z_2 \, °K.$$

Figure 14:
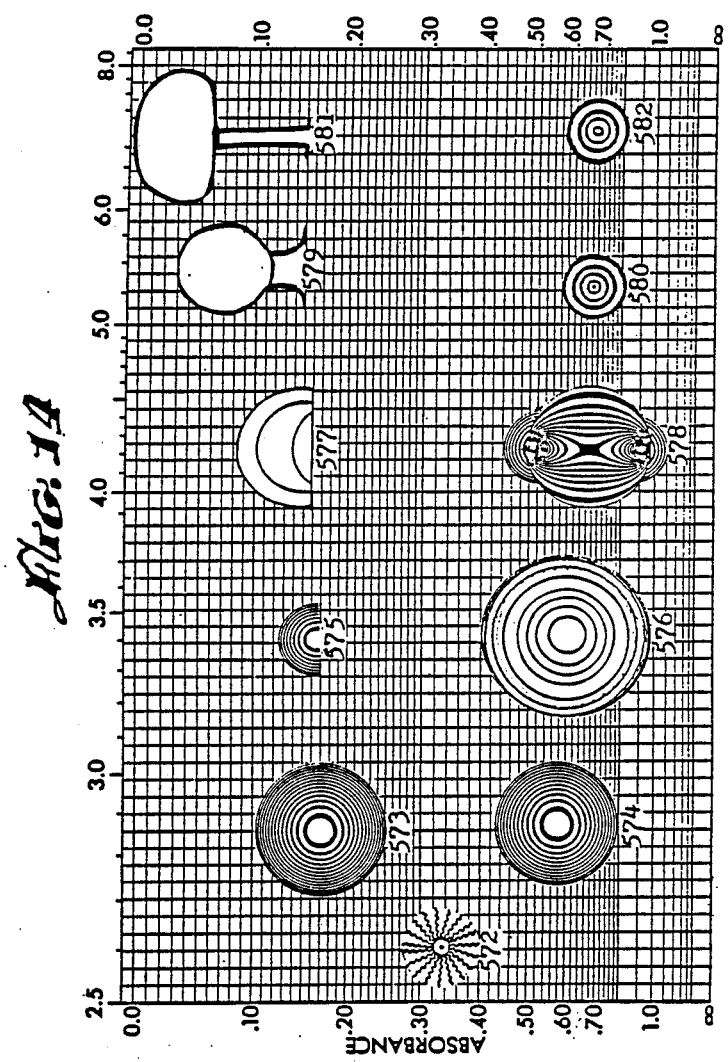
FIG. 14 is a graphical illustration depicting the thermal kinetic evolution of an above and below ground detonation.
Figure 15:
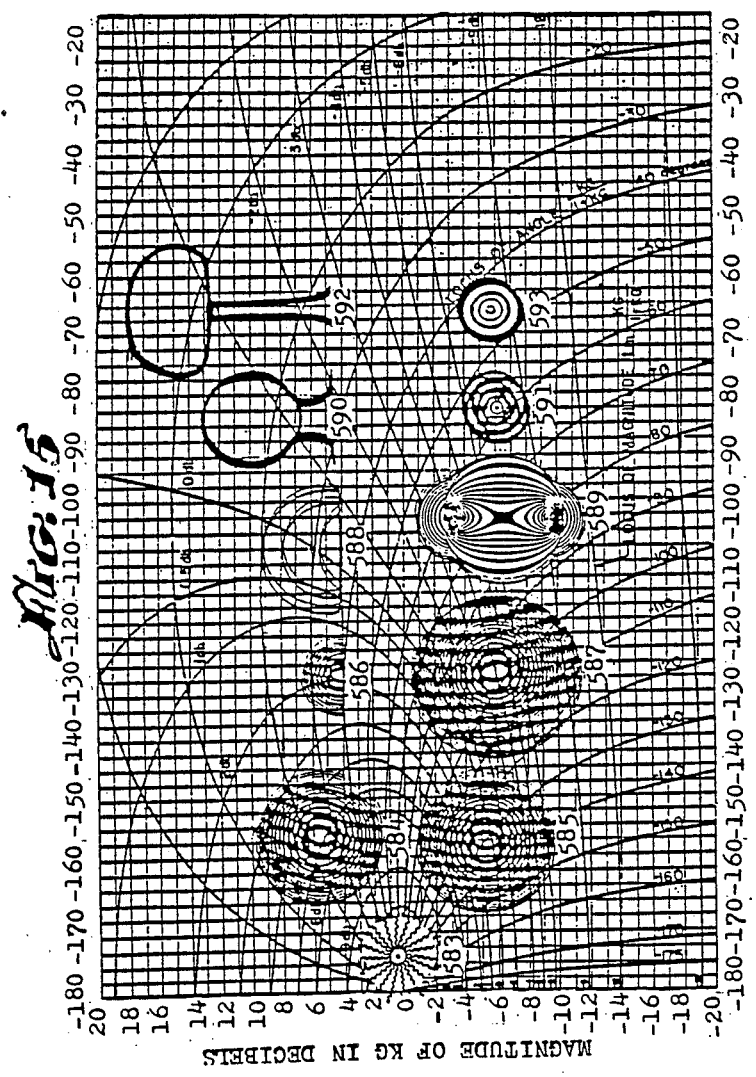
FIG. 15 is an equivalent graphical representation of the same said explosive evolution as denoted in FIG. 14, here however compressional considerations are emphasized.

FIGS. 14 and 15 are concise pictorial representations describing the evolution of explosive forces above and below ground level. Numeral 572 of FIG. 14 the actual detonation occurring approximately 10 microseconds after K>>1. Numerals 573, 574, 575, 576, 577 and 578 denote the expansive thermal kinetic forces 50-100 microseconds, 10-50 milliseconds and 100 milliseconds after initial detonation. Numerals 579, 580, 581 and 582 depict the thermal kinetic shockwave patterns one second and ten seconds to one minute after the initial onset of the explosion. Numerals 573, 575, 577 579 and 581 are illustrative of the thermal kinetic shockwave progression of the explosion above ground level; whereas numerals 574, 576, 578, 580 and 582 are indicative of the explosive event within the same time frame occurring below ground level.

Numerals 583 through 508 of FIG. 15 corresponds to exact time frame of the above and below ground detonation, however the graphical representation here is from the perspective of compressional forces generated by the explosion. The above ground detonation forces are illustrated by values 584, 586, 588, 590 and 592 respectively; whereas the corresponding below ground detonations are illustrated by values 585, 587, 589, 591 and 593, inclusive.

The Mass Action Driver Device (M.A.D.) system is in effect a special variation of a series-shunt type plasma engine or motor provided with a secondary plasma infusion and a ternary magnetic induction means. The consequence of the M.A.D. structural design provides a fascile means in which to calculate and therefore predict the parameters concerning projectile thrust, velocity vector, trajectory and impact. The above mentioned parameters and others are readily deduced from basic field equations formulated on the basis of similar such devices and a necessary consequence of the functional design of the launch cavity and employed in accordance with the invention which is set forth herein below:

A magnetic field H is increased such that the current, i, in the sample is flowing, so that the force accelerating the sample is given by the expression contained herein, such that $$f = i(H_{av} + H)d/10$$

The velocity is given by $$v = \int_o^t \frac{f}{m} dt \approx \frac{d}{10m} \int_o^t i\left[\frac{2i}{10d} \ln(b/a) + H\right] dt =$$

$$1/10m \int_o^t i\left[\frac{i 4.6 \log_{10} b/a}{10} + Hd\right] dt$$

The back emf $V_x'$, due strictly to the motion v in $(H_{av}+H)$, is $$V_x' = \frac{V \times (H + H_{av}) \cdot 300d}{c} \approx v\left(H + \frac{2i}{10d} \ln b/a\right) d/10^9,$$

and again another term must be added to obtain the total back emf at x. However the back emf measured at the point x=0 is $$V_{x=0} = \hat{L} x \frac{di}{dt} + \hat{L} \, i \, dx/dt + (Hd/10^9) \, dx/dt$$

and the energy input at the point x=0 is $$E_{in,x=0} = \quad V_{x=0} \, i \, dt =$$

$$\int_o^t L \times i\left(\frac{di}{dt}\right) dt + \int_o^t L \, i^2 \left(\frac{dx}{dt}\right) dt$$

To evaluate $E_{in}$ for a power source the simplification of having i be equal to a constant value.

$$v = (1/10m)\left(\frac{2I^2 \ln b/a}{10} + I \, Hd\right) t$$

$$= (1/10m)\left(\frac{4.6 I^2 \log_{10} b/a}{10} + I \, Hd\right) t$$

$$V_{x=0} = V_{x=x} = [\hat{L} \, I + Hd/10^9]\frac{dx}{dt} = [0.92 \, (\log_{10} b/a) \, 10^{-8} I +$$

$$Hd/10^8] \, (d/10m) \left(\frac{4.6 I^2 \log_{10} b/a}{10d} + IH\right) t,$$

such that, $$E_{in} = \int_o^t V_{x=0} \, i \, dt = [0.92(\log b/a) \, 10^{-8} I + Hd/10^8](d/10m)$$

$$\left(\frac{4.6 I^2 \log_{10} b/a}{10d} + IH\right)\frac{I t^2}{2}$$

if the simplifying artifice of the circuit is utilized, the equation can be written in terms of $$V_0 \approx Z_o \, i + Z_{load} \, i = Z_o \, I + Z_{load} \, I,$$

where $$Z_{load} \approx [0.92(\log_{10} b/a) \, 10^{-8} \, I +$$

$$Hd/10^8] \, (d/10m) \left(\frac{4.6 I \log_{10} b/a}{10d} + H\right) t.$$

Modification of equations proposed by Byers and others at the 14th International Electric Propulsion Conference Oct. 30 through Nov. 1, 1979 and more recent proceedings by the inventor of said device which further elucidates the aspects of acceleration propagation and thrust summerized herein below:

$$\int_{o \leftarrow x}^{o \rightarrow x} \frac{\Sigma n e^{z_o}}{dt} \quad \frac{\Sigma n P \phi}{dt} \quad \frac{\Sigma \phi^{z_o}/I}{dt} = M_f - \left(\frac{\Delta dx dy dz M d}{dt}\right)$$

$$(e^{VM/Ispg} - 1)(Ispg) 1.16 \times 10^{-5}$$

wherein o→x is some fixed discrete interval maximum, $\Sigma n e^{Z_o}$ represents the total effect of all d.c. rail element with a specific charge taken over some discrete time interval dt. The expression $\Sigma n P \phi$ denotes the total summated effect of the propellant P taken in avogrados $\approx 6.02 \times 10^{23}$ times the product of the specific reactivity of propellant or body of plasmoids. The expression $\Sigma \phi Z_o/I$ represents the propulsive output provided by the energization and subsequent discharge of a series of magnetic induction elements exerting field $Z_o/I$. All three of the aforementioned expression determines the effects of thrust on a moving projectile of a known mass. In the expression $$Mf - ((\Delta dxdydzMd/dt)),$$

Mf is indicative of the final dry mass in kilograms of a given projectile which is differenced against the loss in dimensional mass due to atmospheric resistance, ablation and the like in three dimensions taken over a specific discrete time interval. The term VM is the velocity increment or acceleration taken to be in meters per second. The term Isp describes a specific electrical impulse s and g is some gravitational constant 9.8 m/S$^2$.

The propellant mass is evaluated by the expression $MP = M_f(e^{VM/Ispg} - 1)$ in keeping with Byers original equation and the thrust per unit area of an acceleration grid are described by the values $$\frac{T}{A}, \frac{PT}{A} \quad \frac{T}{A} = (r)(5.2 \times 10^{-9}) \frac{VB^{2.75}}{R^{2.25}}$$

and in ohms per meter. PLOSS describes the transmission line dissipated power in KW, VL is equated with the transmission line voltage, V and L is the length of the transmission line in meters associated with FV the so called transmission line factor. $\Omega L$ denotes the resistivity of the said transmission line described in ohm /m, and PL, $\alpha$ps+$\alpha$HR are all equivalent to the values previously mentioned in the foregoing expressions.

If electromagnetic flux is spread or smeared radially along the interior surface S as in the case of magnetic induction elements the minor contribution to dynamic flux or propulsion can be considered as a scaler flow vector with function F through a close surface S which is equal to the integral of $\overline{V}.F$ over the value V bounded by S in a typical manner such that:

$$\oint_S^{\Delta dt} F \cdot dS = \int_V^{\Delta dt} \overline{V} \cdot F \, dV$$

or closed surface integral = a closed volume integral in terms of the cartesian equivalent $$\oint_S F \cdot dS = \int\int_{\Sigma yz} F_x dydz +$$

$$\int\int_{\Sigma zx} F_y dzdx + \int\int_{\Sigma xy} F_z dxdy =$$

$$\int\int\int_{\Sigma xyz} \left( \frac{\partial F_x}{\partial x} + \frac{\partial F_y}{\partial y} + \frac{\partial F_z}{\partial z} \right) dxdydz$$

reducing the closed volume integral to a closed surface integral or equivalent terms where applicable.

$$\frac{PT}{A} = \frac{3.6 \times 10^{-8}}{\sqrt{M}} \left( \frac{VB}{R} \right)^{2.25} VB + EV + \frac{PF}{A}$$

A is indicative of the active ion acceleration area of a designated thruster, M$^2$, T denotes the effective output of a single thruster, N. Where N=N$^1$+EX and Y describes a beam divergence loss contribution to Y taken from values of data obtained from propellants such as cesium or mercury vapor, xenon, krypton, argon, nitrogen or other substances.

The mass and dissipated power in various transmission lines are given by Byers $$ML = \frac{10^3 \, FVPL}{VL} [\Omega PL(\alpha PS + \alpha HR)]^{\frac{1}{2}} \, .$$

and $$PLOSS = \frac{LFV}{VL} \sqrt{\frac{\Omega LPL}{\alpha PS + \alpha HR}}$$

Figure 16:
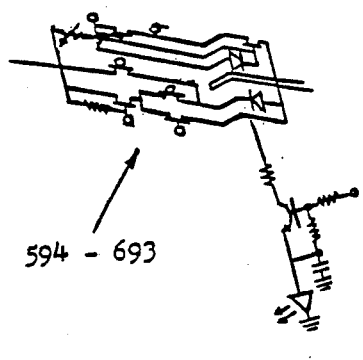
FIG. 16 is a greatly simplified schematical representation of a single modified optical electronic integrated circuit constructed on a single substrate.

ML is equivalent to the transmission line mass in kilograms FL, PL and VL are indicative of the transmission line factor, power dissipation in KW the transmission line volage. $\alpha$PS denotes the specific mass of a given power source expressed as Kg—w$^{-1}$ whereas $\alpha$HR is equivalent to the specific mass of transmission line thermal control for a given system also expressed in terms of Kg—w$^{-1}$. The term PL describes the density of a given transmission line in terms of Kg—M$^{-3}$, whereas $\Omega$ is the resistivity expressed FIG. 16 is a detailed schematic representation of only one of numerous optoelectronic integrated circuits (OEIC) on a three dimensional single substrate deployed within the electronic embodiment of the M.A.D. device. The modified circuit of a prototype worked on by subsidiaries of IBM and Hitachi. Numerals 594 through 693 represent the 100 equivalent structures embodied within the mainframe and ancillary structure of the device. The high speed gighertz operation, low noise ratio coefficient and stability to extremes in temperature and pressure, provide the added necessary field operations to complete acquisition of target and firing sequences of the three stage propulsion means mentioned previously in the foregoing text.

Figure 17:
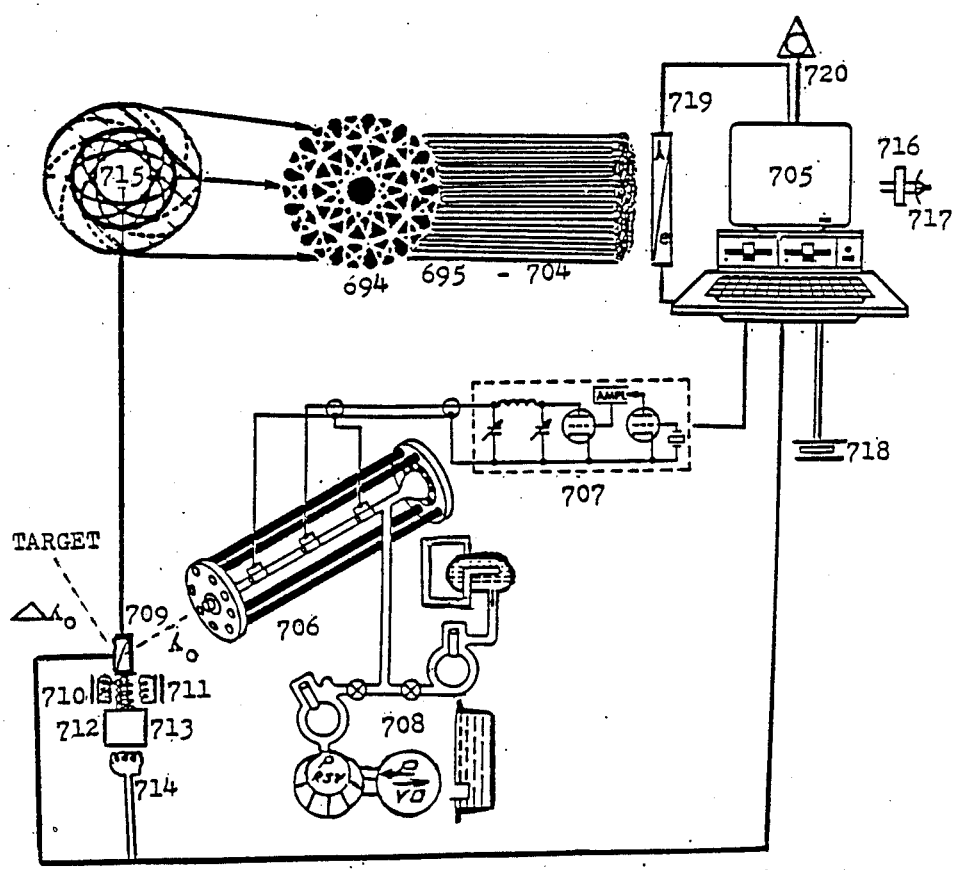
FIG. 17 is an illustrative perspective view of the laser target acquisition bidirectional fiber optic array.

FIG. 17 is a concise pictorial representation of the cylindrical muzzle embodied with fiber optical phallic target acquisition means and ancillary targeting system. There are several thousand bidirectional self focusing fiber optics designated by elements 694 situated circumferentially around the periphery of the muzzle of the main launch device. The spatial configuration of the array described collectively by elements 695 through 704 which are mutually disposed to form a series of partially overlapping optical or visual fields which can be electronically digitized prior to being sent to and processed by the main microcomputer complex represented herein by numeral 705. Direct laser target acquisition occurs by the sequential beaming of a conventional ion laser described by numeral 706, radio-frequency excitation circuit numeral 707 and gasifier pump complex described by element 708 which may emit visible wavelength region such as an argon laser or generate wavelengths in the invisible infra-red region of the spectra as that produced by a variety of CO$_2$ laser sources. An automated beam splitting means number 709 is provided with bidirectional or duel transmission foci areas which is retracted and or errected by an assembly solenoid elements 710 through 714 into and out of the central axis numeral 715 of the main launch cavity. The term phallic optical sighting system is utilized to describe the insertion and subsequent retraction of the beam splitting element 709 along the central axis numeral 715 prior to and after firing of projectiles. The optical data received from said beam splitting means is compared and correlated with the data received from the peripheral fiber optics system. Elements 716, 717 describes an ancillary radar tracking and receiving means for tracking the in flight progress of projectiles; whereas elements 718 through 720 are assigned to other tracking means such as sonar or telemetry.

Figure 18:
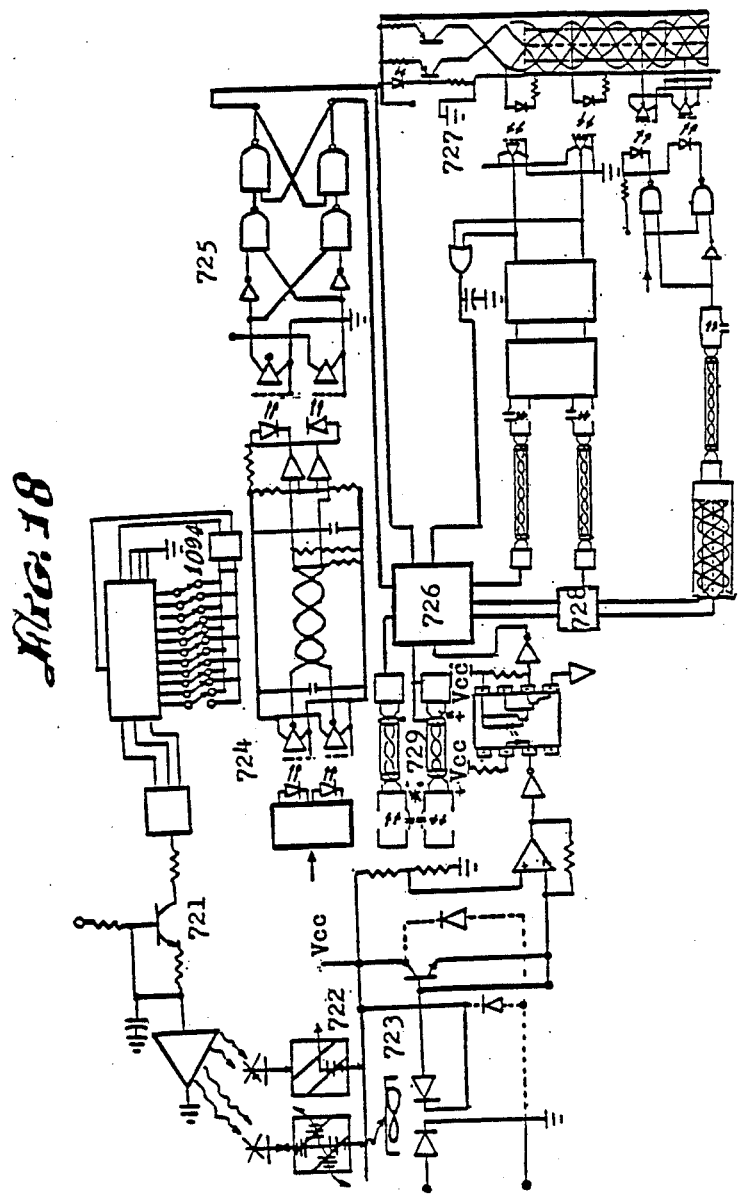
FIG. 18 is indicative of a concise simplified block and circuit diagram of a laser actuated tracking means.
Figure 19:
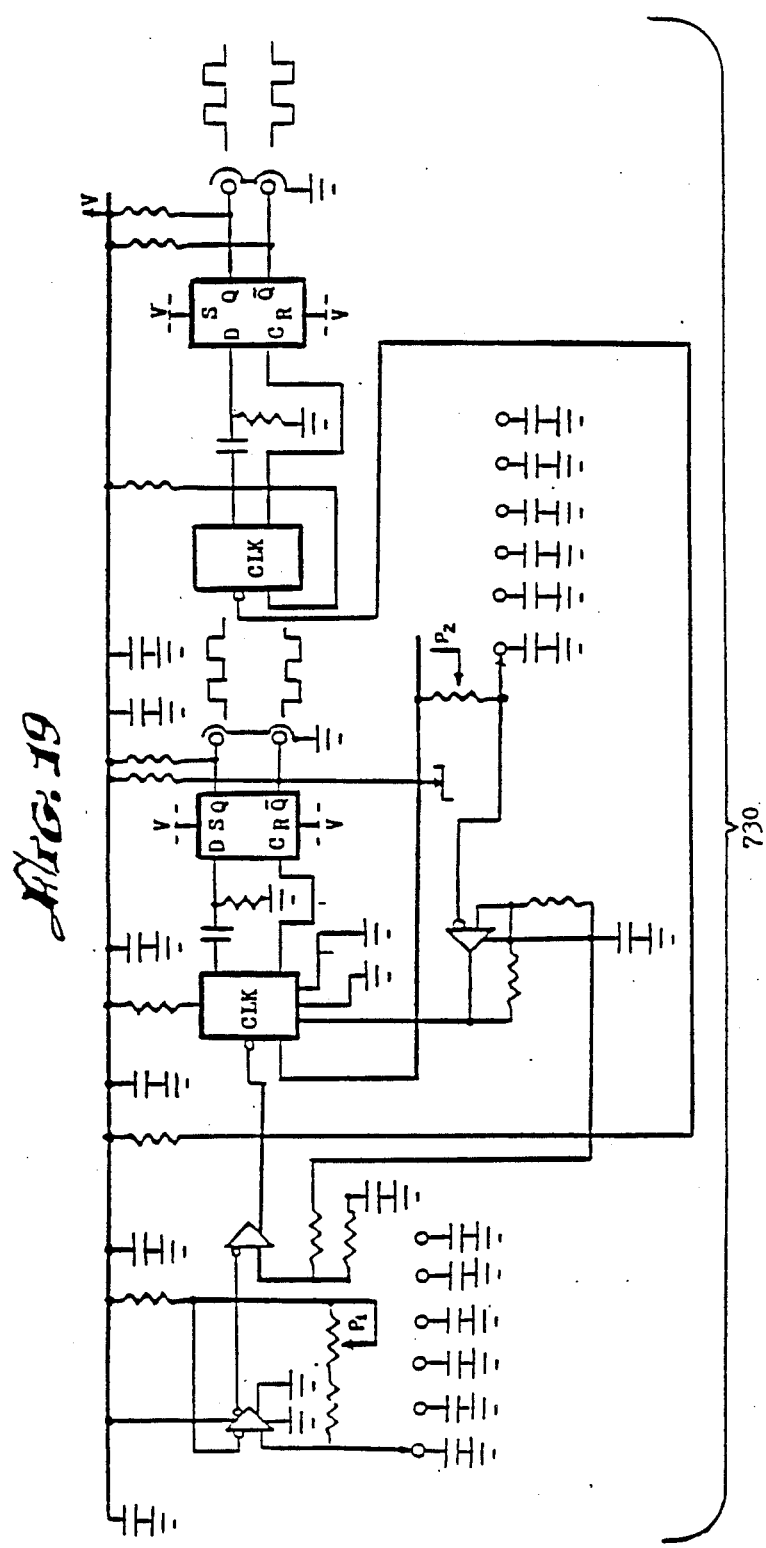

FIG. 18 is indicative of a concise simplified block and circuit diagram of the system specifically keyed to track the exact wavelength and frequency oscillation of a coded laser diode means. Here the optical electronic means governs the intercept of a designated emission by given fiber optics elements associated with projectiles pursuit or otherwise. Numerical values will be assigned to various simplified subsystems rather than their commercially available component parts for the sake of simplicity. Numeral 721 of FIG. 18 describes a typical laser diode, whereas elements 722, 723 designates a PGL Q-switch and reflective tracking means. The split phase driver unit is depicted by numeral 724 and the line signal electro-optical flip-flop means is denoted by element number 725. A high speed commercially available electro optical microcomputer designated by numeral 726 acts as a high speed comparator and tracker which is being keyed to home in not only on the specified laser wavelength and frequency but on a specific coded oscillation rate in order to negate the possibility of reacting to spurious signals. The optical electronic transmission lines provide signals to be reacessed and sent to explicit feed back systems, which are not shown. Numeral 728 denotes a simple servo-mechanism such as the articulating arm bearing the conduit system which receives and sends laser impulses to the command unit element 727. Numeral 729 designates a typical laser gyro system equivalent to that contained within the column of the piezoelectric means, and both elements 726 and 729, respectively.

Figure 19:
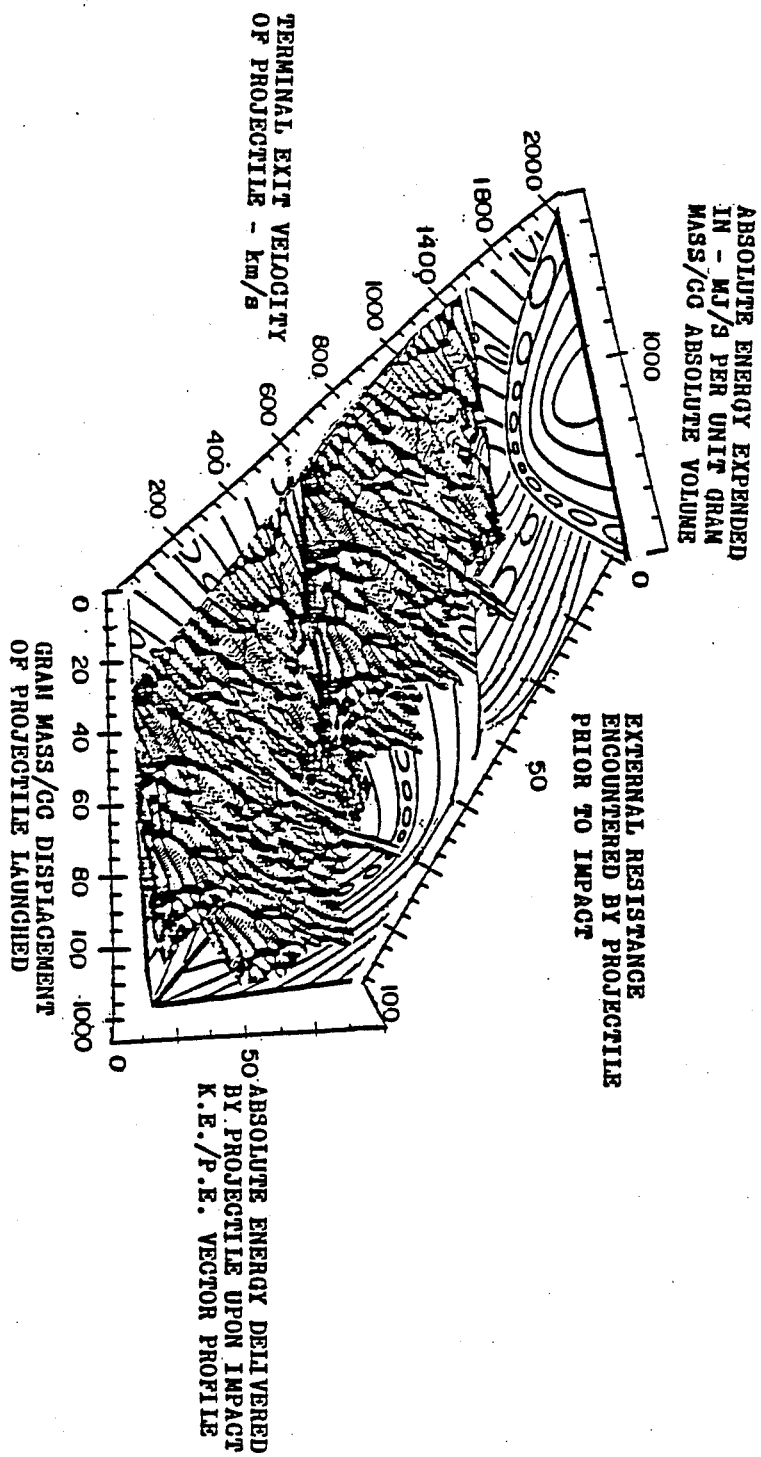
FIG. 19 is a simplified electronic schematic of an ancillary timing sequencer.

FIG. 19 represents in part a simplified and modified circuit diagram of one of the ancillary timing sequencers. Here a commercially available sequencer is modified with additional electro-optical oscillators and monostable multivibrator means. The circuit disclosed within FIG. 19 herein is composed exclusively of commercially available electronic components. The sequencer disclosed herein above is designated entirely by a single numeral number 730 for simplicity sake, and it has varying pulse widths which ranges from 10 milliseconds to less than several nanoseconds.

Figure 20:
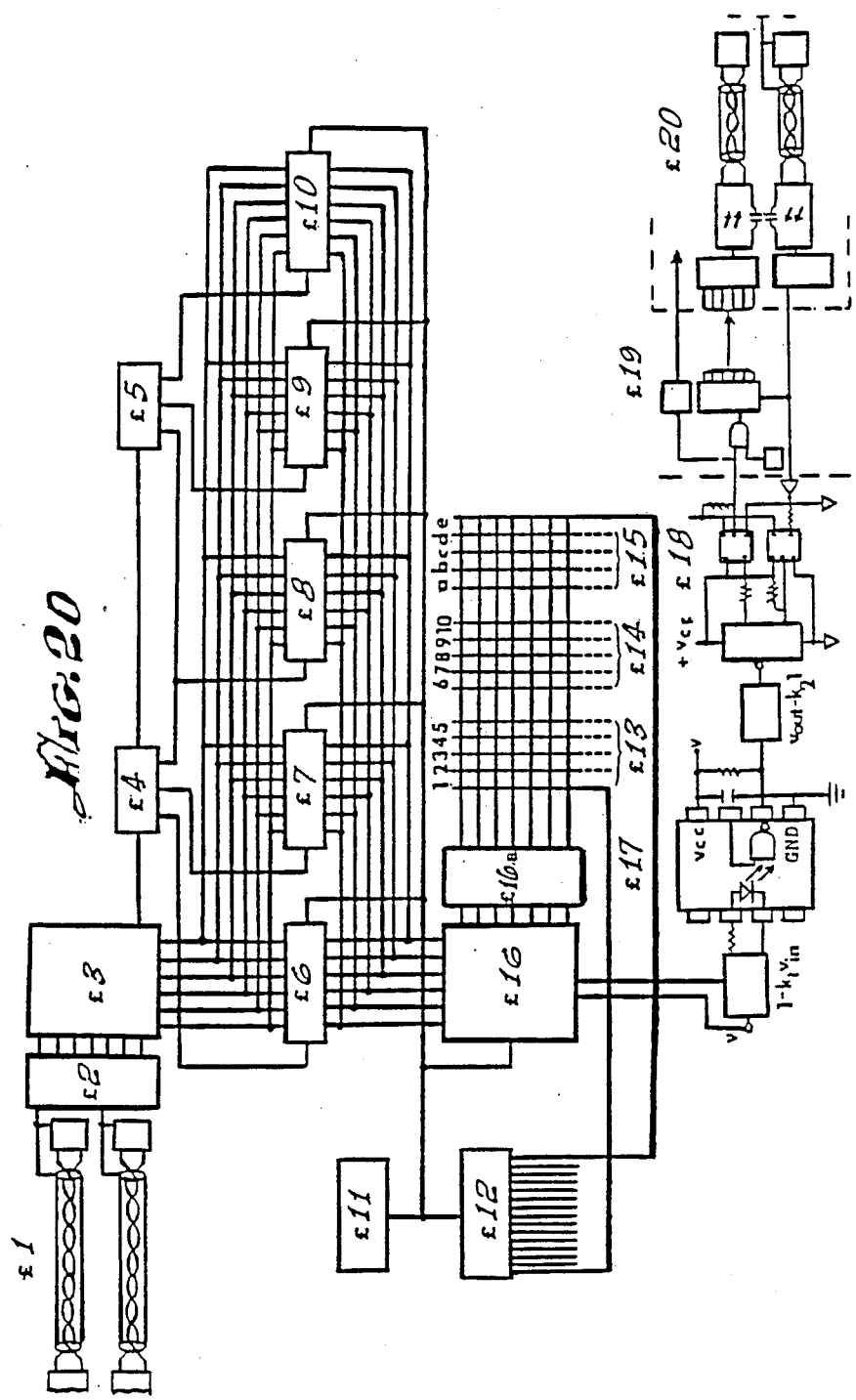
FIG. 20 is a greatly simplified combination block diagram and schematical representation of optical electronic analog/digital converter feedback unit employed by the M.A.D. unit.

FIG. 20 exemplifies a simplified combination block diagram and schematical representation of only one of several optical electronic analog/digital converter feedback units employed for sensory updates, servo-scans and the like. Alpha numeric values are assigned to each subsystem in order to more clearly define a few basic component systems. Elements 1, 2 and 3 are indicative of the optical electronic sensory array, optical electronic encoder, and analog/digital interfacing and keying means. Alpha numeric values 4, 5, and 6 through 10 designates array selectors and a full complement of input storage buffers. Element 11, 12 and 13 through 15 denote a clock/timing means, column drivers and display terminals. Element 16 collectively describes a VLSI chip containing data input transfer, a column selector, comparator encoder/decoder signal outflow means. Elements 17, 18, 19 and 20 designate a voltage to frequency converter, monopulse multivibrator drive means and a line driver/line receiver bidirectional means.

Figure 21:
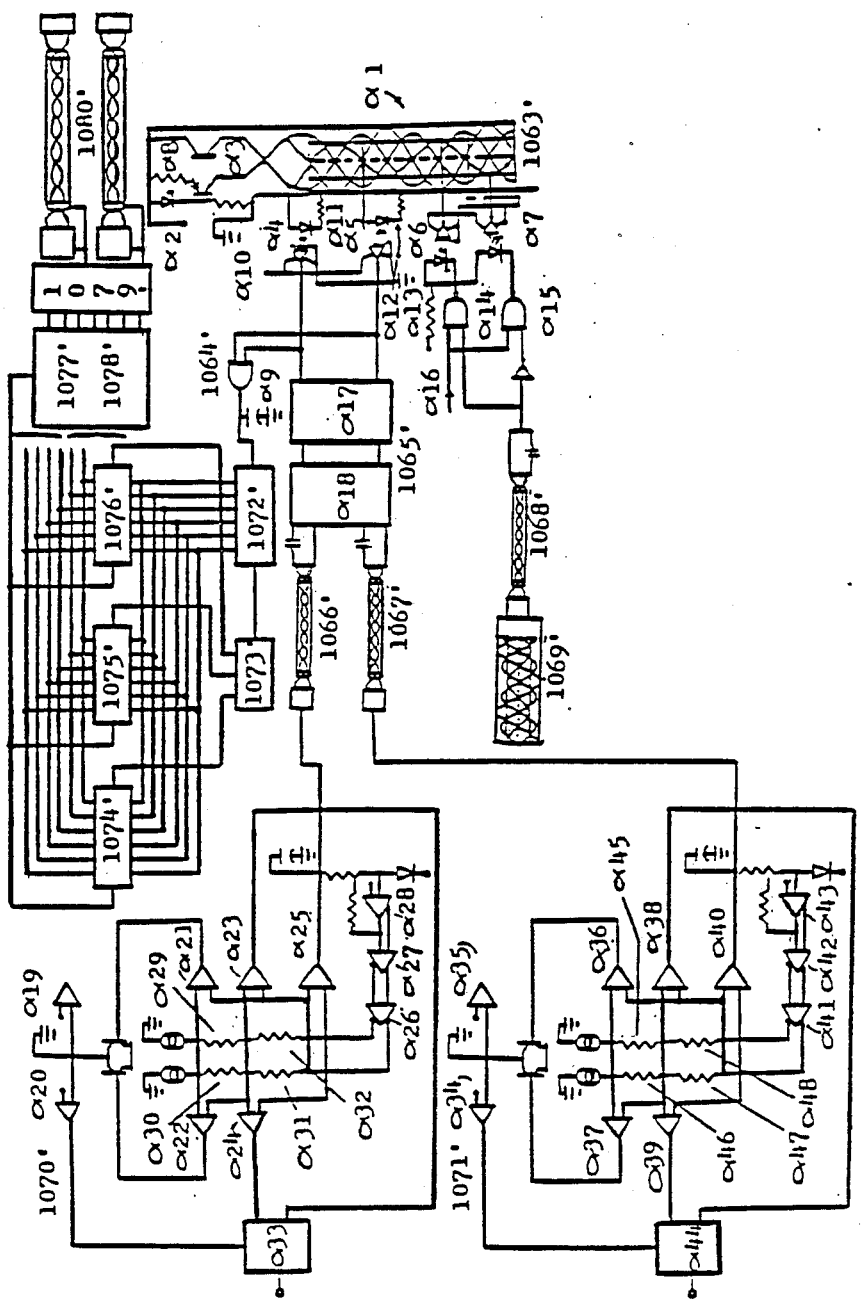
FIG. 21 is in effect a combination block diagram and schematical representation in which only one of several optical electronic analog/digital converter units deployed by the M.A.D. unit.

FIG. 21 is a combination block diagram and a simplified schematic representation of only one of several equivalent optical electronic multiplexing stations associated with the preferred embodiment. Each electronic subsystems will be assigned a numerical equivalent and all pertinent component parts will be designated an alphanumeric value. Each and every component structure or equivalent structure is readily available commercially from such sources as Hewlett Packard, Texas Instruments or other suitable manufactures. A generalized version of a multiplex station is illustrated by 1063', 1064' denotes a logic gate. $\alpha1$ is descriptive of a typical signal line, $\alpha2$ defines the transmission line supply. Alphanumeric symbols $\alpha4$, $\alpha5$, $\alpha6$ and $\alpha7$, $\alpha3$ collectively denote open collector outputs. $\alpha8$ through $\alpha13$ describes various resistive elements. The data is inputed via line $\alpha14$ and $\alpha15$ denote an enable segment. The line status is denoted by $\alpha16$. Numeral 1065' consists of two mutually exclusive or Flip-Flop subsystems, as denoted by $\alpha17$ and $\alpha18$. Incorporated $\alpha17$ is an independent wave interrupt sequence, whereas $\alpha18$ consists of an exclusive or Flip-Flop system with a Kalman filter. Numerals 1066' and 1067' consist of specially encoded optical electronic data output channels. Numerals 1069' and 1068' are indicative of a data influx channel with element 1068' being a data compression undergoing compression prior to systems entry. Numerals 1070' and 1071' describe two separate but equivalent block diagrams of a four chip hybrid receiver means, each of which act as separate wave discriminaters. Each digitized signal is analyzed on the basis of electronic wave characteristics $\alpha19$ denotes the link monitor output VREF whereas $\alpha20$ describes the ALC Amp and VREF. $\alpha21$ is indicative of a negative peak comparator, whereas $\alpha22$ is indicative of a positive peak comparator. The logic low and logic high comparators are denoted by $\alpha23$ and $\alpha24$. The differential amplifier stage and the gain control stage are described by $\alpha25$ and $\alpha26$. The bias voltage preamp described by $\alpha27$ and $\alpha28$ illustrates the D.C. restorer amp. Elements $\alpha29$ through $\alpha32$ depict resistors. The element $\alpha33$ is representative of an R-S Flip-Flop data output means. Numeral 1071', as previously noted is equivalent to numeral 1070' and therefore elements $\alpha19$ through $\alpha33$ are equivalent to elements $\alpha34$ through $\alpha48$. The present status of each signal enters element 1072', a mainline sequencer which sends its input data to a clock means, which is denoted by numeral 1073'. The data processed by numerals 1072' and 1073' are collectively sent to numeral 1074' through numeral 1076', which consists of three equivalent short term storage multivibrator means. Numeral 1078' consists of a Kalman filter encoder means. Numeral 1079' depicts a biphasic line. The digitized electronic signals are converted into their optical electronic binary equivalents, and is then sent to the main computer complex for further analysis, as noted by numeral 1080'.

FIG. 22 depicts a combination block diagram and a partial schematic of an exemplary form of a single optical electronic analog/digital converter unit. FIG. 22 like that of FIG. 21 is composed entirely of commercially available components, each of which is assigned an alphanumeric value. Subsystems 1081' and 1082' are equivalent optical line driver and receiver means that receive a given transmission wavelength and or its reference beams. Numerals 1083' and 1084' are equivalent and indicative of common optoisolators. The resistor elements of 1083' are denoted by $\beta 1$ through $\beta 5$. The accompanying optical electronic IC means is described by $\beta 6$ and $\beta 7$ respectively. The effective ground and logic element is described by $\beta 8$. $\beta 9$, $\beta 10$ and $\beta 11$ describe other diode means, which are associated with the subsystem. Numeral 1083' is equivalent to numeral 1084', therefore all components of numeral 1083' are equivalent to those of 1082', such that components $\beta 1$ through $\beta 10$ are equivalent to components $\beta 11$ through $\beta 21$. Numeral 1085' represents an analog/digital converter means IC $\beta 22$ through $\beta 29$ of numeral 1086', which describes the isolated analog/digital in terms of parallel data outputs. Components $\beta 30$ through $\beta 57$ denote resistor elements of numeral 1086' for the respective data outputs denoted by Di through Dn. $\beta 58$ denotes the start converter process, whereas $\beta 59$ describes the termination of the converter process. Each data output is received by a digital/analog isolator system, two of which are denoted by numbers 1087' and 1088'. Numeral 1087' and 1088' are equivalent to one another, and to all similar such units. A multivibrator means of numeral 1087' is denoted by $\beta 60$. The resistive elements of subsystem 1087' are described by the alphanumeric values $\beta 61$ through $\beta 64$. There are two equivalent IC's denoted by $\beta 65$ and $\beta 66$. $\beta 67$ is indicative of a logic inverter, $\beta 68$ depicts a oscillator and $\beta 69$ denotes a logic AND gate. The one shot means is denoted by $\beta 70$ and the clock counter means is described by $\beta 71$. The microprocessor system is described herein by $\beta 72$ with an input port denoted by $\beta 73$ and an output port indicated by $\beta 74$ component elements $\beta 75$ through $\beta 90$ of numeral 1088' are equivalent to those elements $\beta 60$ through $\beta 74$ of numeral 1087'.

FIG. 23 is a generalized schematical representation of a multiple tone generator typical of one of several deployed by the M.A.D. device. All component parts depicted in FIG. 23 are commercially available. Numeral designations of the tone generating system proper are as follows: a basic voltage regulator or governor is indicated by numeral 1089'. An analog multiplexer is described by numeral 1090' and two binary counters are indicated by numeral 1091' and 1092' respectively. The tone frequency generating IC is indicated by numeral 1093', which is adjacent to the key or switching elements, denoted by number 1094'. The resistor elements are denoted by alphanumeric values $\nu 1$ through $\nu 14$ and the capacitors $\nu 15$ and $\nu 16$, $\nu 17$ The typical NAND (inverting AND) gate is denoted by $\nu 18$ and $\nu 19$. The frequency generated tone sequence can enter any one of four or all of the following systems denoted by numerals 1095' through 1098', which terminate in either a speaker system or equivalent piezoelectric means for audio sound to be perceived by the user. Normal tonal sequences are conducted through lines 1095' and 1096'; whereas alternate tone sequence or tonal sounds are provided by high speed duplex systems, if specified by either the user or the main computer, via the keying means. Subsystems 1097' and 1098' are equivalent units. Numeral 1097' resistive elements are described by $\nu 20$ through $\nu 25$, whereas $\nu 26$ and $\nu 27$ denote the capacitance means. The invert means are defined by $\nu 28$ and $\nu 29$, whereas the logic or gate is designated by $\nu 30$ and $\nu 31$, respectively. The controlling IC's of 1097' are prescribed by $\nu 32$ and $\nu 33$. As mentioned earlier 1097' and 1098' are equivalent subsystems, therefore component $\nu 20$ through $\nu 33$ are equivalent to components $\nu 34$ through $\nu 47$.

Figure 24:
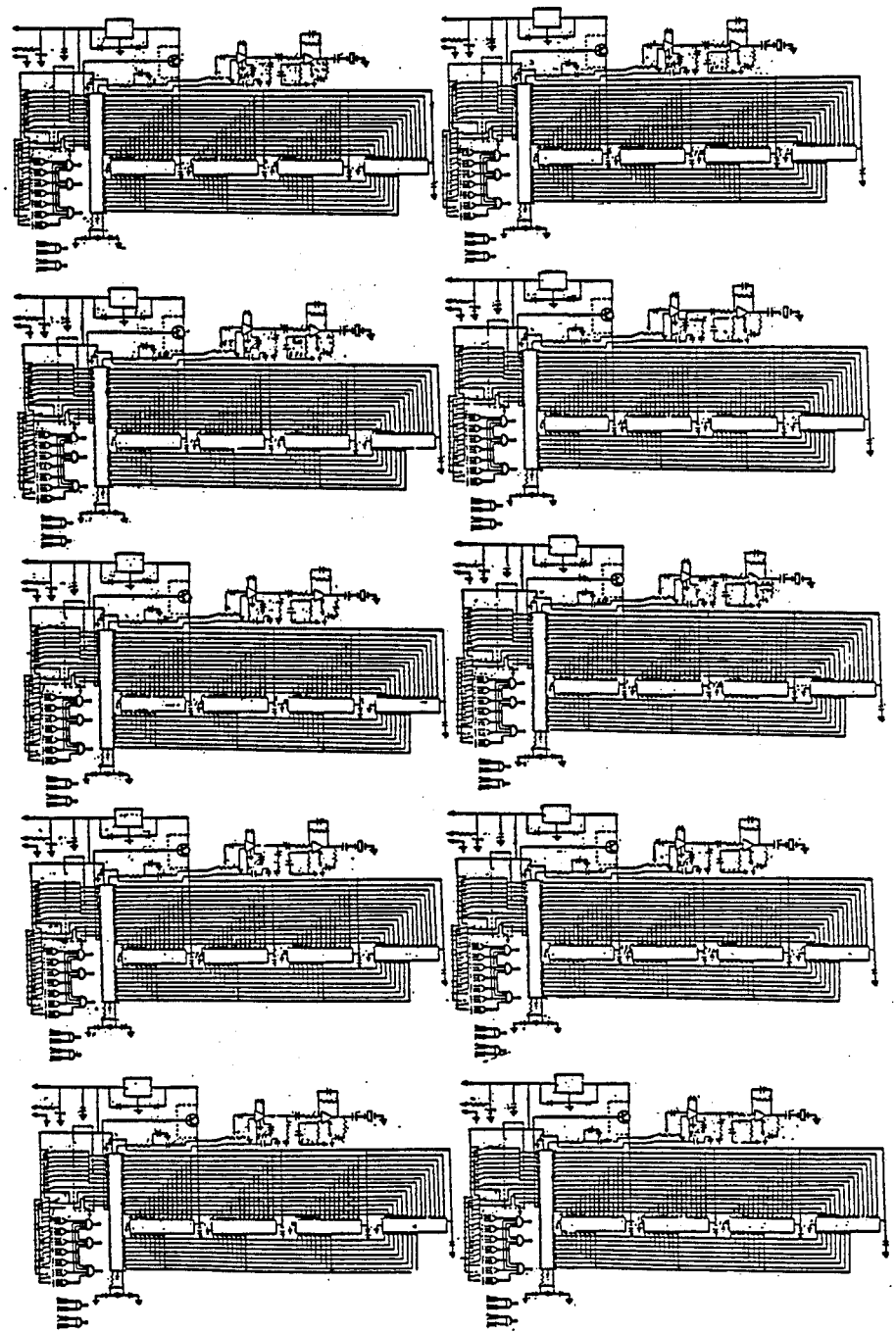
FIG. 24 is representative of a basic circuit diagram disclosing the structural disposition of electronic speech synthesizer means etched onto a single card.

FIG. 24 is a concise circuit diagram describing the structural design of a modified speech synthesizer unit typical of the type embodied within the mass driver device. Numeric values are not assigned to components or repetitive circuit elements, which are described in detail in FIG. 27. The above mentioned circuit diagram represents a single insertable card element. There are optimally ten equivalent cards containing speech synthesizer elements associated with an equivalent number of speech recognition elements, which are interfaced with an internally based CPU embodied within the mass action device. An extended vocabulary of over ten thousand words more than 200 phrases in various languages, dialects and/or genders can be synthesized by each of the aforesaid cards. The number of phrases, the type of dialects and the different genders employed are contingent on on number and type of digitized signals encoded into each microprocessor embodied within the aforesaid speech synthesizer card. Digitized signals encoded from the voices of human donars are the simplest, most direct and the least expensive technique presently available to obtain different dialects, languages, genders.

Figure 25:
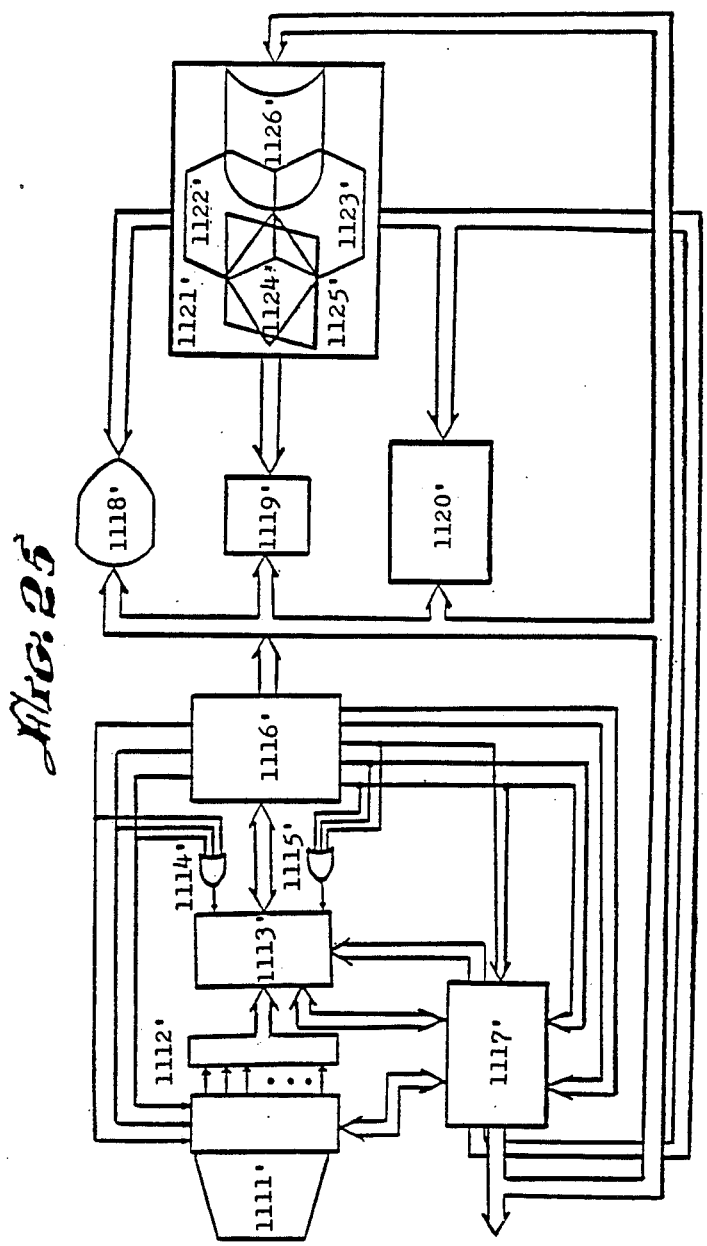
FIG. 25 denotes a simplified block diagram explicitly showing the effective position of both the tone generator and speech synthesizer relative to a mediator computer means.

FIG. 25 denotes a simplified block diagram which explicitly shows the effective position of both the tone generator and speech synthesizer relative to an interactive computer complex. Numeral 1111' denotes a key matrix, numeral 1112' describes an encoder means and number 1113' indicates a multiplexer unit. Numbers 1114' and 1115' are illustrative of logic gates, whereas numeral 1116' describes a common signal condensing microprocessor means. Numeral 1117' defines a commercially available ROM, RAM and EEPROM means, such as a modified SDK86 and or its equivalent as described earlier in this disclosure. Numerals 1118', 1119' and 1120' describe a interactive graphics display terminal, a tone generator and a speech synthesizer as previously indicated in the body of this disclosure. Numeral 1121' through 1126' depicts the entire ancillary portion of the computer complex as denoted by numeral 1121', which has operative subunits described therein by numerals 1122' to 1126'; which provide for a totally interactive expandable system, with a voice recognition and voice actuated computerized command program. The operative subunits overlap each other partially. Numerals 1122' and 1123' depict preparatory functions where the data is processed. The data enters and exits the computer complex as illustrated by number 1124'; whereas numerals 1125' is indicative of a decision processor. The online storage means of the computer complex is described by numeral 1126'.

FIG. 26 is indicative of a concise simplified schematical representation of a small portion of the logic circuit forming the basic embodiment of a single microcomputer means. The vital portion of the circuit employed as denoted in FIG. 26 is equivalent of a multitude of similar such circuitry utilizing VLSI/VISHIC technology. The separate I.C. elements are so constructed as to be repetitive, providing a reliable microcomputer with an increased ability to calculate and implement target acquisition, thrust parameters, pursuit vectors and the like. The I.C.'s are disposed on a single portion of the VLSI card which is replaceable in itself as well as each integrated circuit (I.C.) means. Each integrated circuit is designated by its own alphanumeric value and there are twenty four I.C.'s depicted in the figure herein. The I.C.'s are listed by elements $\phi 1$ through $\phi 24$ with elements $\phi 15$ and $\phi 16$ acting as interragators for logi elements $\phi 7$ through $\phi 4$. Comparator means for data are indicated in part by elements $\phi 1$ through $\phi 4$ and element $\phi 19$ through $\phi 23$. Alphanumeric values $\phi 25$, $\phi 26$, $\phi 27$ and $\phi 28$ are indicative of origins of embarkation wherein data either enters from other circuits or leaves from the portion of the circuit depicted in FIG. 26 bound for other circuits. The other portions of the partial circuit diagram depicting circuits. Numeral 3000 of FIG. 26 collectively designates a single card element of the aforesaid microcomputer means.

FIG. 27 is representative of a basic schematic of a modified electronic speech synthesizer, which is embodied within the aforesaid device. The extended vocabulary is in excess of 1,000 words, and more than 20 phrases, which is announciated in either a male voice, a female voice or both voices. As with preceding figures all components are commercially available by such manufactes as Intel, IBM, National Semiconductor and others. Numerals 1099' through 1103' depicts equivalent speech ROM IC's which contain relevant speech data, where as the IC denoted by numeral 1104' represents the actual speech processor. An encoder signal digitizer and auto-keying complex is described by numeral 1105' and the manual keying sequence is indicated by numeral 1106'. The systems resistor elements are denoted by alphanumeric values $\epsilon 1$ through $\epsilon 13$ and the various capacitor components are noted by $\epsilon 14$ through $\epsilon 35$. Numerals 1106', 1107' and 1108' describes a typical voltage transistor element. $\epsilon 36$ denotes a crystal oscillator, whereas numeral 1110' describes a piezoelectric wafer which is utilized as a speaker unit. Analog to digital conversion of analog signals are necessarily performed during speech recognition and synthesis of speech by the aforesaid unit. Signal converted into digital impulses must be prefiltered to remove frequency components above what is defined by those skilled in the art, as the half sampling frequency; in order to eliminate ambient white noise generated from the environment, which can distort information to be processed or otherwise acted upon by the CPU. The most fundamental talking integrated circuits are digital to analog converters, which upon receiving an appropriate sequence of commands from the CPU playback digitized and speech stored in the memory of one or more microprocessors. It is perferred, but not critical to the function of the aforesaid unit that microprocessors with stored verbal commands, instructions and tones be embodied within the aforesaid device. Microprocessors equipped with stored verbal commands or instructions are preferred because presently they sound more natural, have a higher reliability or lower incidence of fault and are more versatile then conventional synthetic language systems. The preferred microprocessor elements embody digitized signal equivalent of analog speech or voice patterns derived from encoded signals obtained from one or more human hosts. Since several hosts can be encoded in a single microprocessor element several different voices, genders, languages or dialects can be embodied within a single microprocessor unit, as previously indicated in the specifications.

Figure 27A:
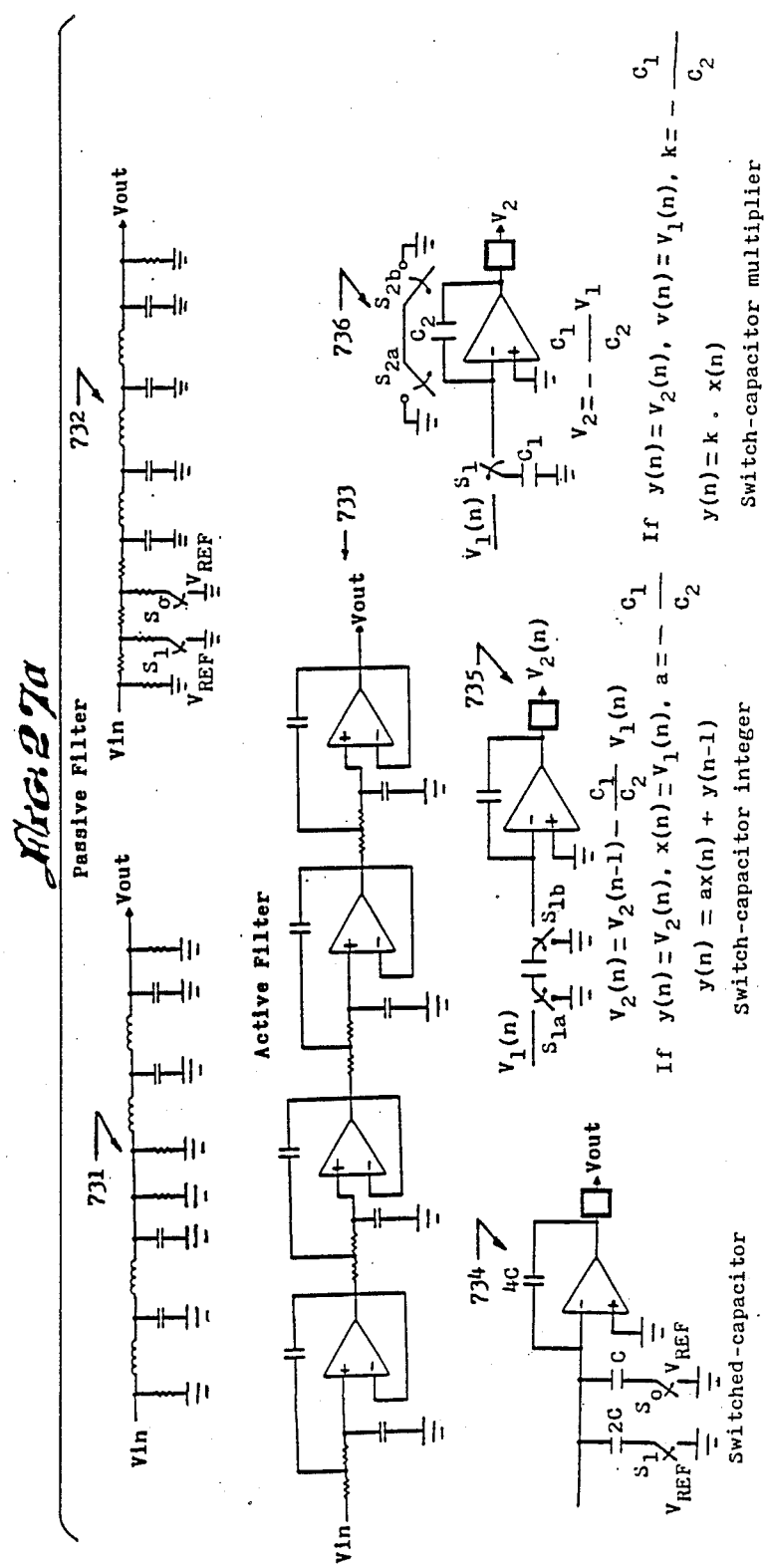

FIG. 27a discloses briefly in part various filter topologies equivalent to the type of units embodied within the speech processing elements of the aforesaid device. Six separate and distinct filter types are disclosed in FIG. 27a and each said filter type is assigned a single numeric value. Numerals 734 through 736 collectively designate the basic circuit designs from which the active, passive and switch capacitor types of filter elements; which implemented the speech processing unit of the aforesaid device. Since the design function and implementation of the aforementioned filter types are standard separate numeric values are not assigned to separate component parts of each circuit. The integrated circuit units, capacitors, ground resistive and switching elements are obvious and readily understandable to those skilled in the art.

Figure 27B:
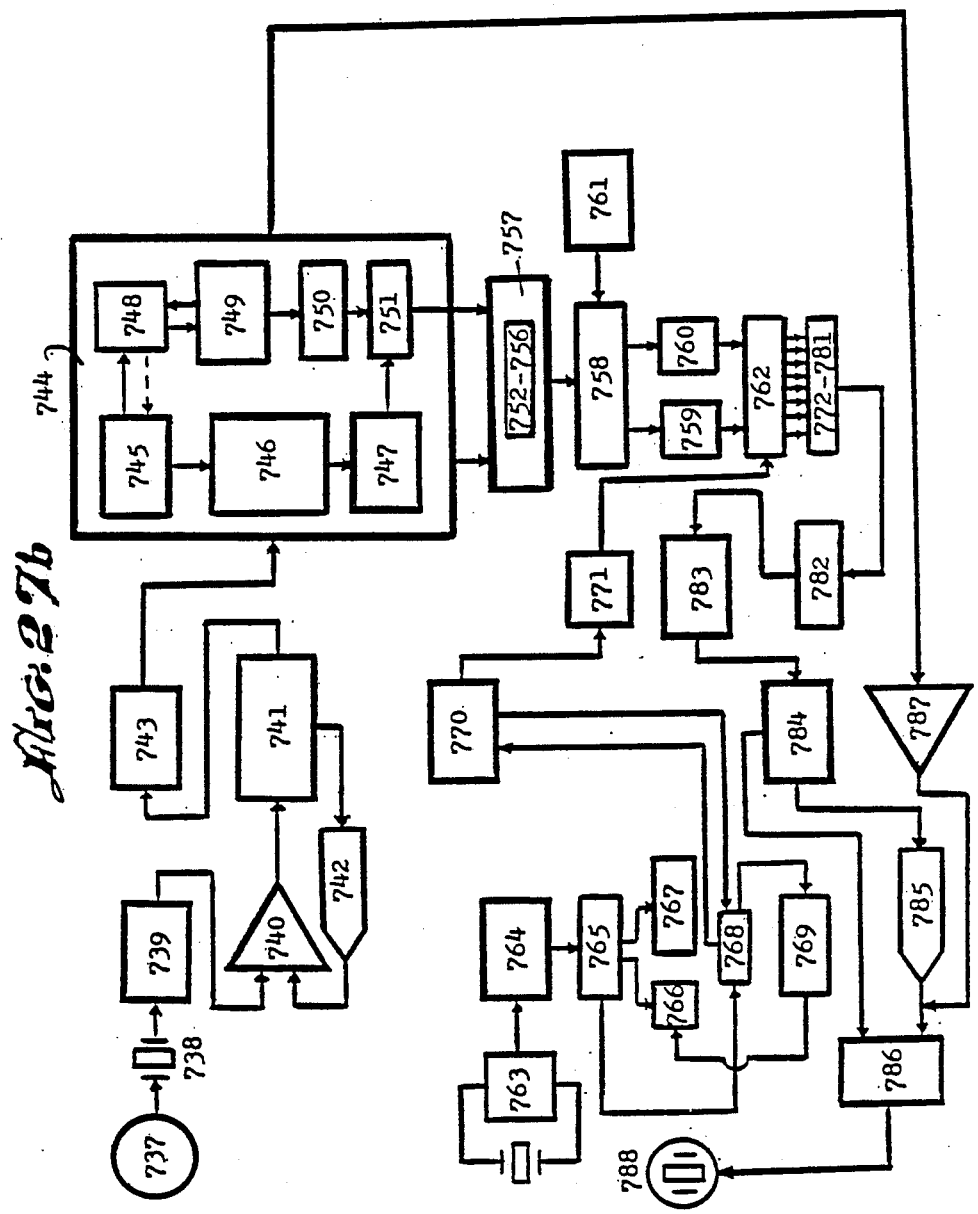
Figure 30A:
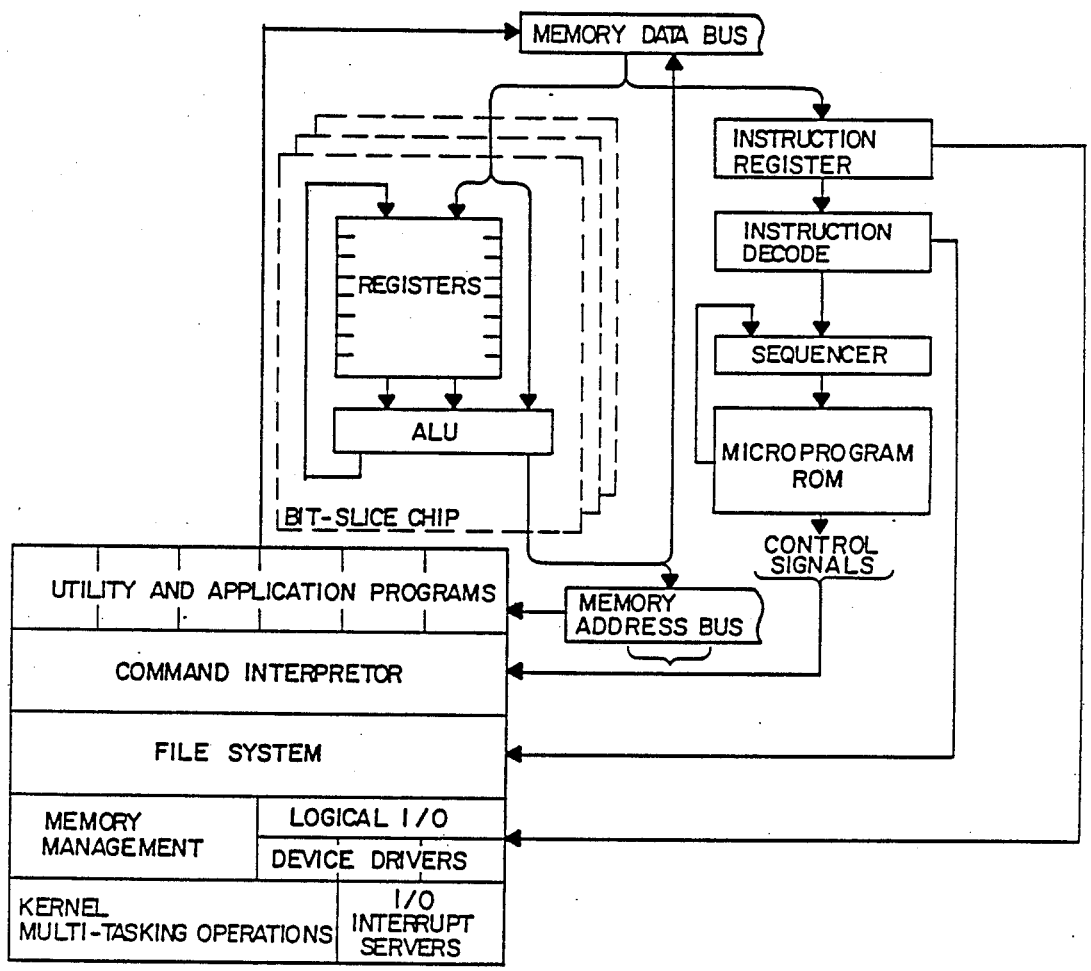
FIGS. 30a, 30b are concise block diagrams illustrating the operation of the CPU and ancillary systems.
Figure 30B:
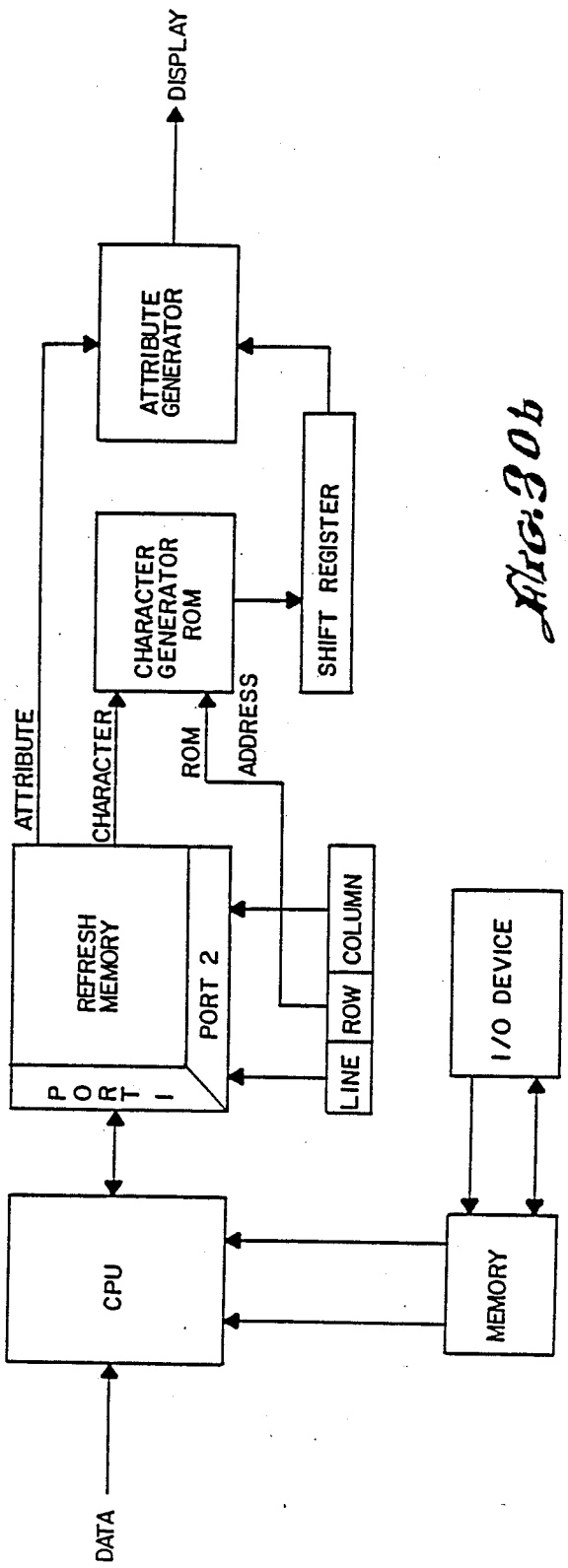

FIG. 27b is a block diagram concisely illustrating the systems operation of the speech processing element of the aforesaid unit. Analog verbal input is introduced, as indicated, by numeral 737 to piezoelectric transduction element 738, which transmits the data to an analog then to digital converter element 739, which samples the incoming data. Information processed by element 739 is conveyed to comparator means 740, which compares incoming signals with stored values and transfers the data to process 741; which performs successive approximations and functions as a logic resistor element. Data acted upon by element 741 is divergently sent to digital-/analog converter element 742, which reenters comparator means 740 for reprocessing and a number of successive filter elements operating collectively as a filter bank, indicated by number 133. Data filtered from element 743 enters CPU element 743 to be acted upon. The CPU unit collectively defined by number 744 embodies; a parameter extractor, numeral 745, a comparator bank with stored data statistical parameters, numeral 746, an expert system, number 747, a short term storage process, 748, global memory element described by 749, an additional storage access element defined by number 750; and a process wherein decisions regarding speech recognition and synthesis are conducted.

Once decisions regarding recognition of speech input have been implemented by element 751 of CPU 744, then process 752 is actuated. It is within process 752 where the appropriate response to verbal inquires or voice commands elicited by the user or others are implemented by engaging the proper synthesizer format to be accessed by the CPU. Element 757 engages Address Bus 758, which in enable mode enlists ROM element 759, RAM element 760 and is engaged by Address Arithmatic unit 761. Elements 759, 760 interface with Data Bus 762, which engages either simultaneously or in succession a number of separate and distinct chip or microprocessor elements containing the necessary vocabulary to synthize the appropriate verbal respond, as indicated by numeral 781. The Data Bus described by number 762 is additionally implemented by elements 763 through 782. Elements 763, 764 and 765 entail a clock means, program counter and EPROM unit, respectively. The ROM address is enlisted, as process 764 enlists process 765. EPROM process, 765, is implemented both from a verbal key processor and manual key pad element, not shown in the figure. Process 765 additionally enlists RAM element 766, Barrel Shifter means 767 and ALU element, as described by numeral 768. Process 768 enlists an Over Flow Detection means 769, which reenlists RAM process 766. Element 768 additionally enlists the operation of accumulator element 770 which engages Scaler process 161, which in turn engages Data Bus means 762. Element 762 engages processes 712 781 which contains an optimum number of chips or integrated circuit elements, 1-n, encoded with a sufficient quantity of digitized signals to compose a large variety of verbal responses, in the form of complete sentences in the event of a medical emergency, to answer inquires or to reply to commands from the user or others in the immediate vicinity of the user. The proper syntax, grammer and sequencing of complete sentences in the synthesized response are coordinated by element 782, which is designated as a synthetic speech collater unit. Process 782 enlists I/O controller element 783, which engages Data Register process 784. Element 784 enlists DAC digital/analog converter means 785, which actuates the output MUX process, described by number 786. The analog output is conveyed to a piezoelectric emitter unit described by number 787, which transduces the speech output signals into analog pressure waves to be heard by the user or others in the immediate vicinity of the user.

FIG. 27c is a block diagram briefly illustrating the operation of a single integrated circuit or microprocessor element described by element 781 of FIG. 27b. Numeral 781 of FIG. 27b embodies an optimum of number of separate and distinct equivalent chips or integrated circuit elements. Each chip or integrated circuit element operates exactly the same as the other microprocessor element; however each said chip element is encoded with a different complement or text of digitized signals entailing a different set of instructions or information embodied within the chip element. The Data Bus disclosed by numeral 762 enlists word decoder element 781a, Speech ROM Control element 781b and is assisted by ALU Control and Interpolation element 781c of the given chip. Each chip is additionally supplied with a ceramic oscillator, number 781d, a clock and Power Down Control element, as described by 781e and Auxiliary Counter Means designated by 781f. Element 781e enlists element 781f, which acts on the Speech Data ROM Control element 781b of the chip. The Data Bus 762 interfaces with the Speech Data ROM, 781g, which is addressed by Address Register 781h. Alphanumeric values 781i, 781j and 781k describe a Message Latch and Control element, Select Lines and Control Lines, respectively. A Pitch, Gain and Interpolation RAM element described by element 781l and Bandcenter and Bandwidth Coefficient RAM means defined by element 781q interfaces with Data Bus element 762. Process 781l engages Pitch element 781m, which enlists Filter Process 781o; whereas Noise Generator 781n enlists Filter Process 781p. Element 781q engages process 781r which is a coefficient Lookup ROM element containing 256×10 bits. Elements 781r enlists process 781s, which entails eighteen second-order sections 10×15 bit multipliers. Element 781m, 781n through filters 781o, 781p engage process 781s at separate addressible interface points. Process 781s enlists Pulse Width Moduation D/A element 781t and the data signals processed by element 781t are conveyed to Smoothing Filter 781u. Signals transmitted from element 781u are enhanced by Power Amplifier 781v. Data from element 781v sequentially enters process 782, the Speech Collater unit, along with data taken in turn from other equivalent Power Amplifier elements associated with other chips, as described earlier in FIG. 27b.

When processing a signal for analysis, recognition or for some other purpose, the spectrum and/or content of the signal at different frequencies must be evaluated in the real world. Since the CPU for purposes in a linear discrete arithmatic logic unit it is reasonable to evaluate a discrete portion of data within a finite period of time and infinite integrals are evaluated as linear discrete processes, in order to yield first and second order approximations of data within a finite real time interval. The process of windowing allows linear discrete evaluation of a spectrum of data with marginal losses in temporal accumulation of information or evaluation of data. Optimal evaluation of a spectrum of a segment of a signal is briefly described in the equation herein below:

$$X_s(f) = \int_{-\infty}^{\infty} w(t)x(t) e^{-j\sin 2\pi ft} dt$$

$$= \int_{-\infty}^{\infty} w(t)x(t)(\cos 2\pi ft - j \sin 2\pi ft) dt$$

$$= \int_{-\infty}^{\infty} w(t)x(t)\cos 2\pi ft \, dt$$

$$- j \int_{-\infty}^{\infty} w(t)w(t)\sin 2\pi ft \, dt$$

where
$X_s(f)$ = spectrum frequency f
$x(t)$ = time function
$w(t)$ = window

If w(t) is evaluated as zero outside some given interval from $t_1$ to $t_2$ then the expression can additionally be expressed, as $$X_s(f) = \int_{t_1}^{t_2} w(t)x(t)\cos 2\pi ft \, dt$$

$$- j \int_{t_1}^{t_2} w(t)x(t)\sin 2\pi ft \, dt.$$

Where spectral magnetudes are generated for storage as perceptually salient features, a discrete temporal approximation or DFT (discrete Fourier transformation) embodying a window function is required. To store a finite amount of frequency amplitudes and to analyze a finite quantity of speech values within a discrete interval of time requires a DFT implemented with a window function similar to the type expressed herein below:

$$X_s(k) = \sum_{n=0}^{N-1} w(n)x(n)e^{-j(2\pi nk/N)}$$

$$= \sum_{n=0}^{N-1} w(n)x(n)\left(\cos \frac{2\pi nk}{N} - j \sin \frac{2\pi nk}{N}\right)$$

$$= \sum_{n=0}^{N-1} w(n)x(n)\cos \frac{2\pi nk}{N}$$

$$- j \sum_{n=0}^{N-1} w(n)x(n)\sin \frac{2\pi nk}{N}$$

where k is the frequency index, n is the time index, N is the quantity of points in the time sequence and normalization of the scale of frequency is instituted, such that, the frequency $2\pi$ corresponds to the frequency that the original time wave form is sampled; yielding an effective measure of the spectral content of each analyzed segment.

Filtering of discrete time signals as for linear filtering, where the output of the system is dependent on the present, on past inputs and past outputs if recursive, as indicated by the following expression $$y(t) = f[x(t-u), y(t-v)]$$

where
y = output signal
x = input signal
$0 \leq u < \infty \quad v < \infty$
u,v = time variables indicating memory of system with regard to past inputs and outputs (respectively)

a resistor and a capacitor with a perfect impulse at the input yields $$y(t) = e^{-HRC} \text{ for } t \geq 0 \text{ at the output.}$$

however in general filtering computations are in the form described herein below $$y(n) = \sum_{k=1}^{N} b_k y(n-k) + \sum_{k=0}^{M} a_k x(n-k).$$

FIG. 28 describes in part one of only several timing oscillator circuits or sequencer means deployed by the device. The partial design schematic depicted in FIG. 28 is a basic variation of a commercially available circuit, which can be provided by companies such as Intel, I.B.M. or others. The circuitry disclosed in FIG. 28 predisposes the operation of the logic circuit depicted in FIG. 27. The key integrated circuits in FIG. 28 are assigned the alphanumeric values &1 through &15. Elements &16 through &24 are indicative of I/O from other circuits. The capacitance diode, resistive elements are readily understandable by those skilled in the art and are not assigned to alphanumeric values.

FIG. 29 is a concise circuit and block diagram essentially describing the operation of one of several equivalent solenoid means embodied within the mass action driver device. Numeral 900 of FIG. 29 is assigned to collectively describe the entire solenoid structure which are typical of the motivator means utilized with position projectiles into the firing chamber, or to rotate or open and close governor valves in order to emit or exclude the introduction of plasmids into the central cavity or breech of the device. Numerals 901, 902, 903 and 904 designate one of several equivalent solenoid units, an integrated circuit, diode and resistive elements and a suitable ground means, respectively. Numeral 905 defines a combination control unit and sequencer means. Numeral 906 operates to control the input delivered to the solenoid circuit, the output delivered by said circuit and the sequence in which one or more solenoids are to be actuated in order to perform a given specified function. The pressure or force generated by a bolus of plasma, released for plasmitization, the position of wafer or cannister elements in relation to the loading and/or firing chamber, sensory data supplied by electro-optical systems, electrical contact elements or other sensory data is processed by elements 907. The position of projectiles are specified by means 908, which additionally receives data from elements 907, 909. Element 910 defines a single mode rapid scan electro-optical array; which not only verifies the position of the projectile but the type of projectile based on identifying the holographic code or encrypton pattern etched on the surface of the aforesaid projectile. Numeral 911 designates a counter latch and decoder unit for a signal processing and the locking mode; whereas measurements are processed by unit 912.

FIG. 30 entails a simplified schematic block diagram illustrating in brief the operations of a global memory system. The simplified block diagram described in FIG. 30 illustrates in an exemplary fashion a microcomputer array processor element dispoisted on a single VHSIC card. Information is received and encoded by element ¢1, which sents the data to be buffered by ¢2. The data obtained from ¢2 is then conveyed to a series of serial input registers, as denoted by element ¢3. The data from ¢3 is sent to a comparator bank, described by ¢4, which either processes the data by sending it to an emitter file ¢5 or to a series of interrogator circuits. The microcomputer array processor means is designated by value ¢6, which is contained within the embodiment of elements that are defined by a series of memory bank elements and intercept files, denoted by elements ¢7 through ¢10; wherein element ¢10 is a memory bank consisting of a number of subelements carried out to some desired element and all the elements ¢7 through ¢10 form what is losely known, as a global memory. Element ¢11 forms a typical memory request logic interrogator means and elements ¢12 through ¢16, which forms a preprocessor control logic memory interrogator, a master control logic memory and a series of slave memories with EE-PROM capabilities. The processed data and preprocessed data are both entered directly into the systems computer controller means, as defined by embarkation point ¢17 and ¢18.

Embodied within the structure of the global memory system are integrated circuits or microprocessors which are responsible for manipulating the data fed into the microcomputer, in accordance with the operative set of instructions provided here by the user. The instructions are keyed by the user and are provided within the operative framework of a digitized list or sequence forming a program, which is encoded and stored into the memory elements of the microcomputer. Each instructional element of a sequence of instructions consists of a specified number of bits averaging 256 bits of information, which is stored in one or more registers collectively called a memory address. The number of addresses of instruction sequences to be employed by the system is stored in order for the proper sequence in a program counter. A controller means usually receives the address of the new set of instructions from the program counter, which obtains the digitized data stored in the aforementioned memory address and transfers the said data to the instruction register. The way by which data is conveyed is by three separate and distinct communication channels, as designated by the address bus, the control bus and the data bus, respectively. The instructional address placed in the program counter is entered in the address bus which readies the storage means to yield or transmit the instructional data. A digitized signal or electrical impulse on the control bus enables the data to be transferred to the data bus means. An additional control signal conveyed to the instruction register is held, while the controller means decodes it and issues further digitized control signals to perform the given set of instructions. The instructions pertain to data stored in the data buffer and may be initiated by either some input device or in and from the memory. If the instructions perform a given operation the results of the said operation may be stored temporarily in the accumulator means; wherein upon completion of the same said operation the results are sent back to the specified memory address. The ALO and accumulator means are associated with a set of condition codes also known as flags, which function as single bit registers with each unit indicating something about the results about a given operation held in the accumulator means. When subprograms and frequent subroutines are embodied within a given program which requires several instructions in the same sequence are conveyed to adjacent memory addresses collectively defined as a stack means, which enhances the speeds in a given operation. The memory addresses forming the stack are separately addressed, as if only a single memory location and the address accessed is stored, in a means defined as the stack pointer. The stack pointer functions in a specific fashion as to allow the controller use only a single address to call for the entire stack.

A series of other ancillary registers known as general purpose registers, which are used as required. The ancillary registors have or consist of a exact finite number of registor elements n, beginning with an accumulator and ending with a high order byte register and a lower order byte register means. Other means are disposed in the form of external connections including a clock, power supply, data input/output means, analog/digital converters and other means. The CPU is implemented with secondary memory devices, which are defined by such means as read only memories (ROM's). Random access memories (RAM), charged coupled devices (CCD's), or other equivalent means, embodied within such means as I.C.'s are etched or imprinted on a card along with the microprocessor. The above aforememenentioned operations of the central processing unit CPU and how the CPU transfers data are illustrated schematically by FIGS. 30a, 30b. Numeric values are not assigned to the elements in the figures because each element is clearly defined and straight forward, consistant with the operation of conventional computer systems.

Figure 31:
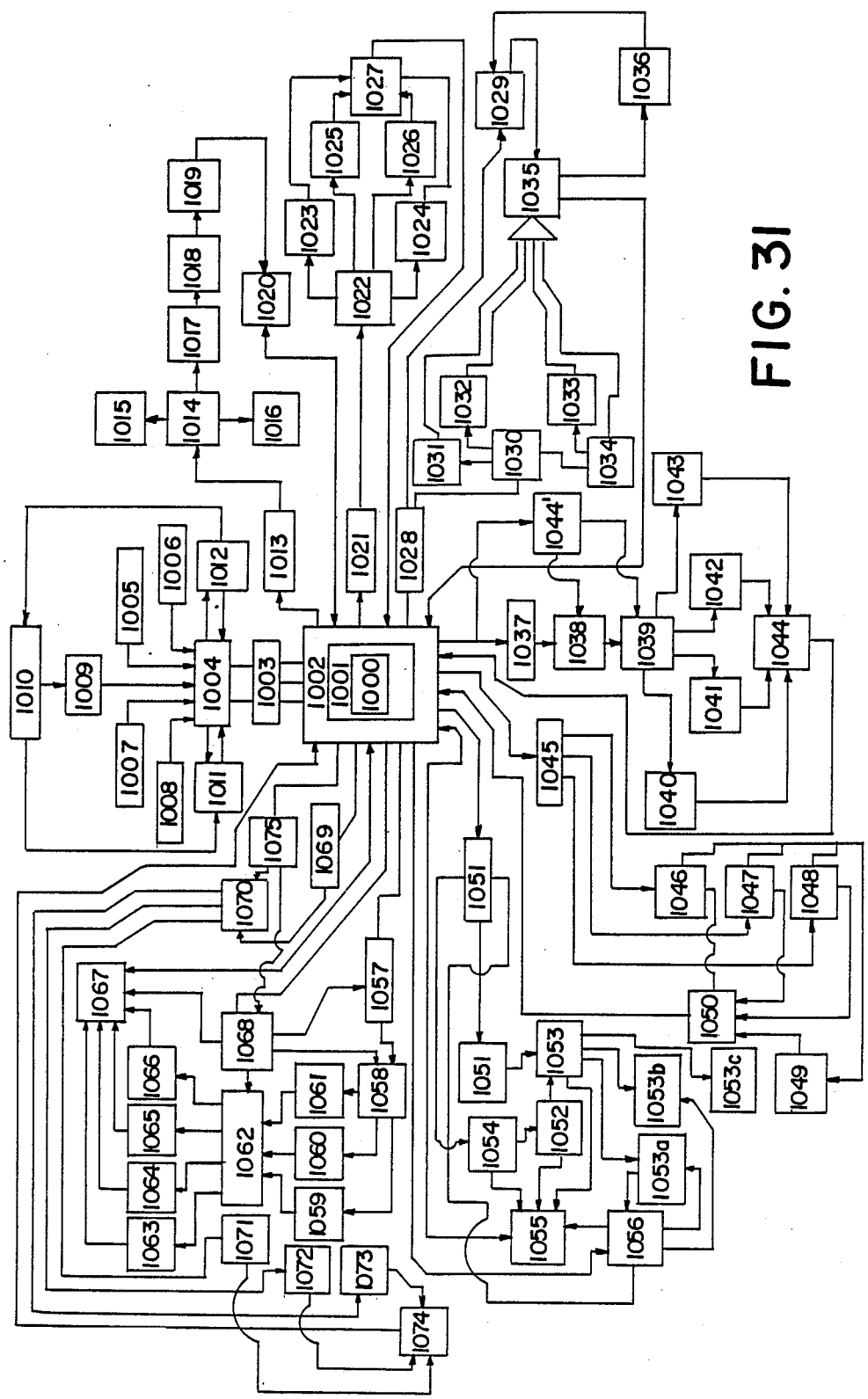
FIG. 31 denotes a block diagram entailing the basic operation of subsystems embodied within the invention.

FIG. 31 denotes a block diagram entailing the basic operation of subsystems embodied with the invention. Numerals 1000, 1001 and 1002 designate the central located CPU, a translator unit for encoding instructions from said CPU and decoding signals transmitted from aforesaid subsystems and an input/output fiber optics bridge whereby electro-optical impulses are conveyed into and from the CPU. The interface between the user and the CPU, number 1000, is conducted through secondary processing element 1003 which is engaged by interpreter means 1004. Manually keyed operations are processed through keyboard element 1005, joystick 1006, mouse element 1007 and interactive screen unit 1008. Voice commands from the user are initially serially introduced into speech processor 1009. Data commands introduced by the user through piezoelectric transponder element 1010, which transmits digitized signals to speech recognition unit 1011, wherein the signals are compared against known digitized values until a match is instituted. Speech synthesizer 1012 produces appropriate verbal response to the user which accompanies an appropriate action. Controller element 1013 controls the power and transmits codified instructions to the primary launch mechanism governing plasmatization of wafer elements housed in various cannister means. Numeral 1014 is a sequencer element which delivers the proper electronic impulses to operative systems 1015 to 1019. Element 1015 describes an injector unit which loads wafer means from a specified cannister and injects said wafers into the firing chamber. Once loaded into the firing chamber or in route to said firing chamber system 1016 is actuated, emitting said wafers and then seals the firing chamber prior to detonation of aforesaid wafer elements. Numeral 1017 describes an alternate ejector mechanism, which is actuated if either cannister means or wafer elements embodied within said cannister jams, is static or is not plastamizable. If a suitable wafer element is not presently available then alternate system 1018 is enlisted to compensate for various deficiencies existing in the primary launch system. The appropriate charge, interval of said charge is delivered to anode and cathode elements and charge biases are determined by element 1019. Element 1019 energizes the anode and cathode means responsible for producing the arc component plasmatizing the aforementioned wafer elements. Data from elements 1015 to 1019 regard the operative readiness of said elements are conveyed to processor 1020. The status of systems 1015 to 1019 is conveyed back to the CPU, number 1000, by process 1020. Numeral 1021 designates a controller unit, that regulates the power disseminated to the entire complement of rail elements and such related parameters as current, electrically charge or other properties. Energy is conveyed from element 1021 to sequencer means 1022 wherein said energy is distributed to separate rail elements $r_1$ to $r_n$ described by numbers 1022 to 1025, respectively. The status of rail element 1022 to 1025 is interpeted by element 1027, which monitors said elements including unit 1026 and conveys the data back to the CPU, number 1000. Number 1026 defines an automated bypass circuit which is actuated if a systems failure develops in either the aforementioned rail elements or ancillary support means.

The secondary stage providing thrust or propulsion consists of the Tesla complex. Controller 1028 regulates signals conveyed to release mechanism or governor 1029. Governor 1029 regulates the flow of gaseous or liquified plasmids from the primary reservoir to secondary reservoir accompanying each Tesla element of said Tesla complex. Electronic signals are additionally sent from controller 1028 to sequencer means 1030, wherein metered amounts or quantities of plasmids are released from the aforesaid secondary reservoirs leading to conduits surrounding each said Tesla element. As the metered plasmids are sequentially discharged from their respective conduits said plasmids are detonated by intense arcs produced by Tesla coil elements from each Tesla element of the complex. Numerals 1031 to 1034 describes in part the number of Tesla elements $T_1$ to $T_n$ forming the aforesaid complex. The status of Tesla elements is monitored by element 1035, which reconveys data back to the CPU. Bypass circuit, number 1036 is enlisted if it is determined by element 1035 that one or more governors or solenoids controlling the flow of plasmids from said reservoirs or ancillary structures are inoperative. Parallel circuitry governing the power distribution of electrical charge and temporal limits are administered to Tesla elements of the said complex. Controller element 1037 actuated power regulator element 1038 which conveys power uniformly to sequencer element 1039, which distributes said power. Sequencer 1039 conveys power to Tesla elements $T_1$ to $T_n$ as described by numbers 1040 to 1043, respectively. The operative readiness of elements 1040 to 1043 is monitored by unit 1044 which reconveys data back to CPU, number 1000, which engages bypass means 1044.

Element 1044 embodies a variety of programs, subprograms and routines which either boasts the signal to various inoperative Tesla elements and/or engages alternate systems to compensate for those elements determined to be inoperative.

The conducting layers subjected to intense electrical discharge, electrical propagation, extremes in temperature and pressure introduced by the discharge of plasma deteriorates during the operation of the device. Excessive deterioration is averted by active and passive coolant systems; whereas deterioration is compensated for by resurfacing means which restores expended conductants along the electrical conducting surface. Thermal controller element 1045 simultaneously actuates active coolant pump, number 1046, passive coolant pump 1047 which consists of a modified sterling heat engine and a magnetic hydrodynomic means, number 1048 to recover the 10 to 12 percent energy loss through the dissipation heat exhausted by the arc generator means, rail elements and other systems embodied within the device. Regulator apparatus for systems described by numerals 1046, 1047 and 1048 are necessarily embodied within same said systems. Processes from 1046, 1047 and 1048 enter condensor element 1049, wherein coolant are condense and recycled to maintain the structural integruity of structures where intense heat is generated. Data concerning the operational readiness of systems 1046 to 1049 are monitored by sensory array 1050, which reconveys data back to CPU, number 1000. Controller 1051 mediates electronic impulses governing the thermal volatilization of conductants to replenish those expended during the operation of the device, as described by number 1052. Numerals 1052, 1053 denote primary and secondary reservoirs which supply conductants. The primary reservoir 1052 recharges secondary reservoirs once their supply of conductants are exausted. The conductants are distributed to regions wherein the conducting materials are subjected to conditions which bring about deterioration. The means of distribution for said conductants reside in a series of conduit elements, 1053a–1053n. The propagation of conductants resides in the electrical propagation of said conductants differentially along the surface of rail structures, Tesla arcing rods, discharge anodes or cathods and other structures which conduct electric current. Electroplating element 1054 embodies peripheral elements which differentially change regions of the aforementioned electrical conducting structures and receives conditional instruction from controller 1051; said instructions being exclusively dependant on the flow of conductants from said reservoirs and the indication that the M.A.D. device is in an inoperative mode with regards to launching projectiles. The operative readiness of systems 1052 to 1054 are monitored by elements 1055, which access data derived from said systems and reconveys the information back to the CPU number 1000. The CPU will enlist a battery of ancillary system 1056 in the event a systems failure of any kind develops in the system responsible for recoating or replacing conductants.

Magnetic induction means interactively shape the force of plasma flow and assist the positioning of certain specified projectiles into the central bore of the device. Controller 1057 engages regulator 1058, which enlists elements 1059, 1060 and 1061. Means 1059 determines the polarity of said magnetic elements, numeral 1060 determines the magnetic flux of said m magnetic elements and element 1061 determines the power emitted in gases for said magnetic elements. Sequencer 1062 delivers current to aforesaid electromagnetic induction elements with properties determined by elements 1059, 1060 and 1061, respectively. Sequencer 1062 alters the parameters of magnetic induction elements or electromagnets $M_1$ to $M_n$ described by elements 1063, 1064, 1065 and 1066. Monitor means 1067 reconveys information concerning the operative status of elements 1063 to 1066 to CPU number 1000, which institues alternate systems 1067 in the event of a systems failure developing in systems 1057 to 1066, which either overrides or replaces the aforementioned systems, as indicated by number 1068.

The specification of the type of projectiles loaded into the central bore, the rate at which said projectiles are loaded and other parameters are governed by controller 1069. Controller 1069 engages sequencer element 1070, which institutes the rate and sequence in which projectiles are to be inserted into the plasma stream conducted through the bore of the device. Numerals 1071, 1072 and 1073 specify whether or not the projectiles dispersed are armor piercing, contain an explosive warhead or some other type. The status of projectiles is determined by monitor 1074. Monitor 1074 conveys data concerning status of projectiles such as the types, the number of projectiles available, the operative condition of means deployed to insert said projectiles or any other parameters regarding said projectiles to both the CPU and auxillary computational facility 1075. Element 1075 corrects any deficiencies existing in the projectile launch phase such as re-amplification of the command signal conveyed by controller 1069, actuates alternate systems to by-pass those suffering a systems failure or actuates backup systems, as indicated by numeral 1075 to compensate for those systems rendered inoperative.

Figure 32:
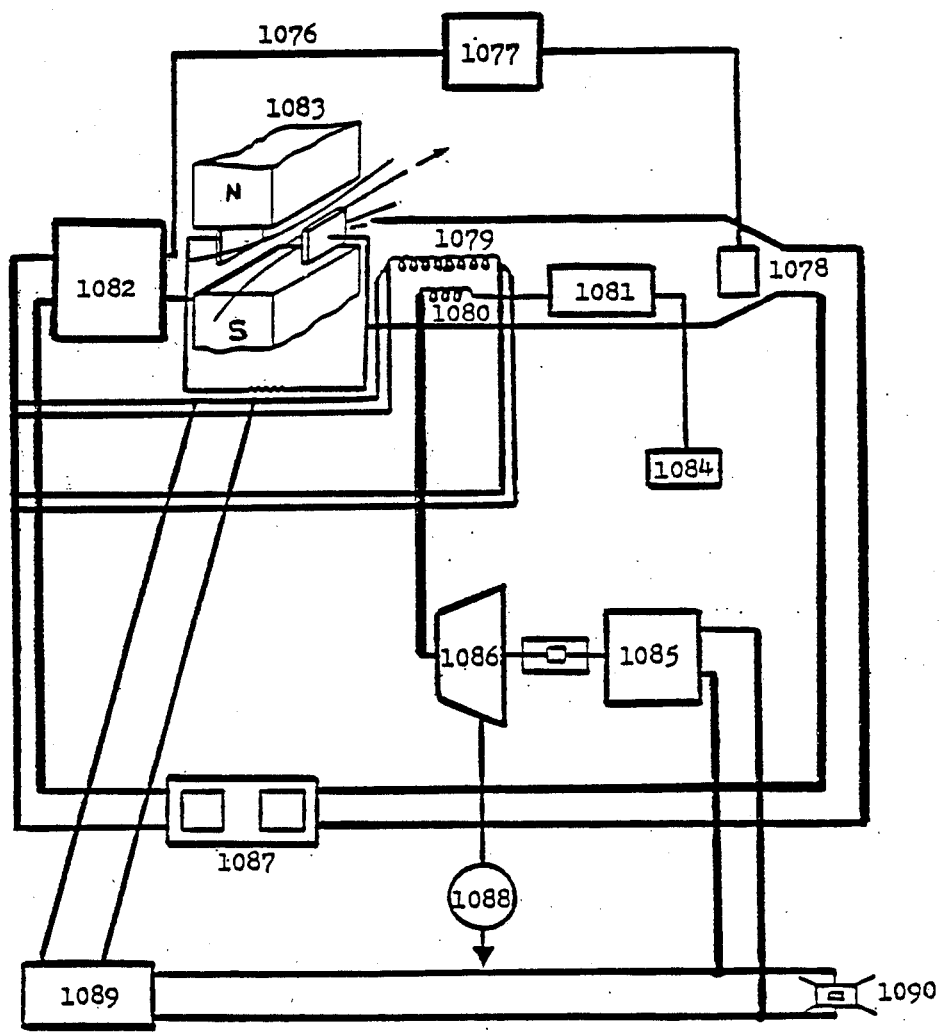
FIG. 32 describes in a concise block diagrammatic fashion the operation of a magnetohydrodynamic power generator means utilized to recover energy exhausted as heat by said M.A.D. device.

FIG. 32 describes in brief a block diagram outlining the operation of the magnetohydrodynamic power generator means MHD employed to recover energy lost or dissipated as heat by the operation of the M.A.D. unit or device. Numeral 1076 designates a seed injector means, whereas numeral 1077 describes a circulator element and means 1078 collectively defines a seed extractor. The preheater element of the MHD system is defined by numeral 1079, whereas the superheater element and boilder means are described by numerals 1080, 1081, respectively. Numeral 1082 of FIG. 32 designates a reactor unit and numeral 1083 is assigned to a cryogenic magnetic system with an accessing array of electrodes at the head of the MHD generator. The feed pump means, alternator and turbine complex which are collectively assigned numeric values 1084, 1085 and 1086. The compressor element and condensor element are described by units 1087, 1088, respectively. Numerals 1089, 1090 are assigned to a power inverter and output grid means.

In practice and principle a high velocity electrical conducting fluid consisting of sodium, potassium, mercury or another suitable medium intersects a magnetic field and electrical current is transduced therein. The operative mode of the MHD can be expressed by a simple set of well known equations contained herein below:

$$\bar{E} = \bar{u}.\bar{B}$$

A jet of conducting fluid with velocity u, moves through a magnetic field of flux B at right angles creating a electric field E. The implacement of electrodes placed in proximity and in contact with the advancing jet, such that energy can be extracted and delivered to some external load. The system is in effect thermal dynamically equivalent to a turbine with electromagnetic braking of the turbine blades. If it can be assumed that the working fluid behaves as a typical electric conductor of the conductivity o, the current density j is given by the following expression, $$J = \sigma(E - \mu B)$$

The electrical power output per unit volume of duct is described by the following expression;

$$-jE = \sigma E(\mu B - E)$$

The ratio of load resistance to the total resistance described by the value K such that, $$K = E/\mu B$$

and the electrical power generated per unit volume of duct is noted by the following expression, $$W = -jE'K(1-K)\sigma\mu^2 B^2$$

The power is essentially obtained by work done as the jet or moving stream encounters a body force such that, $$JB = (-1-K)\sigma\mu B^2$$

and the work done by the stream is equivalent to, $$-Bu = (1 - K\sigma u^2 B^2)$$

the ohmic heating in the fluid is described by the expression, $$(1-K)^2 \sigma u^2 B^2$$

which is obtained by differencing W against $-jB\mu$. Computational variances in the acquisition of targets in relation to internal parameters of the aforesaid device are under the control of the CPU. The internal paramters of the M.A.D. device or means entails the quantity of thrust departed to specific projectiles, the elevation, longitude, distance and relative motion between said targets nd the aforementioned device. External parameters such as atmospheric resistance, projectile drag the effects of gravity and related parameters encountered prior to impact are evaluated by the CPU. Information concerning the effects of impact, penetration, engagement of said targets is assessed by the user based on CPU in relation to ancillary targeting systems. The aforementioned ancillary targeting systems consist of but are not limited to laser designation, radar, sonar, various forms of enhanced telemetry, thermal detection and spectral analysis.

Figure 33:
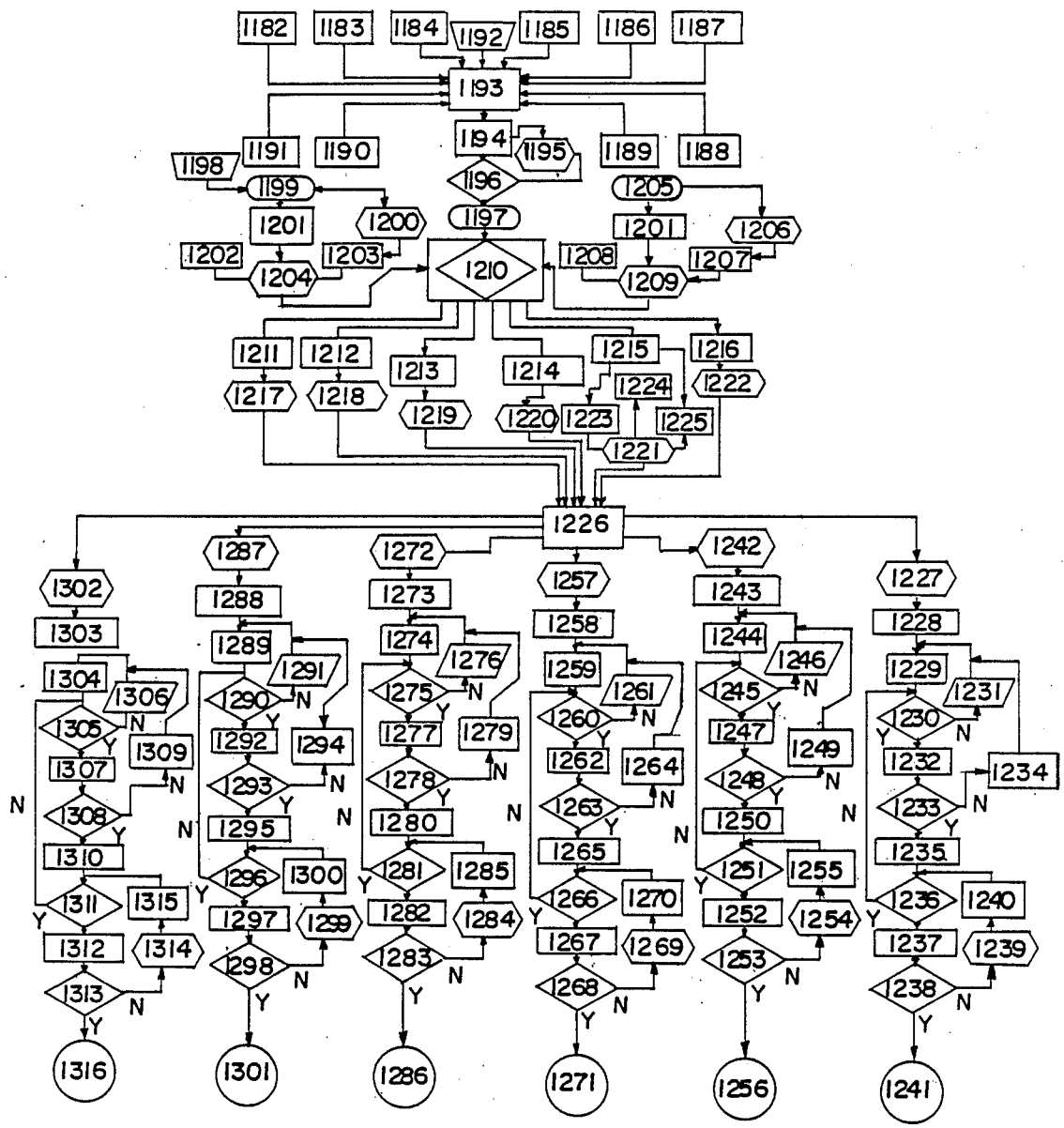
FIG. 33 discloses a brief flow diagram summarizing the operation of the M.A.D. device.

FIG. 33 discloses in part an abbreviated flow diagram summarizing the operation of the M.A.D. device. The extent to which operation is conducted within each system and subsequent interaction initiated between systems and subsystems is sufficiently summarized for one skilled in the art to readily understand the operation of the M.A.D. device. Numerals 1172 through 1191 of FIG. 33 disclose ten complexed and variable separate and distinct subprograms deployed by aforesaid means to identify, acquire nd pursue designated targets. Disclosed earlier in the specifications where various equations and/or programming formats deployed to illiminate and track numerous targets exhibiting complexed and variable behavior ranging from multiphase radar means to spectral shifts provided by doppler laser analysis. Single numeric values are assigned to each subprogram rather than reiterating the complexity of each subprogram. Numeral 1191 embodies the programming formats disclosed in part by the preceding figures. Subprograms entailing laser designation, multiple phase radar and three dimensional telemetry systems are disclosed by numerals 1182, 1183 and 1184. Elements 1185, 1186 and 1187 accesses emissions generated by sonar, radiofrequency and transmission alluding to VHF, UHF and other bands. Numerals 1188, 1189, 1190 and 1191 are assigned to subprograms encompassing radioactive decay, nuclear magnetic resonance, laser doppler analysis of emitted chemical species and other ancillary processes. Numerals 1192, 1193 define manual interrupt processing systems or override means and associated keying operations. Manual means 1192 consists of but is not limited to voice command/voice recognition systems, manual key stroke or touch access control, light pen cursor designation and or other means. Elements 1182 through 1193 collectively input into subprogram 1194 wherein data is collated, target acquisition and target pursuit are initiated prior to engaging preparatory process 1195. Preparatory process provides compression of collated data derived from program 1194. Decision process 1196 determines whether or not the compression of data is sufficient and whether or not target acquisition and or pursuit is adequate enough to enlist engagement of said target(s). If target acquisition pursuit and the like are adquately prepared then the system is placed on standby momentarily, while data is transferred by element 1197 to element 1210. If it is determined by decision process 1195 that data compression has been inadequte, or that the signals have been significantly distorted or that signals from two of the detection means remain uncorrelated then filter and auto-correlation process 1190 is engaged to reprocess the information. The information reprocessed and filtered by process 1196 is reconveyed to preparatory process 1194.

In the unlikely event of a total systems failure regarding target acquisition then target engagement can be keyed alternately by one of two ancillary bypass systems. The first bypass system is inacted by the user manually and entails but is not limited to targeting by on site observation, hardware operated by the user directly in conjunction with remote ancillary systems extending to the insertion of fuel rods into a reactor element to power up energy depleted systems. Numeral 1198 is indicative of a user based manual override or bypass system, wherein commands are introduced by the user at a secondary rather than a primary level of integration. Data is transferred from 1198 to processes 1200, 1201. Data is displayed as indicated by number 1200. Numeral 1201 designates a subprogram which initiates and executes target identification, tracking and or pursuit of said target. Numerals 1202, 1203 defines ancillary routines and subroutines appropriately defining and refining parameters associated with target acquisition. Process 1204 prepares data and signals subprogram 1210. Numerals 1205 through 1209 are equivalent to numerals 1199 through 1204 with the exception that 1205 unlike 1199 is triggered by an automated rather than a manually operated program. The assignment extent and subsequent deployment of one or more energy emissive system(s) and the sequencing of said system(s) is initially controlled by subprogram 1210. Numerals 1211 through 1216 specify the types of energy systems to be deployed, the extent and temporal interval in which the energy source(s) will engage on or more designated targets. Numerals 1211, 1212 and 1213 specify the absolute amount of energy to be generated by electropropulsive systems, including ancillary support systems. Numerals 1214, 1215 and 1216, which specify the actuation sequence for the entire complement of the aforesaid electropulsive systems or elements. Preparatory processes are actuated, as indicated by elements 1217 through 1222 which implement processes 1211 through 1216, respectively. Numerals 1223, 1224, 1225 describe subprograms defining parameters for subsystems of the electromotive device, 1215, including but not limited to selection of projectile type, the absolute energy in MegaJoules delivered to said projectile, the mass of the projectile and related parameters. Elements 1217 to 1222 engage program 1226, wherein commands are executed and channeled to their proper designated actuation programs. Six equivalent actuation subprograms are disclosed in FIG. 33; however a fully automated device may have a minimum of twenty actuation programs to a maximum of one hundred depending on the number of emissive systems. Element 1226 enlists the actuation programs 1227 through 1302, inclusive. Since the actuation programs are equivalent then the disclosure of one discloses the operation of the remaining five said programs. Numeral 1227 is a preparatory process, wherein incoming complexed data transmissions undergo signal processing and demodulation. Numerals 1228, 1129 entails the means whereby the energy supplied to a given system(s) and the duration of operation of the said are specified and appropriately executed. Decision process 1230 assesses whether or not the functions are correctly dispatched from elements 1228, 1229. If it is determined by 1230 that all functions regarding power output and the duration of the output are correct than process 1232 is engaged. If however, it is determined that either the power or durational interval of delivery (is) are improperly executed, but present, then clerical operation 1231 is imposed on the data from 1230 and the revised data is reconveyed to element 1229 to be collated with incoming impulses. Process 1232 exacts or accesses subprograms for the emission of specified wave characteristics and/or beam type. In the case of electropropulsive units, irregardless of the type of plasma the amplification of electromagnetic fields alluding to such properties as field strength, wave characteristics embodied within within said fields, the temporal occurrences and polarity of said fields. Decision process 1233 verify the selection of the field properties accessed by process 1232. Single or multiple field properties are verified by element 1232. If positive verification by process 1233 is established, then secondary temporal sequencing means are enlisted, as indicated by numeral 1235. Unverified wave characteristics from process 1233 are conveyed to process 1234 wherein the data is filtered, reprocessed and reintroduced to element 1129. The duration or interval of time specified wave characteristic(s), spectral line(s) or other properties contained within on or more emission is (are) presented is controlled by process 1236. Decision process 1236 verifies the duration in time said wave characteristics, spectral lines and the like processes are presented with unsubstantiated resultant data which is reconveyed along with incoming data to deterministic process 1230 for analysis. If verification by decision process 1236 is exacted then subprogram 1237 is enlisted; wherein ancillary, auxiliary and primary support systems are provided with sufficient instructions to be actuated. Decision process 1238 determines whether or not the proper command have been issued and received by the aforementioned system. If insufficiency exists in the instructions necessary to actuate said systems then preparatory process 1239 is enlisted, which amplifies and filters the exiting signals. The signal prepared by process 1239 are conveyed to process 1240 for further enhancement and restructuring prior to being submitted with data entering determinant process 1236. If positive confirmation is exacted by decision process 1238 then the data is transferred from the actuation program emboding elements 1227 through 1238 to the program governing system implementations; wherein the respective systems are called upon to execute the entire complement of commands, as indicated by numeral 1241. As stated earlier the six actuation programs specified in FIG. 33 of the disclosure are equivalent; therefore numerals 1227 through 1241, 1242 through 1256, 1257 through 1271, 1272 through 1286, 1287 through 1301 and 1302 through 1316 are all equivalent. Numerals 1241, 1256 and 1271 are equivalent to 1286, 1301 and 1316 wherein data is transferred from the respective actuation programs. The aforesaid programs are collectively described by FIGS. 34 through 34e, respectively.

Figure 34:
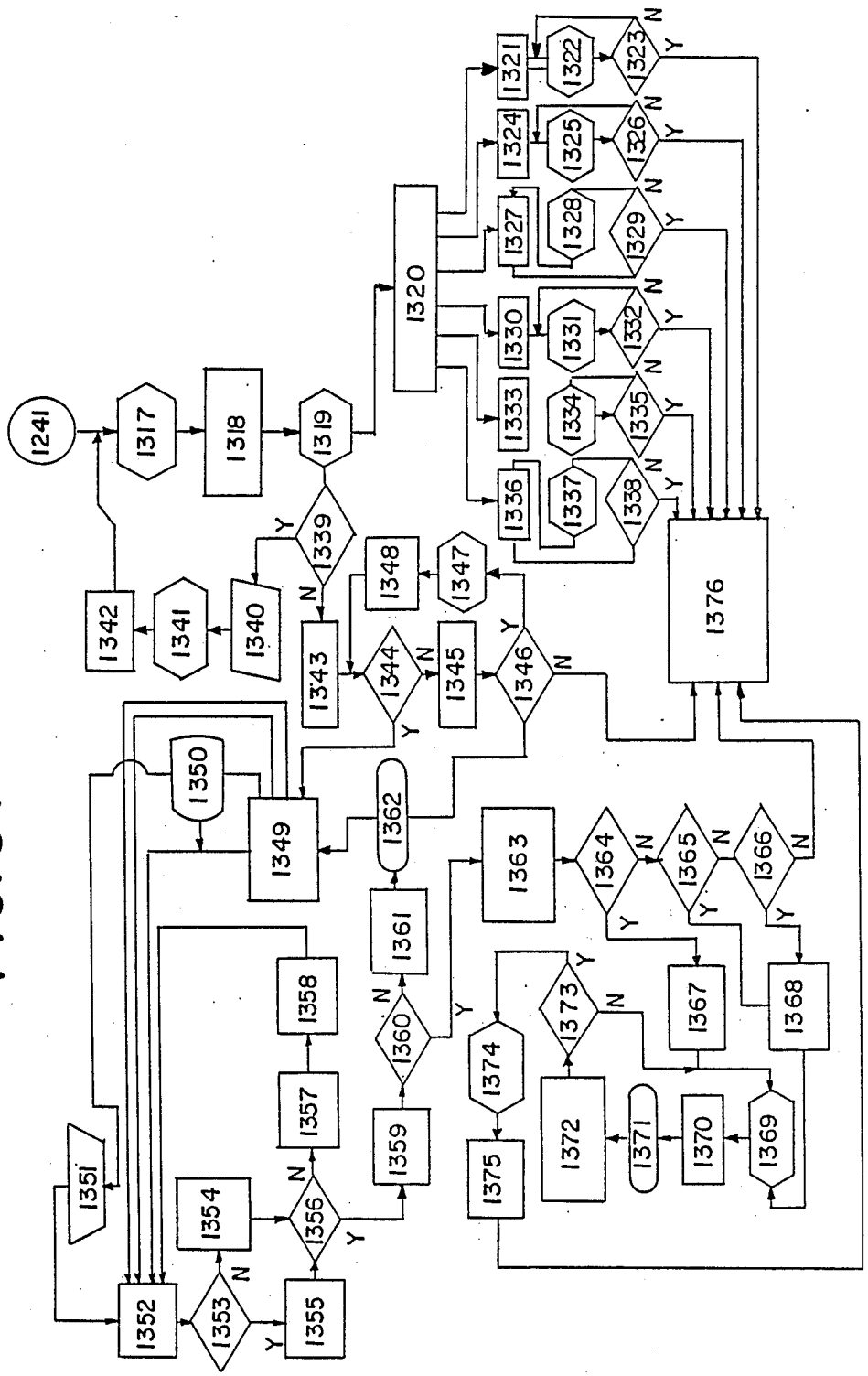
FIGS. 34 to 34e discloses concise programming formats which implements system operation for systems embodied within said M.A.D. device.
Figure 34A:
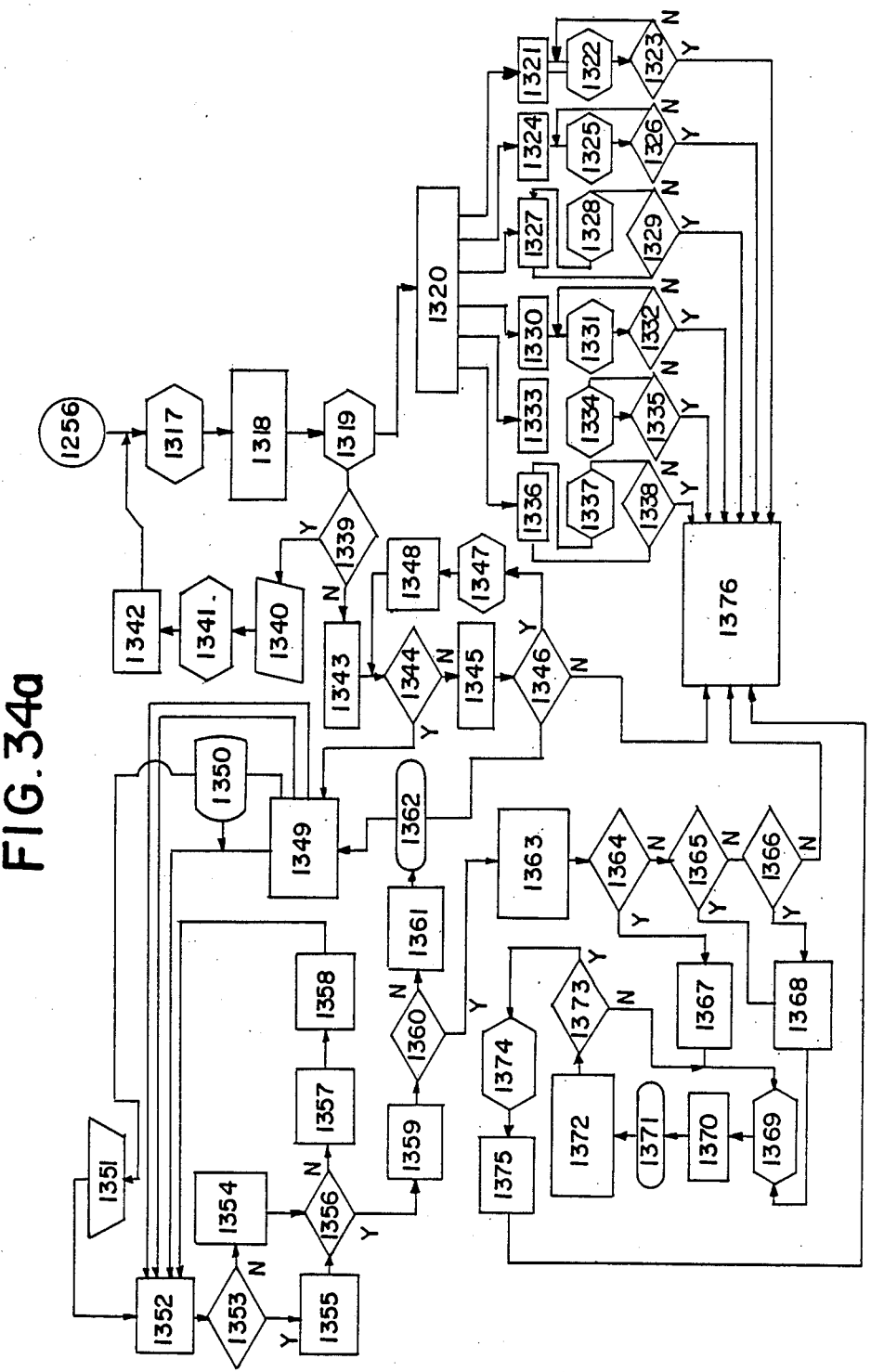
Figure 34B:
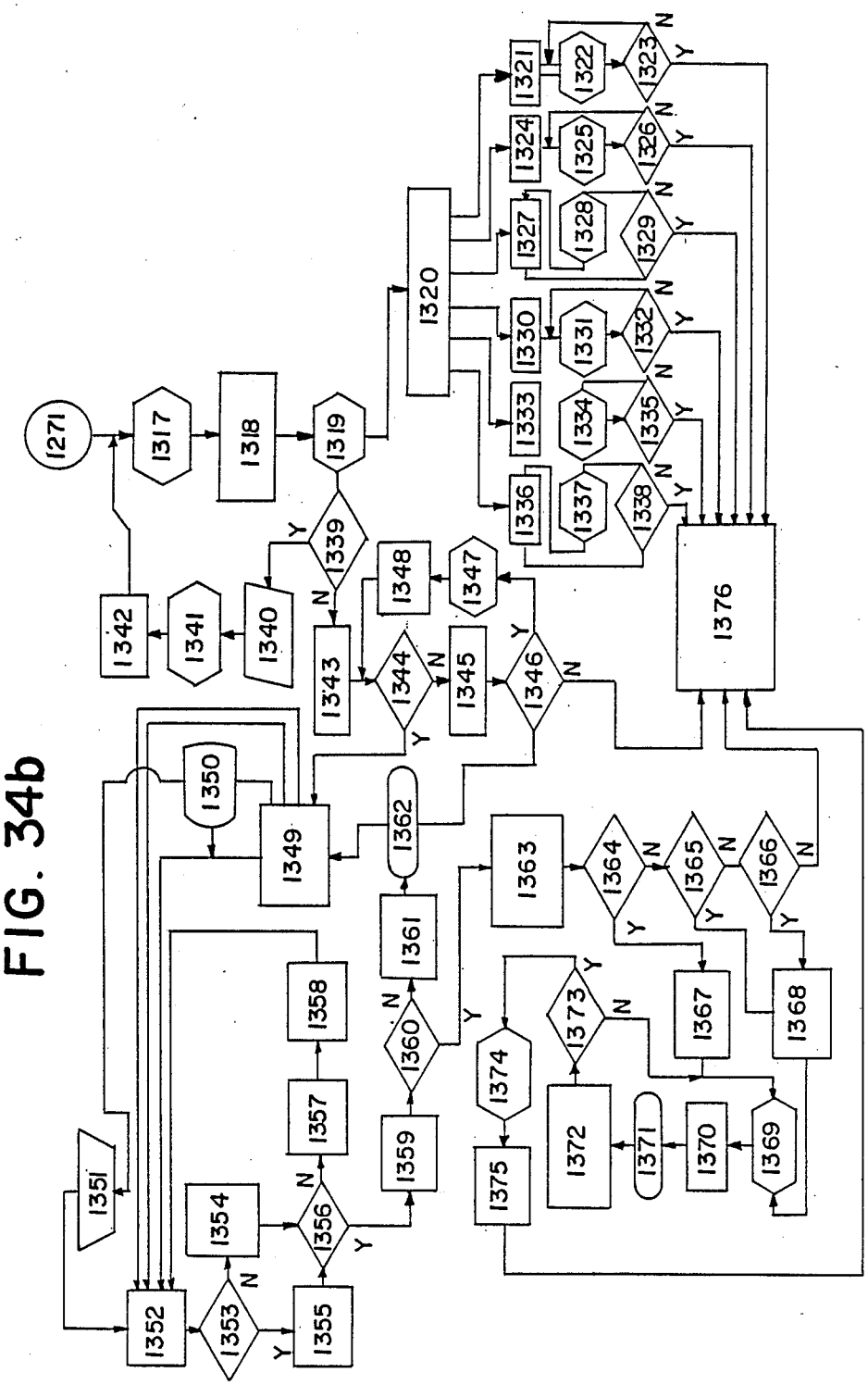
Figure 34C:
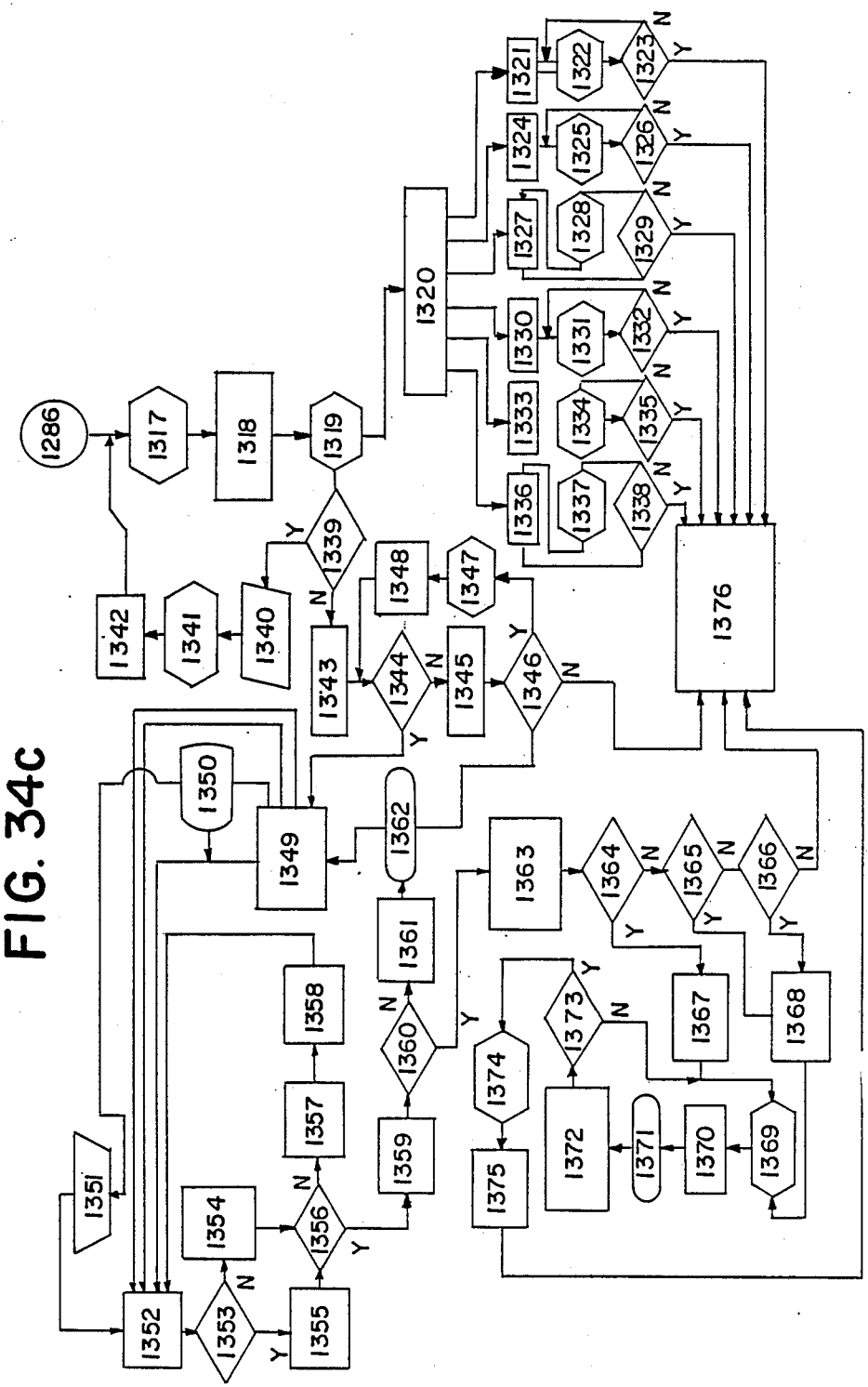
Figure 34D:
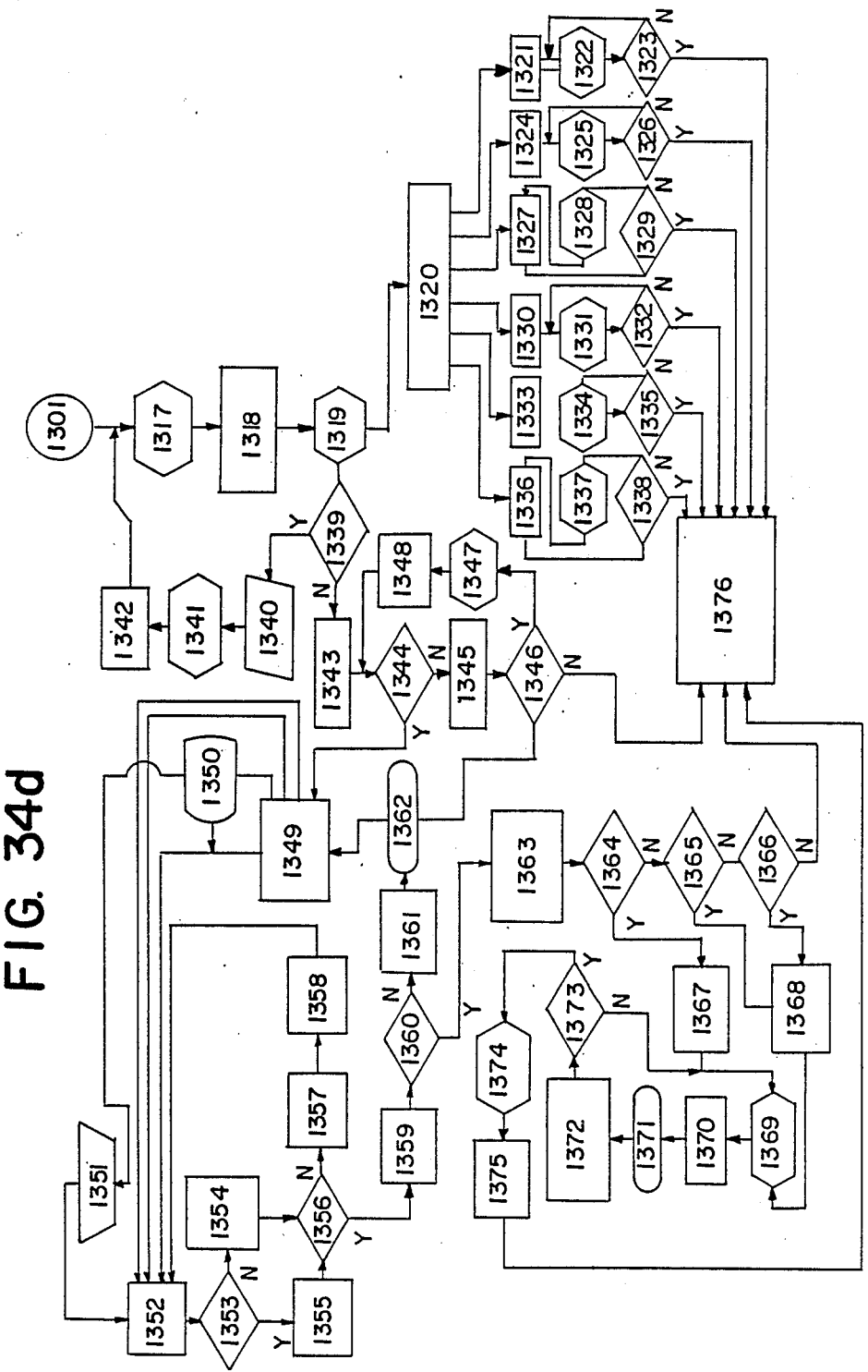
Figure 34E:
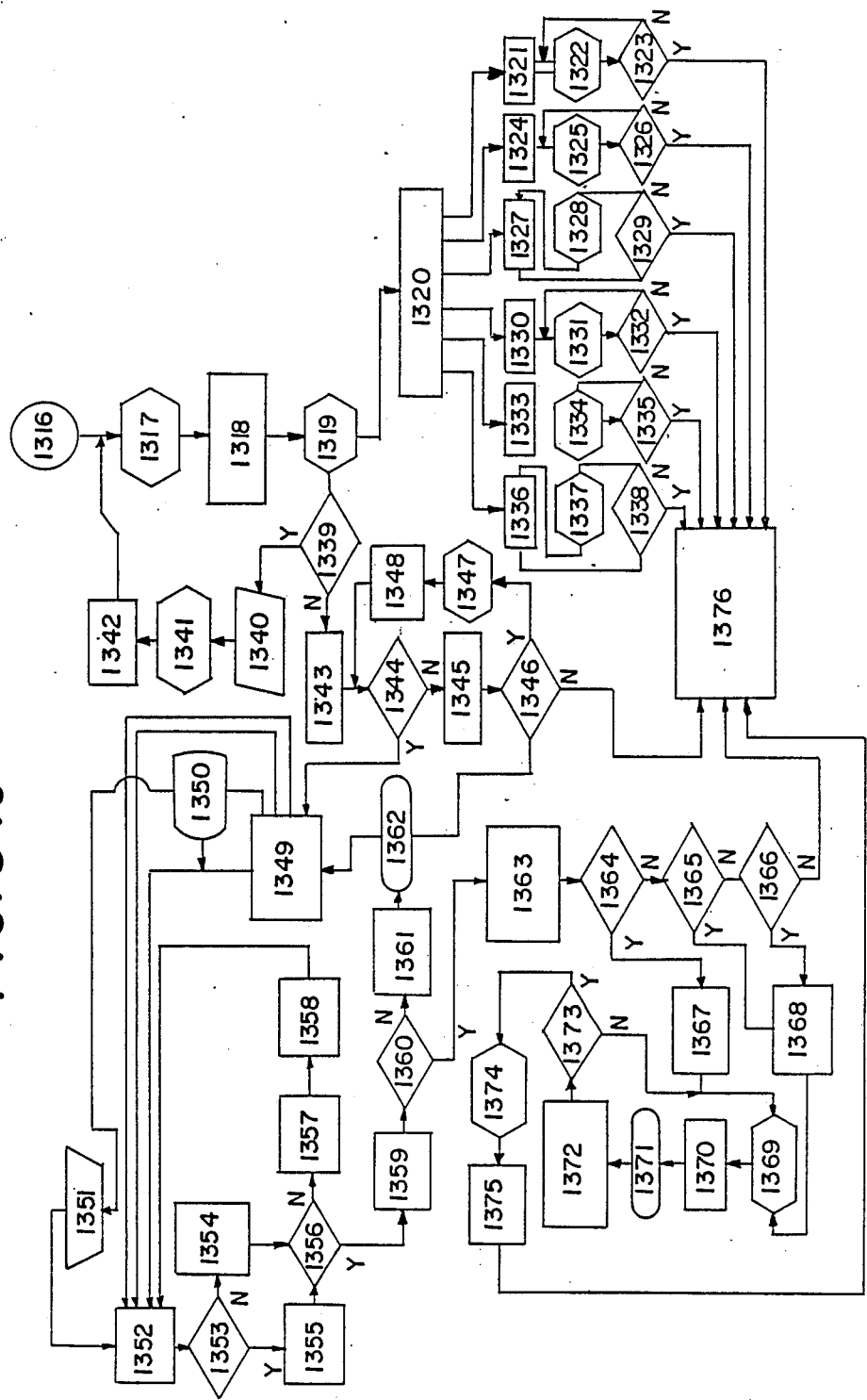

FIG. 34 concisely discloses in part the programming format which implements systems operation for the one or more systems embodied within the M.A.D. device. It is within the implementation process wherein either one or more operative systems are actuated and or viable alternative systems are inacted in the event of a systems failure or some other fault developing which renders the selected or specified system(s) inoperative or unavailable to the user. Transfer processes 1241 through 1316 collectively define equivalent subprograms enlisted collectively by the six equivalent transfer points, 1241, 1256, 1271, 1286, 1301 and 1316, respectively. Data from transfer points 1241 through 1316 actuate preparatory process 1317 which encodes the signal and transmits said signal to process 1318, which filters and amplifies the signal; prior to engaging preparatory process 1319, wherein a separation and decoding sequence occurs. The information prepared by element 1319 is conveyed to deterministic process 1339 to debasing modulator element 1320; wherein the signal is converted into at least six divergent transmission beams with portions of said transmissions, being conveyed to at least six separate and distinct loci or logic centers controlling separate subsystems considered the electromotive device or system consisting of a multitude of smaller subsystems. The type of particle or source beam(s) utilized is executed by subprogram 1321. The rate of acceleration of said particle beam(s) is determined by subprogram 1324. The confinement of field strength, which shapes the characteristics of said beam(s) as wavelength characteristics, spectral lines and related properties are executed by subprogram 1327. Subprograms 1330, 1333 and 1336 actuate mechanisms responsible for directing, diverging and focusing the source beam(s). Determinant processes 1323, 1326 and 1329 are equivalent in function to 1332, 1335 and 1338. The said deterministic processes are associated with separate and distinct sensor based feedback loops to determine whether or not the instructions of the subsystems are appropriately executed. If the respective subprograms instructions are impeded or are partially implemented then preparatory processes 1322, 1325, 1328 1331, 1334 and 1337 reprocess the data and reconveys the information to the respective subprograms. If however, the subprograms are properly executed in turn then the positive signals sent by the deterministic processes are collective acting as forcing function actuating high order functions assigned numeric value 1376. As disclosed previously the data from preparatory process 1319 is diverged and sent to both process 1320 and deterministic process 1339. If it is determined that the prepared data is insufficient to properly activate do to deficiencies in the processing of signals then the data is conveyed to elements 1340 through 1342 which reprocesses the information and reengages process 1377. Clerical operation 1340 wherein data signals are reorganized and reclassified prior to being sent to process 1341. It is within process 1341 where the data is prepared to reenter the main sequence of the program. Preparatory process 1341 engages comparator element 1342, wherein the reprocessed data is conveyed along with new data to update data not sent to preparatory process 1317. If however, decision process 1339 determines that the data is sufficient to actuate the specified system(s) but said system(s) are inoperative then alternative system(s) must be activated. As indicated by subprogram 1343 a bypass switches to the next available operative system. Decision process 1344 determines whether or not a bypass system is avialable. If it is determined that an alternative source or system(s) are unavailable due to impeded access routes then alternative access routes are engaged, as indicated by process 1345. If however, an alternative source is available then subprogram 1349 is enlisted by decision process 1344. Subprogram 1345 entails statistical formats, which completes partially deleted garbled or jammed signals. Process 1345 enlists decision process 1346, which determines whether or not the function of the signals can be properly identified. If proper identification is established then preparatory and filter process 1347, 1348 are inacted and the data is summated with incoming data from 1343 to be reevaluated by decision process 1344. If a negative response is enlisted by process 1346 then higher order functions 1376 are engaged. Subprogram 1349 displays the data, numeral 1350, which alerts the user and provides for manual intervention, as indicated by number 1351 and engages process 1352. Process 1352 is a subprogram wherein data pooled from other processes undergo integration. Once data has been pooled and undergone integration decision process 1353 determines whether or not data integration is properly executed. If positive affirmation of integration is determined by decision process 1353, then process 1355 is enlisted and if not the data is conveyed to process 1354. Process 1354 is a subprogram which subjects data to statistical analysis to eliminate signal distortion; whereas process 1355 enhances and filters the data signals. Data retrieved from elements 1354, 1355 are entered into deterministic process 1356, wherein verification of signal clearity is established. If signal clearity is not confirmed then the signal undergoes further enhancement redigitized and filtered as indicated by elements 1357, 1358, respectively. If positive confirmation is substantiated by process 1356, then process 1359 is engaged, wherein the alternative system is fully actuated. Decision process 1360 determines whether or not the alternative system is fully actuated and if a negative response is elicited then process 1361, 1362 are engaged.

Data from 1360 is implemented by process 1361 whereby the said system(s) is (are) placed on standby and data is transferred or reconveyed back to element 1349, as indicated by element 1362. Positive affirmation of the actuation process is confirmed by process 1360 then subprogram 1363 governing a controller mechanism is activated. Each emissive system and the like is formed from the operative interaction of several subsystems and subprogram 1363 which collectively keys the actuation and sequencing of said subsystems. Decision processes 1364, 1365 and 1366 determine the operative viability of each subsystem, in relation to the overall operation of the entire system. Decision process 1364 determines the sufficiency of power limits assessed deliverable to specified subsystems. Decision process 1365 is enlisted upon positive confirmation of an adequet power source which determines if special properties, such as wave characteristics are selected. Decision process 1366 determines whether or not emissive beam(s)* generated are properly focused and or directed to points of utilization. Negative responses elicited from decision processes 1364, 1365 and 1366 are appropriately dealt with by conveying the data to processes 1367, 1368 and 1376, respectively. Processes 1367, 1368 institute routines and subroutines which amplify signals and switch to auxiliary backup systems in the event of a systems failure. Preparatory process 1369 receives impulses from means governed by elements 1367, 1368 and actuate various feedback loops associated with the operation of said auxilary backup systems. Process 1370 entails a subprogram which is responsible for the execution of all commands wherein upon termination the subsystems are temporarily placed in a standby state, as indicated by numeral 1371. Process 1372 is a subprogram requiring the initiation of maintainance mechanisms including but not limited to the recharging of reservoirs, restoration of reflectivity to a surface undergoing rapid deterioration and discharge of excess residual heat or the byproducts of the emissive source beam generators. Deterministic process 1373 verifies whether or not maintaince has been properly effected on subsystems. If it can be positively affirmed that the specified systems have all undergone appropriate maintaince then preparatory process 1374 is engaged; whereas preparatory process 1369 is reenlisted if a negative response is indicated by process 1373. Preparatory process 1374 and termination element 1375 shutdown all operative subsystems and transfers the remaining data to be acted upon further by higher order functions, as indicated by numeral 1376. The programming format for the entire complement of subsystems embodied within the M.A.D. device is replete with subprograms governing bypass processes for subsystems with redundant or repetitive functions. *Electromagnetic wavelengths are shaped into narrow fields or beams.

Figure 35:
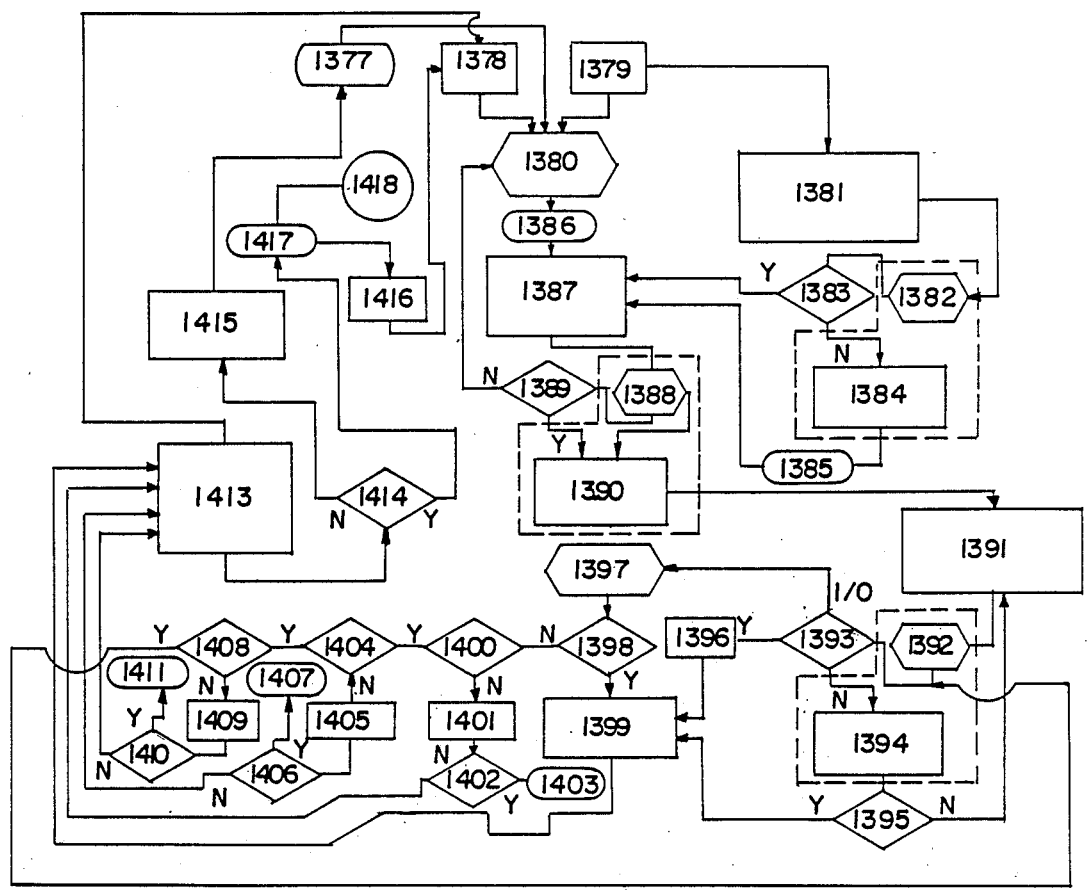
FIG. 35 is a flow chart briefly illustrating the operative programming by which electropropulsive elements are sequentially actuated in relation to other electropropulsive elements; sequentially actuated in relation to other electropropulsive elements.

FIG. 35 is a flow chart briefly illustrating the operative programming by which electropropulsive elements are sequentially actuated in relation to similar or equivalent electropropulsive elements. FIG. 35 denotes a format equivalent to the type of programming formats deployed to actuate the primary arcing mechanism, rail elements, the array of Tesla units, the entire complement of magnetic induction elements, and/or any ancillary support means utilized to augment said electropropulsive units. Since FIG. 35 consists of a number of equivalent reiterative steps an explanation of the format governing one electropropulsive element is sufficient to define all similar such or equivalent electropropulsive means. Numerals 1377, 1378 and 1379 of FIG. 35 collectively describe the manual keying element, the CPU program initiator and the secondary system program initiator. Manual keying element 1377 is a user based system, which allows the aforesaid user through manual key instructions to actuate a specific number of electropropulsive elements in a precise order and/or intercede the operation of the CPU or other subordinate systems. The CPU program initiator number 1378 automatically institutes the precise sequence in which the aforesaid electropropulsive elements are to be actuated and the precise interval of time for each said electropropulsive elements is to be energized. The secondary system program initiator element, as described by numeral 1379 is a program initiator instituted by an ancillary microcomputer means, which is subordinate to the CPU, but has the equivalent computational capacity of said CPU at the level of said CPU. Numerals 1377, 1378 and 1379 convey their full complement of instructions to preparatory process 1380. Secondary initiator element 1379 simultaneously actuated subprogram 1381. The response time of the microcomputer means governing the program embodies within subprogram 1379 haas several orders of magnitude less circuitry to control than the CPU and has an comparable advantage over said CPU in response time. Subprogram 1381 specifies or sets the power level and/or field strength of the entire complement of electropropulsive elements. Data from subprogram 1381 is conveyed to preparatory process 1382 where the instructions are amplified and enhanced. Determinant process 1383 determines whether or not the power output of the aforementioned electropropulsive elements coincides with the upper limits specified by subprogram 1381. A positive affirmation that the power levels for said electropropulsive elements coincides with those specified by process 1381 as determined by sensors associated with decision process 1383 which conveys data directly to program 1387. A negative assessment by decision process 1383 enlist routine 1384, which actuates alternate circuits, to compensate for those circuits which are inoperative. Data from element 1384 is then conveyed by process 1385 to program 1387. Data from preparatory process 1380 is collated and enhanced prior to being conveyed by transfer process 1385 to program 1387. It is within program 1387 wherein the sequence or order in which each electropropulsive elements of a given specified subsystem embodied within the aforementioned M.A.D. unit or device. Program 1387 additionally specifies the temporal interval or duration of time each of the aforesaid electropropulsive elements or to be energized or activated once the power level or field strength have been established by elements 1381 to 1384. Program 1387 further specifies the status or operative readiness of the entire complement of said electropropulsive elements. Data from program 1387 enters preparatory process wherein the data regarding the operative status of every said electropropulsive element of a given specified complex is collated and compared against the operative norms of alternate equivalent ancillary system. The operative status of the aforesaid electropropulsive means is assessed by determinant process 1389, as data is conveyed from preparatory process 1388 to said determinant process and subprogram 1390, respectively. A negative assessment decision process 1389 reinlists preparatory process 1380; whereas positive confirmation by decision process 1389 enlists subprogram 1390. Subprogram 1390 executes all previous commands and enlists subprogram 1391, which controls the quantity, rate of injection and ignition of plasmids. Subprogram 1391 upon completion of its tasks enlists preparatory process 1392, which runs a systems check on tasks performed and reintegrates said data. Data from process 1392 is conveyed to determinant process 1393. Determinant process 1393 assess whether or not the plasmids are properly dispersed and properly plasmatized. Positive confirmation by decision process 1393 regarding the dissemination of said plasmids enlists process 1396, whereas a negative determination engages subprogram 1394 and in the event no determination is attainable then preparatory process 1397 is engaged. Subprogram 1394 immediately enlists the full complement of alternate circuits, bypass systems and ancillary means to compensate for systems failure and/or inadequencies incurred by systems governing the dispersal and ignition of said plasmids. Internal sensors embodied within circuits and bypass systems of said device monitor the status of various components and through determinant process 1395 assess whether or not subsystem 1394 has adequately compensated for deficiencies of said plasmid dissimination means. A negative assessment by process 1395 reenlists subprogram 1391; whereas a positive assessment by process 1395 enlists program 1399. Program 1399 is engaged by data compression element 1398.

Preparatory process 1397 provides sensory means with a mechanism by which commands can be appropriately handled by interrogotor element 1398, 1400, 1404 and 1408, respectively. The above mentioned interrogator elements determines the operative status of each electropropulsive element continuously after repeated firings of the aforesaid device and allows through ancillary processes modifications within the program. Determinant process 1398 interrogates electropropulsive elements 1—n after x number of successive firings to determine whether or not 100% of the specified operative capabilities of said electropropulsive means exist. If upon interrogation of impulses derived from feedback circuits and comparator means process 1398 determines that the operative parameters of said electropropulsive means approaches or exceeds 100% than process 1399 is enlisted to exact a delta vector on the reserves of conductants and availability of electroplating mechanisms. Said delta vector being the shortess access route to a given data file containing the whereabouts of the most accessible reservoirs of electrical conductants. Once subprogram 1399 has execated its task, CPU program 1413 is engaged to assess and act upon the data. A negative evaluation by determinant process 1398 enlists determinant process 1400, which interrogates elements of the electropropulsive system to determine whether or not said electropropulsive elements have undergone sufficient deterioration to warrent the actuation of electroplating means and the release of conductants to recoat or resurface said electropropulsive elements. Significant deterioration of the aforesaid electropropulsive element is deemed at an operative loss evaluated at between 75 to 85 percent optimum functioning capacity. If decision process 1400 indicates that overall efficiency is diminished by 15 to 25 percent than process 1481 is enacted to compensate for said deficiencies by restoration of the electrical conducting surface. Subprogram 1401 is elicited by decision process 1400 and enlists subprograms, routines and subroutines which actuates mechanisms that restores the conducting surfaces of said propulsive elements;

whereas upon completion of said tasks enlists determinant process 1402 verifying whether or not subprogram 1401 has appropriately executed instructions regarding restoration of said electropropulsive means. The process of restoration entailing the release of electrical conductants from reservoirs, the distribution of said conductants to points of dispersal and the subsequent dispersal process; wherein mechanisms by which dispersal are actuated, such as electroplating units release conduits and or ancillary support means. Positive confirmation that the electrical conducting capacity of said electropropulsive elements have been restored according to acceptable operating norms then said restoration process is terminated and the system is placed on standby, as indicated by numeral 1403. A negative evaluation by determinant process 1402 enlists CPU program 1413 for analysis, reevaluation and so that alternate measures may be inacted by said CPU to compensate for known deficiencies. Steps intiated and executed by process 1400 to 1403 are equivalent to repetitive processes 1404 to 1407 and 1408 to 1411 respectively. Processes 1400 to 1411 service equivalent electropropulsive means from a single element to some finite number n. Once the entire complement of said electropropulsive elements have been properly serviced then the entire system is placed momentarily on standby, as indicated by number 1412. Standby process 1412 eventually enlists the program engaging the CPU, described by element 1413 which similarily engages processes 1399, 1402, 1406 and 1410, respectively. Program 1413 upon completion of its tasks enlists both determinant process 1444 and element 1378. Determinant process 1414 indicates whether or not program 1413 and the preceding processes have completed their prescribed functions. If it is determined by process 1414 that all functions of program 1414 and existing processes 1377 to 1413 then the entire system is placed on standby, and the CPU is flaged to go to other electropropulsive systems embodied within aforesaid M.A.D. device, as prescribed by numer 1417. Additionally element 1416. reactuates the entire program sequence as indicated by process 1418 for the next firing of projectile elements. Element 1414 upon a negative determination actuates subprogram 1415 which interfaces with the user and reengages process 1380 through manual keying process 1377, inclusive.

Figure 36:
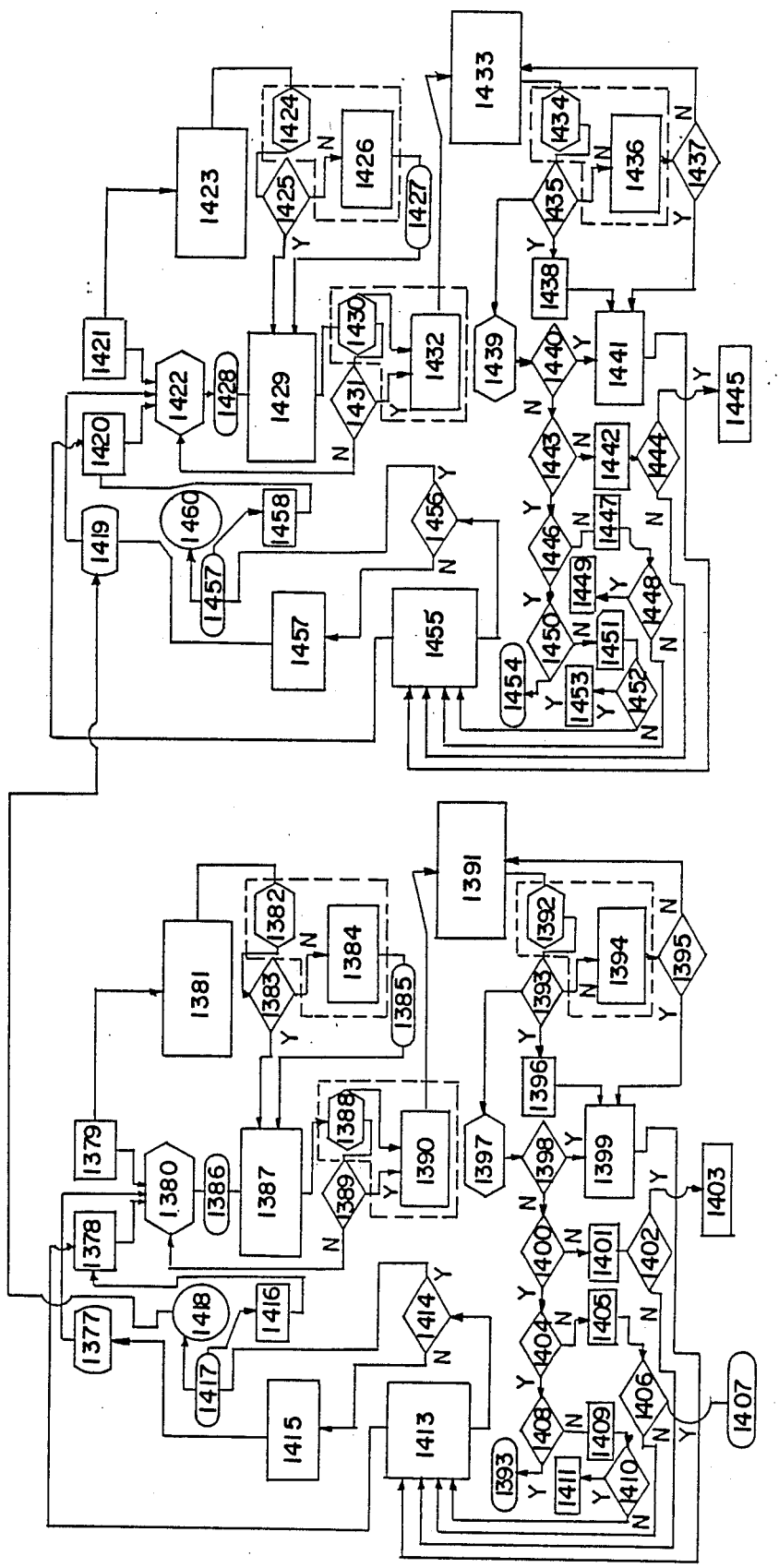
FIG. 36 is a concise flow chart describing the operative programming of electropropulsive element systems embodied within the aforesaid device.
Figure 36A:
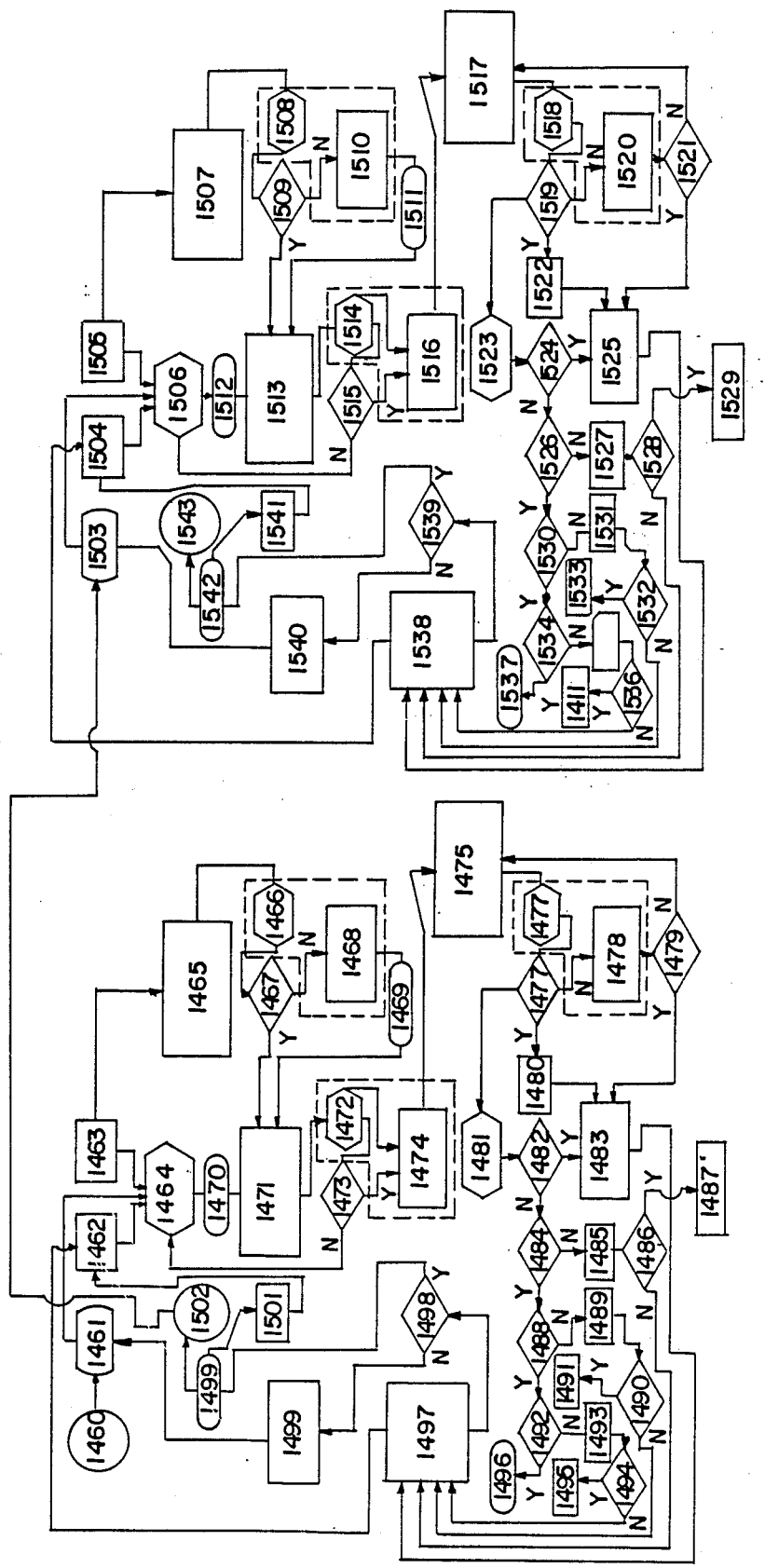
FIGS. 36a, 36b are continuations of the flow charts represented in FIG. 36 describing the operative programming of electropropulsive systems embodied within the aforesaid device.
Figure 36B:
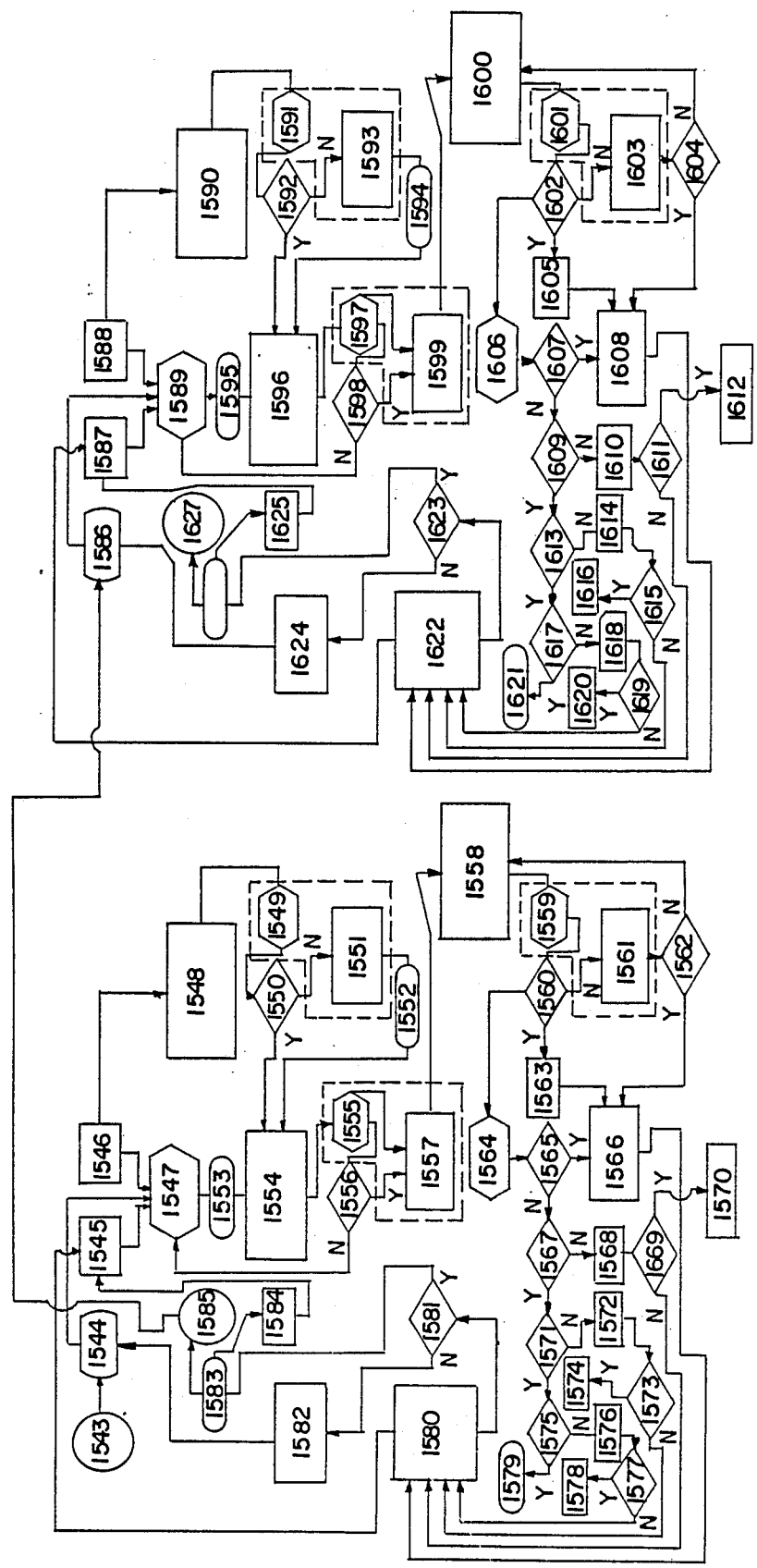

FIG. 36 is a concise flow chart describing the operative programming of electropropulsive elements embodied within the aforementioned M.A.D. unit or device. Processes 1317 through 1418 are equivalent to processes 1419 through 1459, which are equivalent to processes 1460 through 1501, which are repetitive but applicable to other separate and distinct electropropulsive systems. Processes 1460 through 1501 are equivalent to processes 1502 through 1542 which are equivalent to processes 1543 through 1584 and processes 1585 to 1625, respectively. Processes 1585 to 1625 are repetitive and equivalent to processes 1317 to 1584; however processes 1585 to 1625 are indicative of the program for the terminal or finite electropropulsive system embodied within the aforesaid device. FIGS. 36a, 36b entail programming steps which are equivalent those described in the preceding FIG. 36.

Although various alterations or modifications may be suggested by those skilled in the art, it is the intention of the inventor(s) to embody within the patent warranted hereon all changes and modifications as reasonably and properly come within the scope of contributions to the art, without departing from the spirit of the invention.

What is claimed is:

1. A multi-stage, mass-action driver device, including:
   computerized driver-control means having output terminals providing driver-sequencing signals;
   a loading chamber for receiving and automatically advancing plasmatizable wafers;
   plasmatizable wafers carried by said loading chamber;
   a firing chamber electrically coupled to said output terminals and mechanically communicating with said loading chamber for receiving and plasmatizing, in a pre-determined sequence, said plasmatizable wafers, said firing chamber being responsive to the receipt of each of said wafers to self-seal while each wafer is being plasmatized;
   said firing chamber including an electric arc coupled to a source of electrical power and to said output terminal and responsive to the sealing of said firing chamber to convert each of said wafers to a plasma state to form plasmoids;
   a composite bore communicating with said firing chamber for receiving said plasmoids;
   said composite bore including a series of aligned centrally located openings therethrough and multiple, longitudinally aligned and spaced, electrically conductive rails, concentrically positioned with respect to said bore;
   means coupled to said output terminals for applying pre-determined potentials from said external source, in sequence, to said rails;
   plasma-accelerator means interposed between said firing chamber and said bore for accelerating plasmoids from said firing chamber towards said bore;
   electromagnetic means circling said bore and positioned after said plasma-accelerator means in the direction of said bore, which means direct and accelerate plasmoids from said firing chamber;
   means coupled electrically to said output terminals and located following said plasma-accelerator means in the direction of said bore for automatically injecting projectiles into said bore for propulsion by said plasmoids; and,
   means for applying operating potentials to said driver device under the control of said computerized driver-control means;
   said plasma-accelerator means including a plurality of radially disposed Tesla coils having their discharge ends positioned in a common cavity which is coupled to and follows said firing chamber in the direction of said bore.

2. Apparatus according to claim 1 which includes, in addition, metallic cannisters for containing said plasmatizable wafers, said cannisters being stored in said loading chamber.

3. Apparatus according to claim 1 which includes, in addition, cooling means for cooling said driver.

4. Apparatus according to claim 1 in which said electromagnetic means includes a plurality of selectively actuable field coils controlled by signals from said output terminals.

5. Apparatus according to claim 4 in which said selectively actuable field coils are activated differentially along said bore.

6. Apparatus according to claim 1 in which said Tesla coils are tilted so as to lie in the surface of a virtual core which is coaxial with said bore and having their discharge ends forward of the remainder thereof in the direction of desired motion of said plasmoids.

7. Apparatus according to claim 1 in which said wafers are of cesium.

8. Apparatus according to claim 3 in which said cooling means is a closed loop system including heat exchanging means positioned aft of said bore in said driver device.

9. Apparatus according to claim 4 in which said selectively actuable field coils have a polarity determined by control signals from said output terminals.

10. Apparatus according to claim 1 in which said wafers are of Teflon.

11. Apparatus according to claim 1 in which said wafers are of mercury.

* * * * *